United States Patent
Yamashita et al.

(10) Patent No.: US 7,694,777 B2
(45) Date of Patent: Apr. 13, 2010

(54) ELECTRIC POWER STEERING APPARATUS

(75) Inventors: Masaharu Yamashita, Toyota (JP); Eiji Kasai, Toyota (JP); Ippei Yamazaki, Toyota (JP); Shuji Fujita, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 175 days.

(21) Appl. No.: 11/836,410

(22) Filed: Aug. 9, 2007

(65) Prior Publication Data

US 2008/0035411 A1 Feb. 14, 2008

(30) Foreign Application Priority Data

Aug. 10, 2006 (JP) ............... 2006-218313

(51) Int. Cl.
*B62D 5/04* (2006.01)

(52) U.S. Cl. ...................... 180/443; 180/446

(58) Field of Classification Search ............... 180/443, 180/446, 441; 701/41
See application file for complete search history.

(56) References Cited

U.S. PATENT DOCUMENTS

| | | | | |
|---|---|---|---|---|
| 5,904,223 | A * | 5/1999 | Shimizu et al. | ............ 180/443 |
| 6,148,949 | A * | 11/2000 | Kobayashi et al. | ......... 180/446 |
| 2004/0148080 | A1* | 7/2004 | Ekmark et al. | ................ 701/41 |
| 2005/0103561 | A1* | 5/2005 | Endo et al. | .................. 180/443 |

FOREIGN PATENT DOCUMENTS

| | | |
|---|---|---|
| JP | 6-344937 | 12/1994 |
| JP | 2000-358394 | 12/2000 |
| JP | 2002-104218 | 4/2002 |
| JP | 2002-331946 | 11/2002 |
| JP | 2002-345281 | 11/2002 |
| JP | 2003-26020 | 1/2003 |
| JP | 2004-203108 | 7/2004 |
| JP | 2004-291923 | 10/2004 |
| JP | 2005-102451 | 4/2005 |
| JP | 2005-237172 | 9/2005 |
| JP | 2006-25587 | 1/2006 |
| JP | 2006-183676 | 7/2006 |
| WO | WO 2004/054086 A1 | 6/2004 |

* cited by examiner

*Primary Examiner*—Lesley Morris
*Assistant Examiner*—Tashiana Adams
(74) *Attorney, Agent, or Firm*—Oblon, Spivak, McClelland, Maier & Neustadt, L.L.P.

(57) ABSTRACT

When it is determined that a malfunction has occurred in a rotational angle sensor, an electronic control unit changes the control manner from the normal assist control to the sensorless assist control. In the sensorless assist control, an assist stop command unit receives the information concerning the motor rotational angular speed $\omega m$ from an angular speed conversion unit. Then, the motor rotational angular speed $\omega m$ is compared with the threshold value $\omega m1$. If the motor rotational angular speed $\omega m$ is equal to or higher than the threshold value $\omega m1$, an assist enabling signal is transmitted to a PWM voltage production unit to continue the power assist. On the other hand, if the motor rotational angular speed $\omega m$ is lower than the threshold value $\omega m1$, a stop command signal is transmitted to the PWM voltage production unit to stop the power assist.

21 Claims, 30 Drawing Sheets

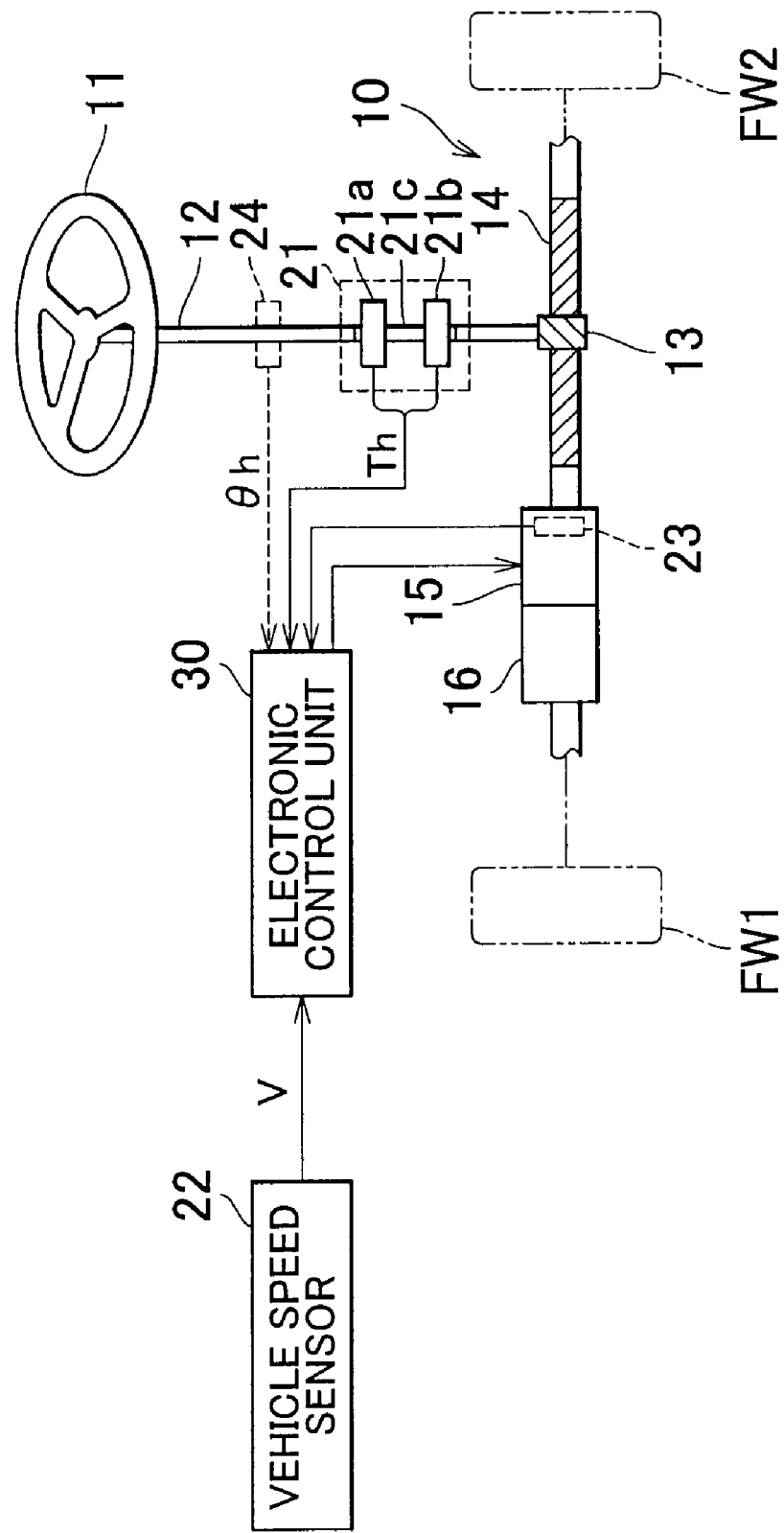
F I G . 1

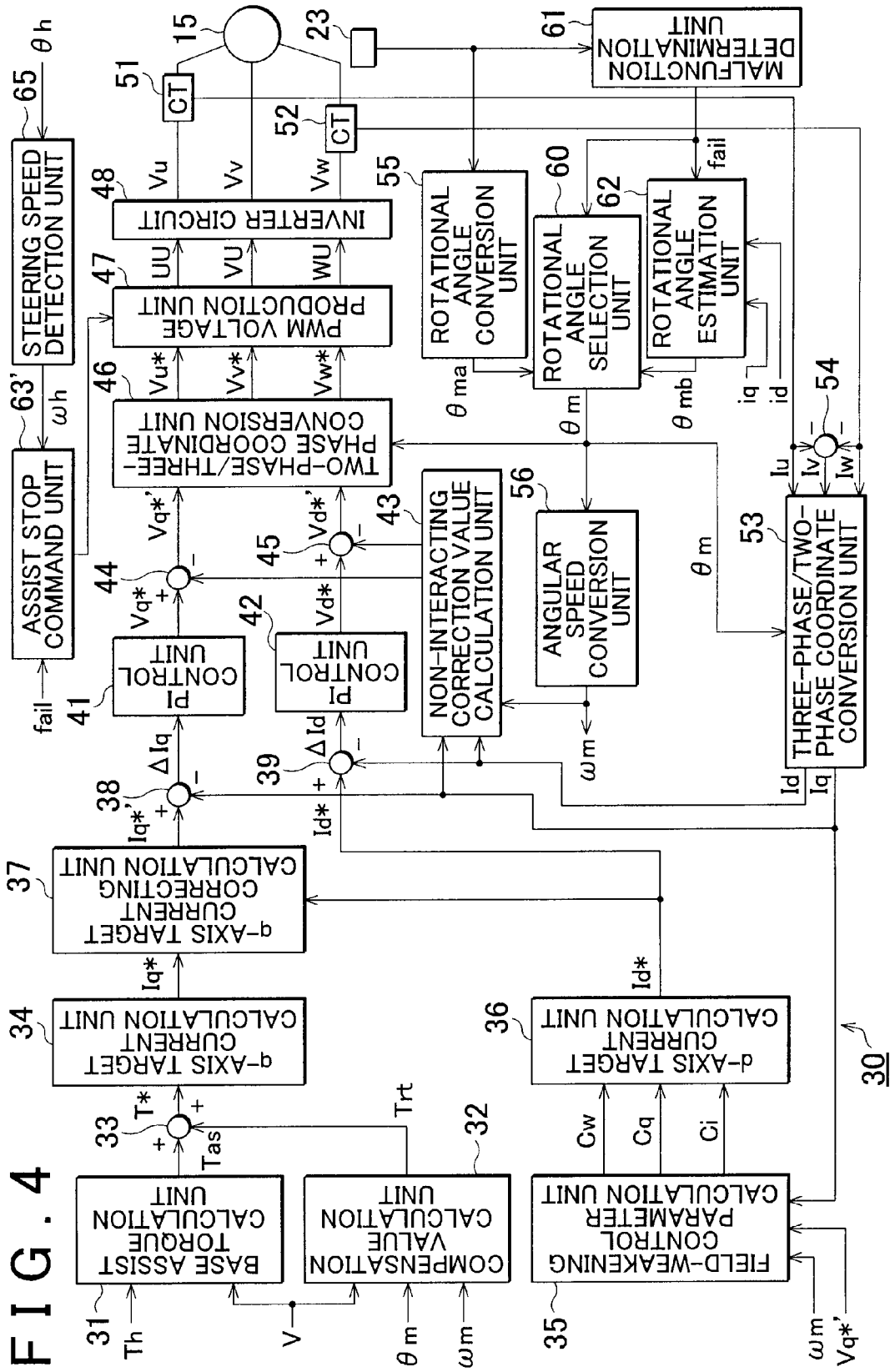
F I G. 4

FIG. 18
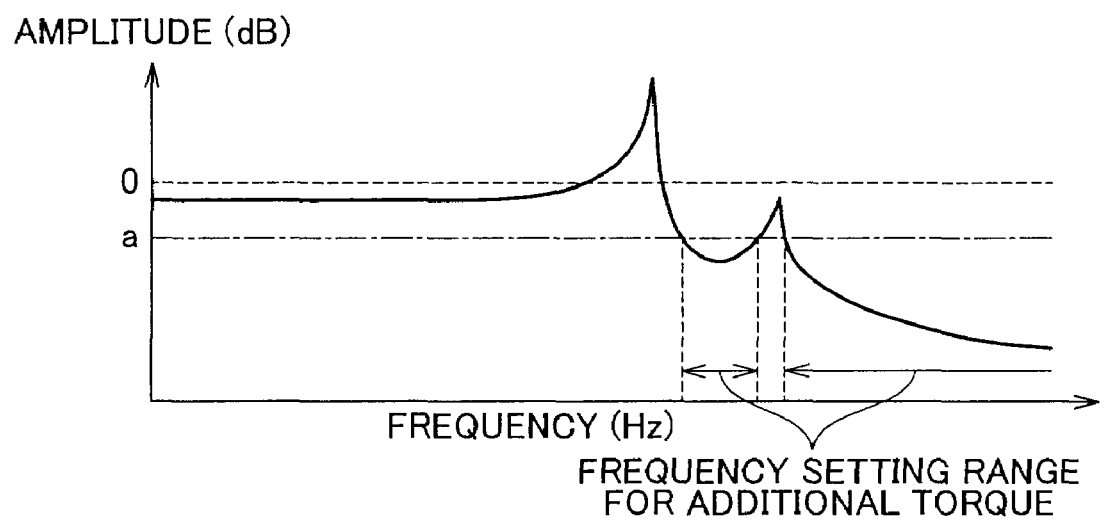
FIG. 19A   FIG. 19B
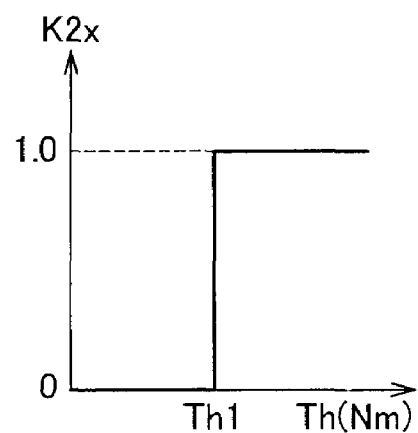
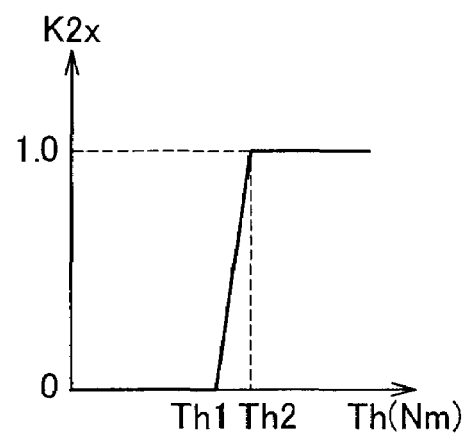

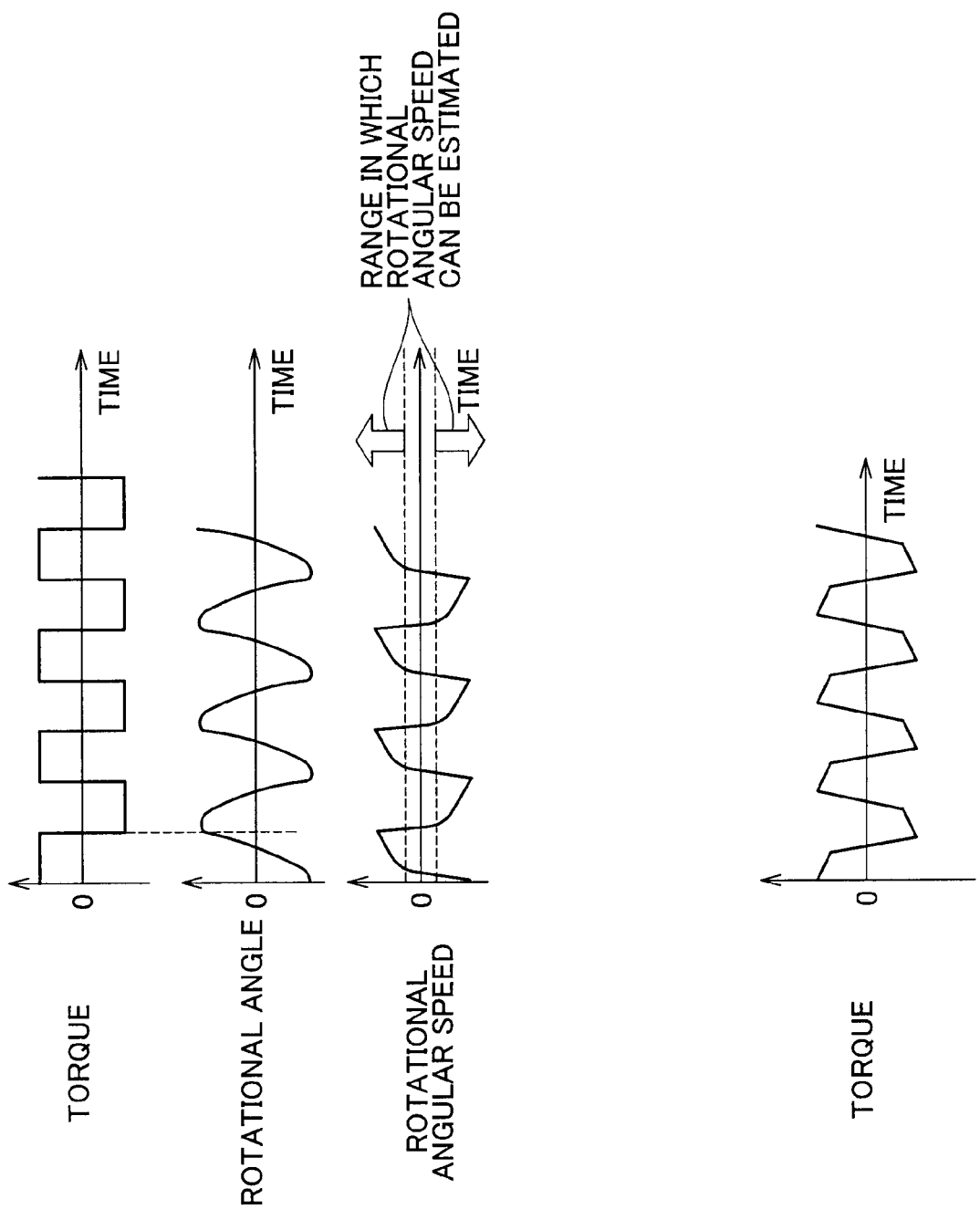

ELECTRIC POWER STEERING APPARATUS

INCORPORATION BY REFERENCE

The disclosure of Japanese Patent Application No. 2006-218313 filed on Aug. 10, 2006 including the specification, drawings and abstract is incorporated herein by reference in its entirety.

BACKGROUND OF THE INVENTION

1. Field of the Invention

The invention relates to an electric power steering apparatus which is provided with an electric motor and which assists a turning operation of a driver's steering wheel performed by a driver.

2. Description of the Related Art

There is an electric power steering apparatus for a vehicle that detects a steering torque applied to a steering wheel which is turned by a driver (hereinafter, referred to as a "driver's steering wheel") and that causes an electric motor to produce an assist torque based on the detected steering torque. For example, in an electric power steering apparatus described in Japanese Patent Application Publication No. JP-2003-26020 (JP-A-2003-26020), a controller calculates a target current value for an electric motor based on a steering torque applied to a driver's steering wheel and a vehicle speed, and the controller calculates a target value of the voltage at which electricity is supplied to the electric motor based on the deviation of a motor current value (actual current value) detected by a current detector from the target current value. Then, the controller executes the switching control on an inverter at a duty ratio corresponding to the target voltage value, whereby a target three-phase power-supply voltage is applied from the inverter to the electric motor. As a result, a desired assist torque is produced.

For example, a three-phase permanent magnet motor is used as an electric motor of an electric power steering apparatus. When the rotation of the electric motor is controlled by a three-phase power supply unit, the vector control indicated by the two-phase rotating flux coordinate system (the d-q coordinate system) is usually executed. When the vector control is executed, the rotational angle (the electric rotational angle position of a rotor) is detected, and the two-phase/three-phase coordinate conversion (the coordinate conversion from two-phase to three-phase, and the coordinate conversion from three-phase to two-phase) is executed based on the rotational angle.

Accordingly, if a malfunction occurs in a rotational angle sensor that detects the rotational angle of the electric motor, it becomes difficult to execute the control. According to Japanese Patent Application Publication No. JP-2003-26020 (JP-A-2003-26020), a resolver sensor is used as a rotational angle sensor. When the output (the amplitude value of a periodic waveform signal) from the resolver sensor is equal to or lower than a predetermined value due to, for example, breaking of wire, it is determined that a malfunction has occurred in the resolver sensor. According to JP-A-2003-26020, even after it is determined that a malfunction has occurred in the resolver sensor, the assist control is continuously executed to produce the assist torque when the electric motor is at a rotational angle position at which the output from the resolver sensor is equal to or higher than a predetermined level. As a result, the situation where the driver suddenly falls into difficulty in the steering operation is avoided.

However, executing the control based on a detection signal from such malfunctioning rotational angle sensor is not as reliable as it should be. When a salient-pole permanent magnet motor is used as the electric motor that produces a steering assist torque, the rotational angle is estimated based on the salient-polarity (a change in the magnetic resistance due to a change in the position of a rotor). Accordingly, it is considered that the rotational angle of the electric motor is estimated without using a sensor, and the assist control is continuously executed by controlling the amount of electricity supplied to the electric motor based on the estimated rotational angle.

In an electric power steering apparatus, however, an electric motor is rotated at a considerably low speed that is close to 0 in many cases, unlike a common electric motor. If the electric motor is rotated at such a low speed, the reliability of the estimated value of the motor rotational angle is low. Namely, as the motor speed (the rotational angular speed) of the electric motor decreases, the reliability of the estimated value of the rotational angle obtained using the salient-polarity of the motor is reduced. Accordingly, if the electric motor of the electric power steering apparatus is driven under the sensorless control without taking any measures, the target assist torque is not achieved. In some cases, a reverse assist torque may be produced, that is, an assist torque may be undesirably applied in the direction opposite to the direction in which the target assist torque should be applied.

SUMMARY OF THE INVENTION

The invention provides a highly reliable electric power steering apparatus that drives an electric motor, which produces a steering assist torque, through sensorless control.

A first aspect of the invention relates to an electric power steering apparatus including a steering mechanism that steers a steering wheel in response to a steering operation of a driver's steering wheel; an electric motor that is fitted to the steering mechanism, that produces a steering assist torque used to assist the steering operation of the driver's steering wheel, and that is formed of a salient-pole permanent magnet motor; rotational angle information obtaining means for obtaining information concerning a rotational angle of the electric motor; motor control means for controlling the rotation of the electric motor based on the information concerning the rotational angle obtained by the rotational angle information obtaining means; and assist control means for calculating a target steering assist torque based on the steering operation of the driver's steering wheel, and for providing the motor control means with a command to supply electricity to the electric motor to cause the electric motor to produce the steering assist torque based on the calculated target steering assist torque. The electric power steering apparatus further includes a rotational angle sensor that rotates in accordance with the rotation of the electric motor to detect the rotational angle of the electric motor; rotational angle estimation means for estimating the rotational angle of the electric motor using the salient-polarity of the electric motor; and sensor malfunction determination means for determining whether a malfunction has occurred in the rotational angle sensor. The rotational angle information obtaining means obtains the information concerning the rotational angle of the electric motor from the rotational angle sensor when it is determined that there is no malfunction in the rotational angle sensor, and obtains the information concerning the rotational angle of the electric motor from the rotational angle estimation means when it is determined that a malfunction has occurred in the rotational angle sensor. The assist control means changes the control manner for causing the electric motor to produce the steering assist torque between when the sensor malfunction determination means determines that a malfunction has occurred in the rotational angle sensor and when the sensor malfunction determination means determines that there is no malfunction in the rotational angle sensor.

The electric power steering apparatus according to the first aspect of the invention includes the rotational angle sensor that actually detects the rotational angle (the rotational angle position) of the electric motor; and the rotational angle estimation means for estimating the rotational angle of the electric motor using the salient-polarity of the electric motor. When it is determined that there is no malfunction in the rotational angle sensor, the motor control means controls the rotation of the electric motor based on the information concerning the rotational angle from the rotational angle sensor. On the other hand, when it is determined that a malfunction has occurred in the rotational angle sensor, the motor control means controls the rotation of the electric motor based on the information concerning the rotational angle estimated by the rotational angle estimation means. The motor control means controls the rotation of the electric motor by executing the vector control indicated by a two-phase rotating flux coordinate system where the direction in which the electric motor rotates is used as the q-axis and the direction perpendicular to the direction in which the electric motor rotates is used as the d-axis.

The assist control means changes the control manner for causing the electric motor to produce the steering assist torque between when the sensor malfunction determination means determines that a malfunction has occurred in the rotational angle sensor and when the sensor malfunction determination means determines that there is no malfunction in the rotational angle sensor. Accordingly, it is possible to drive the electric motor through the sensorless control, and, in addition, to enhance the reliability of the electric power steering apparatus.

The assist control means may include assist stop means for stopping production of the steering assist torque, if the assist control means determines that a rotational angular speed of the electric motor is lower than a predetermined value when the sensor malfunction determination means determines that a malfunction has occurred in the rotational angle sensor.

With the thus configured electric power steering apparatus, when it is determined that a malfunction has occurred in the rotational angle sensor, the rotation of the electric motor is controlled based on the information concerning the rotational angle estimated by the rotational angle estimation means. If it is determined that the rotational angular speed of the electric motor is lower than the predetermined value, the assist stop means stops the production of the steering assist torque. When the rotational angle of the electric motor is estimated using the salient-polarity thereof, if the rotational angular speed of the electric motor is low, the deviation of the estimated rotational angle from the actual rotational angle is large. Therefore, according to the configuration described above, when the rotational angular speed of the electric motor is lower than the predetermined value, the production of the steering assist torque is stopped such that the motor control based on the estimated rotational angle is not executed. This is effective especially in the electric power steering apparatus that drives the electric motor at a considerably low speed, because the deviation of the estimated rotational angle from the actual rotational angle is likely to be large in such electric power steering apparatus. As a result, the reliability and safety of the electric power steering apparatus are enhanced. Whether the rotational angular speed of the electric motor is lower than the predetermined value is determined based on, for example, a degree of decrease in the amplitude of the counter-electromotive voltage produced by the rotation of the electric motor.

The assist control means may include assist torque decreasing means for decreasing the steering assist torque produced by the electric motor in accordance with a decrease in the rotational angular speed, if the assist control means determines that the rotational angular speed of the electric motor is lower than the predetermined value when the sensor malfunction determination means determines that a malfunction has occurred in the rotational angle sensor.

With the thus configured electric power steering apparatus, when it is determined that a malfunction has occurred in the rotational angle sensor, the rotation of the electric motor is controlled based on the information concerning the rotational angle estimated by the rotational angle estimation means. If the rotational angular speed of the electric motor is lower than the predetermined value, the assist torque decreasing means decreases the steering assist torque produced by the electric motor with a decrease in the rotational angular speed. Namely, when the rotational angular speed of the electric motor is low, namely, when the reliability of the estimated rotational angle is low, the steering assist torque is decreased with a decrease in the rotational angular speed. Accordingly, the influence of the deviation of the estimated rotational angle from the actual rotational angle on the assist torque is reduced, and therefore, a sense of discomfort felt by the driver is reduced. Preferably, the steering assist torque is decreased gradually as the rotational angular speed decreases.

The electric power steering apparatus may further include steering speed detection means for detecting a steering speed of the driver's steering wheel. The assist control means may determine whether the rotational angular speed of the electric motor is lower than the predetermined value based on the information detected by the steering speed detection means.

With the thus configured electric power steering apparatus, the steering speed detection means detects the steering speed of the driver's steering wheel. Because the driver's steering wheel and the electric motor are connected to each other by the steering mechanism, the steering speed and the rotational angular speed of the electric motor are proportional to each other. Accordingly, whether the rotational angular speed of the electric motor is lower than the predetermined value is determined based on the information detected by the steering speed detection means. As a result, it is possible to accurately determine whether the rotational angular speed of the electric motor is lower than the predetermined value, which enhances the reliability and safety of the electric power steering apparatus.

The steering speed detection means may include, for example, a steering angle sensor that detects a steering angle of the driver's steering wheel. The steering speed detection means may calculate the steering speed of the driver's steering wheel based on a temporal change (a derivative value) in the steering angle detected by the steering angle sensor. Instead of the steering angle sensor, for example, a resolver steering torque sensor may be used. The resolver steering torque sensor includes resolver sensors provided at the respective ends of a torsion bar, and determines the steering torque based on the difference between the rotational angles detected by the respective resolver sensors. Accordingly, the steering speed of the driver's steering wheel is calculated based on the temporal change (the derivative value) in the steering angle detected by the resolver sensor.

The assist control means may include pulsatile torque addition means for adding a pulsatile torque to the steering assist torque produced by the electric motor, when the sensor malfunction determination means determines that a malfunction has occurred in the rotational angle sensor.

With the thus configured electric power steering apparatus, when it is determined that a malfunction has occurred in the rotational angle sensor, the steering assist torque is produced by controlling the rotation of the electric motor based on the information concerning the rotational angle estimated by the rotational angle estimation means. At this time, the pulsatile torque addition means functions to add the pulsatile torque to the steering assist torque. For example, the new target steering assist torque is set to the value obtaining by adding the pulsatile torque to the target steering assist torque calculated based on the steering operation.

Accordingly, such addition of the pulsatile torque to the steering assist torque suppresses occurrence of the situation where the rotational angular speed of the electric motor is lower than the predetermined value. Therefore, the accuracy of the rotational angle of the electric motor estimated by the rotational angle estimation means improves. Preferably, the torque added to the steering assist torque is a high-frequency pulsatile torque.

The pulsatile torque may be a sine-wave torque.

With the thus configured electric power steering apparatus, even if the pulsatile torque is added to the steering assist torque, the rotational angle of the driver's steering wheel is smoothly changed, and therefore the driver does not easily feel a sense of discomfort. The sine-wave torque is a torque of which the wave-form, which indicates a temporal change in the torque value, is a sine wave-form in the graph where the lateral axis indicates the elapsed time and the vertical axis indicates the torque value.

The pulsatile torque may be a rectangular-wave torque or a trapezoidal-wave torque.

With the thus configured electric power steering apparatus, the time required to change the direction in which the electric motor rotates is reduced and the period during which the rotational angular speed of the electric motor is below the predetermined value is reduced. In addition, it is possible to stabilize the rotational angular speed of the electric motor. As a result, the accuracy of the estimated value obtained by the rotational angle estimation means further improves. Also, because periodic vibration is transmitted to the driver's steering wheel, it is easy to notify the driver of continuation of the malfunction state. The rectangular-wave torque or the trapezoidal-wave torque is a torque of which the wave-form, which indicates a temporal change in the torque value, is a rectangular wave-form or a trapezoidal wave-form in the graph where the lateral axis indicates the elapsed time and the vertical axis indicates the torque value.

A frequency of the pulsatile torque may be set to a value at which a transfer functional gain between the electric motor and the driver's steering wheel is equal to or lower than a predetermined value.

The transmissibility (the transfer functional gain) of the vibration caused due to the pulsatile torque to the driver's steering wheel depends on the frequency of the pulsatile torque. Therefore, according to the configuration described above, the frequency of the pulsatile torque is set such that the transfer functional gain between the electric motor and the driver's steering wheel is equal to or lower than the predetermined value. Therefore, it is possible to prevent a torque change and vibration from being transmitted to the driver's steering wheel, while maintaining the rotational angular speed of the electric motor at a high value. As a result, it is possible to minimize a sense of discomfort felt by the driver.

Using the sine-wave pulsatile torque as the additional torque is especially effective in reducing a sense of discomfort felt by the driver.

The assist control means may include target assist torque setting means for obtaining the steering torque information from a torque sensor that detects a steering torque applied to the driver's steering wheel, and that sets the target steering assist torque to a higher value as the steering torque is higher. The pulsatile torque addition means may stop the addition of the pulsatile torque to the steering assist torque, if the steering torque detected by the torque sensor is equal to or lower than a predetermined value when the sensor malfunction determination means determines that a malfunction has occurred in the rotational angle sensor.

With the thus configured electric power steering apparatus, the target assist torque setting means sets the target steering assist torque to a higher value as the steering torque is higher. Also, when the steering torque detected by the torque sensor is equal to or lower than the predetermined value, the pulsatile torque addition means stops operating to stop the addition of the pulsatile torque to the steering assist torque. Namely, when the steering torque is low and therefore the target steering torque is set to a low value, the driver easily feels torque fluctuations, from an ergonomics viewpoint. Accordingly, in such a case, the addition of the pulsatile torque to the steering assist torque is stopped to reduce a sense of discomfort given to the driver. For example, when the sine-wave additional torque, which is effective in reducing a sense of discomfort felt by the driver, is used, the threshold value (predetermined value) of the steering torque applied to the driver's steering wheel when the addition of the additional torque to the steering assist torque is stopped is preferably a value in the range of 1 Nm to 3 Nm.

The assist control means may stop the production of the steering assist torque, if the assist control means determines that the rotational angular speed of the electric motor is lower than the predetermined value when the sensor malfunction determination means determines that a malfunction has occurred in the rotational angle sensor and the addition of the pulsatile torque to the steering assist torque is stopped.

When the steering torque is lower than the predetermined value and the addition of the pulsatile torque to the steering assist torque is stopped, the state where the rotational angular speed of the electric motor is low may continue. In such a case, the deviation of the estimated rotational angle from the actual rotational angle is large. Therefore, according to the configuration described above, when the rotational angular speed of the electric motor is lower than the predetermined value, the production of the steering assist torque is stopped such that the motor control based on the estimated rotational angle is not executed. As a result, the reliability and safety of the electric power steering apparatus are enhanced.

The target assist torque setting means may store the relational data used to set the target steering assist torque based on the detected steering torque. The relational data may include the malfunction-time relational data that is used when the sensor malfunction determination means determines that a malfunction has occurred in the rotational angle sensor, and the normal-time relational data that is used when the sensor malfunction determination means determines that there is no malfunction in the rotational angle sensor. The malfunction-time relational data may be broader in assist dead band, in which the target steering assist torque is set to zero, than the normal-time relational data.

With the thus configured electric power steering apparatus, when it is determined that a malfunction has occurred in the rotational angle sensor, if the steering torque is lower than the predetermined value, the addition of the pulsatile torque to the steering assist torque is stopped. Further, in this state, if the rotational angular speed of the electric motor is lower than the predetermined value, the production of the steering assist torque is stopped. According to the configuration described above, the target assist torque setting means stores the relational data that associates the steering torque and the target steering assist torque with each other. The target assist torque stores the relational data used when it is determined that a malfunction has occurred in the rotational angle sensor and the relational data used when it is determined that no malfunction has occurred in the rotational angle sensor. When it is determined that a malfunction has occurred in the rotational angle sensor, the malfunction-time relational data is used. On the other hand, when it is determined that there is no malfunction in the rotational angle sensor, the normal-time relational data is used.

The malfunction-time relational data is broader in assist dead band, in which the target steering assist torque is set to zero, than the normal-time relational data. Namely, in the relational data that associates the steering torque and the target steering assist torque with each other, the target steering assist torque is set to zero in the range in which the steering torque is lower than the predetermined value. The malfunction-time relational data is broader in the width of the assist dead band, in which the target steering assist torque is set to zero, than the normal-time relational data. Accordingly, when the rotational angular speed of the electric motor is lower than the predetermined value and the production of the steering assist torque is stopped, an abrupt change in the steering torque does not occur, and therefore the driver does not feel a sense of discomfort. Namely, increasing the width of the steering toque dead band makes it possible to set the target steering assist torque to zero or a considerably low value when the production of the steering assist torque is stopped. As a result, an abrupt change in the steering torque is prevented.

The target assist torque setting means may store the relational data used to set the target steering assist torque based on the detected steering torque. The relational data may include the malfunction-time relational data that is used when the sensor malfunction determination means determines that a malfunction has occurred in the rotational angle sensor, and the normal-time relational data that is used when the sensor malfunction determination means determines that there is no malfunction in the rotational angle sensor. The target steering assist torque set using the malfunction-time relational data may be lower the target steering assist torque set using the normal-time relational data.

With the thus configured electric power steering apparatus, the target steering assist torque corresponding to a given steering torque varies between when it is determined that there is no malfunction in the rotational angle sensor and when it is determined that a malfunction has occurred in the rotational angle sensor. The target steering assist torque used when it is determined that a malfunction has occurred in the rotational angle sensor is set to a value lower than the target assist torque used when it is determined that there is no malfunction in the rotational angle sensor. Accordingly, the driver can safely recognize that the malfunction state continues by a heavier feel in the steering operation of the driver's steering wheel than usual.

The pulsatile torque addition means may decrease the amplitude of the pulsatile torque with a decrease in the target steering assist torque, and increase the amplitude of the pulsatile torque with an increase in the target steering assist torque.

In the thus configured electric power steering apparatus, the stiffness of the steering system is changed based on the steering assist torque. A spring body (for example, a torsion bar) is included in the steering mechanism arranged between the driver's steering wheel and the steering wheel. The degree to which the spring body is twisted changes in accordance with the steering assist torque, and the stiffness of the steering system changes. For example, when a low steering assist torque is applied, the stiffness of the steering system is low. On the other hand, when a high steering assist torque is applied, the stiffness of the steering system is high. Accordingly, when a constant degree of additional torque is set to be produced by the electric motor, an increase in the amplitude, which is required to maintain the motor rotational angular speed equal to or higher than the predetermined value, cannot be achieved if the stiffness of the steering system is not appropriate.

With the electric power steering apparatus according to the first aspect of the invention, the amplitude of the additional torque is increased with an increase in the target steering assist torque. Thus, it is possible to constantly achieve a required increase in the amplitude. As a result, the rotational angular speed of the electric motor is constantly maintained equal to or higher than the predetermined value. It is therefore possible to enhance the accuracy of the estimated rotational angle obtained by the rotational angle estimation means. As a result, the reliability and safety of the electric power steering apparatus are enhanced.

The electric power steering apparatus may further include a steering sensor that detects the steering state of the driver's steering wheel. The assist control means may include target wave-form determination means for determining a target wave-form of the pulsatile torque added to the steering assist torque based on at least the steering state detected by the steering sensor.

With the thus configured electric power steering apparatus, the optimum torque is added to the steering assist torque, because the target wave-form determination means determines the target wave-form of the pulsatile torque. For example, when the rotational angular speed of the electric motor needs to be maintained as high as possible, the rotational angular speed of the electric motor is made to have a rectangular wave-form. When the rotational speed of the electric motor needs to be maintained high while transmission of the pulsatile torque to the driver needs to be suppressed, the rotational angular speed of the electric motor is made to have a sine wave-form. In order to achieve the target wave-form of the rotational angular speed of the electric motor, the target wave-form of the pulsatile torque produced by the electric motor (i.e., target current wave-form) is determined.

In this case, for example, the target wave-form determination means may determine the target wave-form based on a steering system model. The steering system model is set based on the stiffness of the system, the inertia of the system, the mass of the system, the steering assist torque, etc. The stiffness of the system and the steering assist torque are set based on the parameters, for example, the steering state amounts such as the steering angle and the steering torque, and the vehicle speed. Therefore, at least the steering state amount is used as the parameter, and the target wave-form of the pulsatile torque is determined based on the parameter. As a result, the pulsatile torque having a desired wave-form is added to the steering assist torque.

The electric power steering apparatus may further include a variable stiffness body which is provided at a connection portion between the rotating shaft of the electric motor and the steering mechanism, and of which the stiffness is lower in the low-torque range, in which the electric motor produces a low rotary torque, than in the high-torque range, in which the electric motor produces a high rotary torque.

The rotational angular speed of the electric motor is maintained equal to or higher than the predetermined value by adding the pulsatile torque to the steering assist toque, whereby the accuracy of the estimated rotational angle is ensured. However, the pulsatile torque may be transmitted to the driver's steering wheel and the driver may feel a sense of discomfort. Therefore, according to the configuration described above, the variable stiffness body is provided at the connection portion between the rotating shaft of the electric motor and the steering mechanism. The stiffness of the variable stiffness body is lower in the low-torque range than in the high-torque range. Thus, the pulsatile torque is not easily transmitted to the driver's steering wheel.

Generally, when the steering torque applied to the driver's steering wheel is low, the driver is likely to feel torque fluctuations. In such a case, the steering assist torque produced by the electric motor is also low. At this time, the stiffness of the variable stiffness body provided at the connection portion between the rotating shaft of the electric motor and the steering mechanism is low. Accordingly, when the pulsatile additional torque is produced by the electric motor, generation of the vibration (pulsatile rotation of the motor) is unlikely to be interfered with, and a predetermined rotational angular speed of the electric motor is ensured. In addition, because being absorbed in the variable stiffness body, the vibration is not easily transmitted toward the steering mechanism.

When the driver's steering wheel is turned strongly, a high steering assist torque is required, and the electric motor produces a high torque. In such a case, because the stiffness of the variable stiffness body provided at the connection portion between the rotating shaft of the electric motor and the steering mechanism is high, the rotary torque produced by the electric motor is reliably transmitted to the steering mechanism, and an appropriate steering assist torque is produced. When the steering torque is high, the driver does not easily feel the toque fluctuations due to the pulsatile torque. Accordingly, the driver does not easily feel a sense of discomfort.

The electric power steering apparatus may further include stiffness characteristic changing means for selectively changing the stiffness characteristic at the connection portion between the rotating shaft of the electric motor and the steering mechanism. The stiffness characteristic changing means may change the stiffness characteristic between the first stiffness characteristic and the second stiffness characteristic. Based on the first stiffness characteristic, the stiffness in the low torque range, in which the electric motor produces a low rotary torque, is lower than the stiffness in the high torque range, in which the electric motor produces a high rotary torque. Based on the second stiffness characteristic, the stiffness, substantially equal to the stiffness in the high torque range based on the first stiffness characteristic, is achieved in both the low torque range and the high torque range. The stiffness characteristic changing means may select the first stiffness characteristic when the sensor malfunction determination means determines that a malfunction has occurred in the rotational angle sensor, and may select the second stiffness characteristic when the sensor malfunction determination means determines that there is no malfunction in the rotational angle sensor.

With the thus configured electric power steering apparatus, the stiffness characteristic at the connection portion between the rotating shaft of the electric motor and the steering mechanism is changed by the stiffness characteristic changing means between when it is determined that a malfunction has occurred in the rotational angle sensor and when it is determined that there is no malfunction in the steering angle sensor. When it is determined that a malfunction has occurred in the rotational angle sensor, the first stiffness characteristic is selected. When the first stiffness characteristic is selected, the stiffness at the connection portion between the rotating shaft of the electric motor and the steering mechanism changes between when the steering assist torque is low and when the steering assist toque is high.

When the steering assist torque is low, the stiffness of the connection portion between the rotating shaft of the electric motor and the steering mechanism is low. Accordingly, when the electric motor produces the pulsatile additional torque, generation of the vibration (pulsatile rotation of the motor) is unlikely to be interfered with, and the predetermined rotational angular speed of the electric motor is ensured. In addition, because being absorbed in the connection portion having a low stiffness, the vibration is not easily transmitted toward the steering mechanism. Accordingly, it is possible to ensure the predetermined rotational angular speed of the electric motor, and to suppress transmission of the vibration to the driver's steering wheel.

When the steering assist torque is high, because the stiffness of the connection portion between the rotating shaft of the electric motor and the steering mechanism is high, the rotary torque produced by the electric motor is reliably transmitted to the steering mechanism, and an appropriate steering assist torque is produced. When the steering torque is high, the driver does not easily feel torque fluctuations due to the pulsatile torque. As a result, the driver does not easily feel a sense of discomfort.

When it is determined that there is no malfunction in the rotational angle sensor, the second stiffness characteristic is selected. Because the stiffness of the connection portion between the rotating shaft of the electric motor and the steering mechanism is high, the rotary torque produced by the electric motor is reliably transmitted to the steering mechanism, and an appropriate steering assist torque is produced. When it is determined that there is no malfunction in the rotational angle sensor, the electric motor does not produce the pulsatile additional torque. Accordingly, the vibration due to the additional torque is not transmitted to the driver's steering wheel.

The electric power steering apparatus may further include a gear ratio changing device that changes a steering gear ratio that is a ratio of a steering angle of the driver's steering wheel to a steering angle of the steering wheel; and gear ratio control means for controlling the gear ratio changing device and synchronizing a change in the rotation of the electric motor and a change in the pulsatile torque with each other such that the pulsatile torque added to the steering assist torque is not transmitted to the driver's steering wheel.

With the thus configured electric power steering apparatus, the gear ratio control means controls the gear ratio changing device and synchronizes a change in the rotation of the electric motor and a change in the pulsatile torque with each other such that the pulsatile torque added to the steering assist torque is not transmitted to the driver's steering wheel. Accordingly, it is possible to ensure the predetermined rotational angular speed of the electric motor, and to suppress transmission of the vibration to the driver's steering wheel. The gear ratio changing device is fitted to, for example, the steering shaft that is connected to the driver's steering wheel, and adjusts the ratio between the output rotational angle of the steering shaft and the input rotational angle of the driver's steering wheel.

A second aspect of the invention relates to an electric power steering apparatus including a steering mechanism that steers a steering wheel in response to a steering operation of a driver's steering wheel; an electric motor that is fitted to the steering mechanism, that produces a steering assist torque used to assist the steering operation of the driver's steering wheel, and that is formed of a salient-pole permanent magnet motor; rotational angle information obtaining means for obtaining the information concerning a rotational angle of the electric motor; motor control means for controlling the rotation of the electric motor based on the information concerning the rotational angle obtained by the rotational angle information obtaining means; and assist control means for calculating a target steering assist torque based on the steering operation of the driver's steering wheel, and for providing the motor control means with a command to supply electricity to the electric motor to cause the electric motor to produce the steering assist torque based on the calculated target steering assist torque. The rotational angle information obtaining means includes rotational angle estimation means for estimating the rotational angle of the electric motor using at least the salient-polarity of the electric motor. The assist control means changes the control manner for causing the electric motor to produce the steering assist torque between when a rotational angular speed of the electric motor is lower than a predetermined value and when the rotational angular speed of the electric motor is equal to or higher than the predetermined value.

In the thus configured electric power steering apparatus, the rotational angle estimation means for estimating the rotational angle of the electric motor using the salient-polarity of the electric motor is provided. The motor control means controls the rotation of the electric motor based on the information concerning the estimated rotational angle. The assist control means calculates the target steering assist torque based on the steering operation of the driver's steering wheel, and provides the motor control means with a command to supply electricity to the electric motor to cause the electric motor to produce the steering assist torque based on the calculated target steering assist torque.

When the rotational angle of the electric motor is estimated using the salient-polarity thereof, if the rotational angular speed of the electric motor is low, the deviation of the estimated rotational angle from the actual rotational angle is large. Therefore, according to the configuration described above, the control manner for causing the electric motor to produce the steering assist torque is changed between when the rotational angular speed of the electric motor is lower than the predetermined value and when the rotational angular speed of the electric motor is equal to or higher than the predetermined value. Accordingly, the electric motor is driven through the sensorless control, and the reliability of the electric power steering apparatus is enhanced.

The assist control means may include assist stop means for stopping the production of the steering assist torque, when the rotational angular speed of the electric motor is lower than the predetermined value.

With the thus configured electric power steering apparatus, when the rotational angle of the electric motor is lower than the predetermined value, the assist stop means stops the production of the steering assist torque. When the rotational angle of the electric motor is estimated using the salient-polarity thereof, if the rotational angular speed of the electric motor is low, the deviation of the estimated rotational angle from the actual rotational angle is large. Accordingly, when the rotational angular speed of the electric motor is lower than the predetermined value, the production of the steering assist torque is stopped such that the motor control based on the estimated rotational angle is not executed. This is effective especially in the electric power steering apparatus that drives the electric motor at a considerably low speed, because the deviation of the estimated rotational angle from the actual rotational angle is likely to be large in such an electric power steering apparatus. As a result, the reliability and safety of the electric power steering apparatus are enhanced. Whether the rotational angular speed of the electric motor is lower than the predetermined value is determined based on, for example, a degree of decrease in the amplitude of the counter-electromotive voltage produced by the rotation of the electric motor.

The assist control means may include assist torque decreasing means for decreasing the steering assist torque produced by the electric motor in accordance with a decrease in the rotational angular speed, when it is determined that the rotational angular speed of the electric motor is lower than the predetermined value.

With the thus configured electric power steering apparatus, when the rotational angular speed of the electric motor is lower than the predetermined value, the assist torque decreasing means decreases the steering assist torque produced by the electric motor with a decrease in the rotational angular speed. Namely, when the rotational angular speed of the electric motor is low, namely, when the reliability of the estimated rotational angle is low, the steering assist torque is decreased with a decrease in the rotational angular speed. Accordingly, the influence of the deviation of the estimated rotational angle from the actual rotational angle on the assist torque is reduced, and a sense of discomfort felt by the driver is reduced. Preferably, the steering assist torque is gradually decreased with a decrease in the rotational angular speed.

BRIEF DESCRIPTION OF THE DRAWINGS

The foregoing and further objects, features and advantages of the invention will become apparent from the following description of example embodiments with reference to the accompanying drawings, wherein the same or corresponding portions will be denoted by the same reference numerals and wherein:

FIG. 1 is a view schematically showing an electric power steering apparatus according to each embodiment of the invention;

FIG. 4 is a block diagram showing the functional configuration of an electronic control unit according to a third embodiment of the invention;

FIG. 18 is a graph showing the relationship between the frequency of the sine-wave torque and the amplitude of the vibration transmitted to a driver's steering wheel according to the fourth embodiment of the invention;

FIGS. 19A and 19B illustrate graphs each showing the relationship between the steering torque and the torque addition gain K2x according to the fifth embodiment of the invention;

FIG. 21 illustrates graphs showing time-changes in the rectangular-wave torque, the motor rotational angle, and the motor rotational angular speed according to the seventh embodiment of the invention;

FIG. 22 is a graph showing a time-change in the trapezoidal-wave torque according to the seventh embodiment of the invention;

DETAILED DESCRIPTION OF EMBODIMENTS

Figure 2:
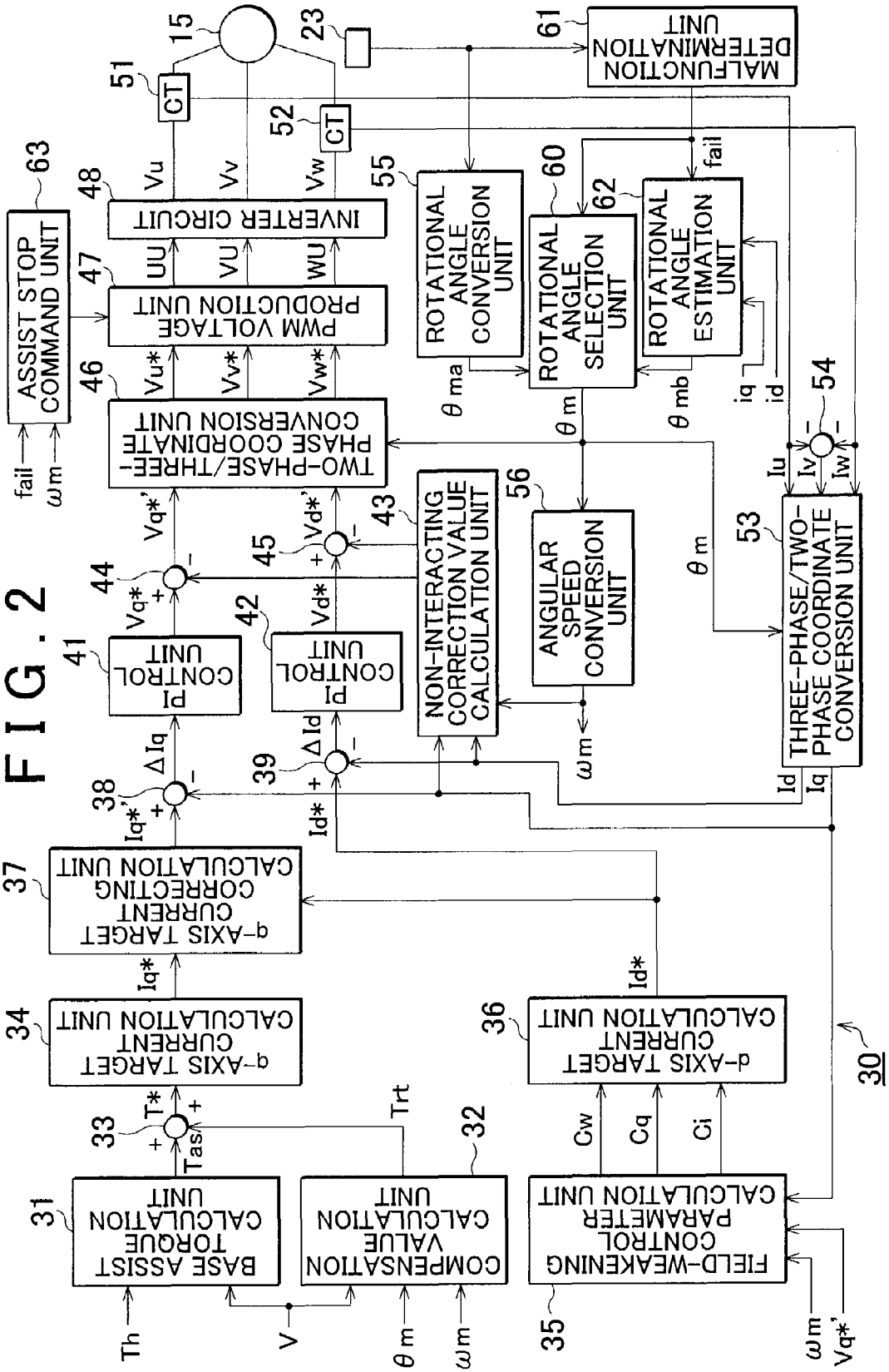
FIG. 2 is a block diagram showing the functional configuration of an electronic control unit according to a first embodiment of the invention.

Hereafter, an electric power steering apparatus for a vehicle according to each embodiment of the invention will be described with reference to the accompanying drawings. FIG. 1 is a view schematically showing an electric power steering apparatus for a vehicle according to a first embodiment of the invention.

The electric power steering apparatus for a vehicle mainly includes a steering mechanism 10 that steers steering wheels of a vehicle in response to the turning operation of a driver's steering wheel 11; an electric motor 15 that is fitted to the steering mechanism 10 and that produces a steering assist torque; and an electronic control unit 30 that controls the operation of the electric motor 15 in response to the turning operation of the driver's steering wheel 11.

The electric power steering apparatus includes a steering shaft 12 that is connected, at its upper end, to the driver's steering wheel 11 so as to rotate together with the driver's steering wheel 11. A pinion gear 13 is connected to the lower end of the steering shaft 12 so as to rotate together with the steering shaft 12. The pinion gear 13 meshes with rack teeth formed in a rack bar 14, whereby a rack-and-pinion mechanism is formed. A left front wheel FW1 and a right front wheel FW2 are connected to the respective ends of the rack bar 14 via tie rods (not shown) and knuckle arms (not shown) so that the front wheels FW1 and 2 can be steered. The left front wheel FW1 and the right front wheel FW2 are steered in the clockwise direction or in the counterclockwise direction in accordance with the movement of the rack bar 14 in its axial direction, which is caused due to the rotation of the steering shaft 12 about its axis. Accordingly, the driver's steering wheel 11, the steering shaft 12, the rack-and-pinion mechanism 13, 14, the tie rods, the knuckle arms, etc. constitute the steering mechanism 10.

The electric motor 15 used to assist the turning operation of the driver's steering wheel 11 is fitted to the rack bar 14. The electric motor 15 is formed of a brushless motor that is a salient-pole three-phase permanent magnet motor. The rotating shaft of the electric motor 15 is connected to the rack bar 14 via a ball screw mechanism 16 so that power is transmitted from the electric motor 15 to the rack bar 14. The rotation of the rotating shaft of the electric motor 15 assists the steering operation of the left front wheel FW1 and the right front wheel FW2. The ball screw mechanism 16 serves as a speed reducer and a rotational-linear movement converter. The ball screw mechanism 16 reduces the speed of rotation transmitted from the electric motor 15, converts the rotational movement of the electric motor 15 to the linear movement, and transmits the linear movement to the rack bar 14. Instead of being fitted to the rack bar 14, the electric motor 15 may be fitted to the steering shaft 12. Then, the rotation of the electric motor 15 may be transmitted to the steering shaft 12 via a speed reducer to drive the steering shaft 12 so that the steering shaft 12 is caused to rotate about its axis.

A steering torque sensor 21 is fitted to the steering shaft 12. The steering torque sensor 21 includes a torsion bar 21c, of which the upper end is connected to the upper portion of the steering shaft 12 and of which the lower end is connected to the lower portion of the steering shaft 12, and resolver sensors 21a and 21b that are fitted to the upper end and the lower end of the torsion bar 21c, respectively. The resolver sensors 21a and 21b detect the rotational angles of the torsion bar 21c at its upper end and lower end, and outputs signals indicating the detected rotational angles. When the driver's steering wheel 11 is turned, the steering torque is applied to the steering shaft 12, whereby the torsion bar 21c is twisted.

The steering torque sensor 21 outputs signals indicating the rotational angles in accordance with the torsional angle of the torsion bar 21c, which are detected by the two resolver sensors 21a and 21b. Accordingly, the steering torque corresponding to the torsional angle of the torsion bar 21c is detected based on the signals output from the steering torque sensor 21. In this specification, a signal output from the steering torque sensor 21 is used as a signal indicating the steering torque Th. When being a positive value, the steering torque Th indicates the magnitude of the steering torque produced when the driver's steering wheel 11 is turned clockwise. When being a negative value, the steering torque Th indicates the magnitude of the steering torque produced when the driver's steering wheel 11 is turned counterclockwise. Instead of being fitted to the steering shaft 12, the steering torque sensor 21 may be fitted to the rack bar 14. The steering torque may be detected based on the amount by which the rack bar 14 is moved in its axial direction.

The electric motor 15 is provided with a rotational angle sensor 23. The rotational angle sensor 23 is embedded in the electric motor 15, and outputs a detection signal corresponding to the rotational angle position of a rotor of the electric motor 15. The rotational angle sensor 23 is formed of, for example, a resolver sensor. The detection signal from the rotational angle sensor 23 is used to calculate the rotational angle $\theta m$ and the rotational angular speed $\theta m$ of the electric motor 15. The rotational angle $\theta m$ of the electric motor 15 is proportional to the steering angle of the driver's steering wheel 11. Accordingly, the rotational angle $\theta m$ is used also as the steering angle of the driver's steering wheel 11, in this specification. Also, the rotational angular speed $\theta m$ of the electric motor 15 is proportional to the steering angular speed of the driver's steering wheel 11. Accordingly, the rotational angular speed $\theta m$ of the electric motor 15 is used also as the steering angular speed of the driver's steering wheel 11, in this specification.

Next, the electronic control unit 30 that controls the operation of the electric motor 15 will be described. The electronic control unit 30 is formed mainly of a microcomputer including a CPU, ROM, RAM, etc. and includes a drive circuit for the electric motor 15. The electronic control unit 30 receives detection signals from the steering torque sensor 21, the rotational angle sensor 23, and a vehicle speed sensor 22 that are all connected to the electronic control unit 30. The vehicle speed sensor 22 outputs a vehicle speed signal V that indicates the speed at which the vehicle is moving.

Next, the electronic control unit 30 according to the first embodiment of the invention will be described in detail. FIG. 2 is a block diagram showing the entirety of the electronic control unit 30 including the functional block of the microcomputer, which is implemented by executing the programs. The electronic control unit 30 controls the rotation of the electric motor 15 by executing vector control indicated by a two-phase rotating flux coordinate system where the direction in which the electric motor 15 rotates is used as the q-axis and the direction perpendicular to the direction in which the electric motor 15 rotates is used as the d-axis. In other words, the d-axis indicates the direction in which the magnetic field formed by the permanent magnets of the electric motor 15 extends, and the q-axis indicates the direction that is perpendicular to the direction in which the magnetic field extends, namely, the direction in which the torque produced by the electric motor 15 is applied.

The electronic control unit 30 switches the control mode between the control which is executed when a malfunction is not detected in the rotational angle sensor 23 that detects the rotational angle of the electric motor 15 and the control that is executed when a malfunction is detected in the rotational angle sensor 23. First, the configuration of the function that is executed when a malfunction is not detected will be described. Then, the configuration of the additional function that is executed when a malfunction is detected will be described.

Figure 35:
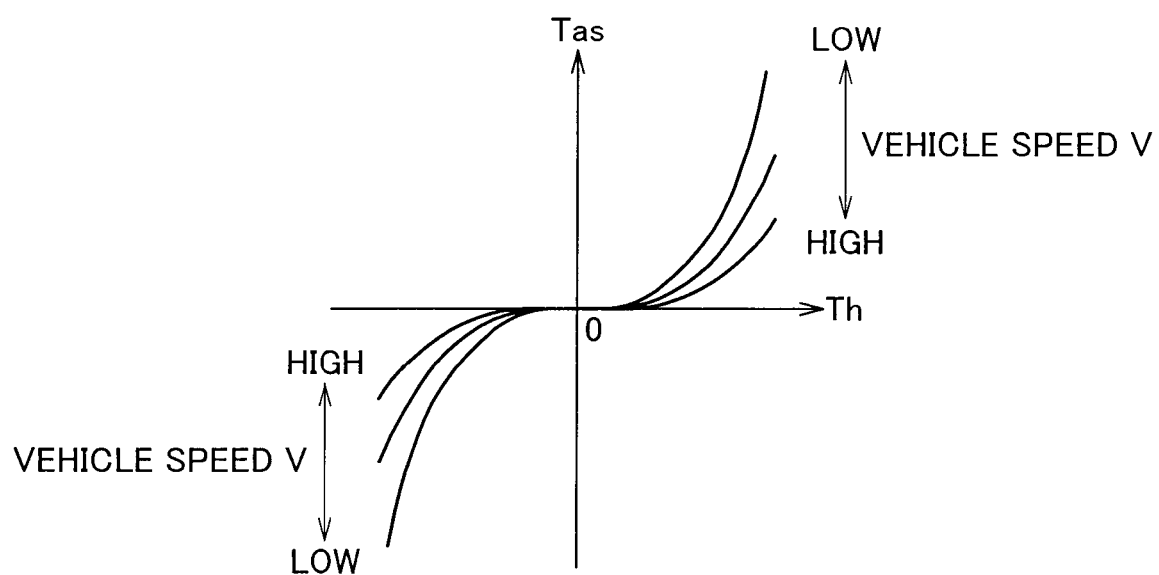
FIG. 35 is a graph showing the assist map according to each embodiment of the invention.

The electronic control unit 30 includes a base assist torque calculation unit 31 and a compensation value calculation unit 32. The base assist torque calculation unit 31 stores the base assist map used to set the base assist torque Tas based on the steering torque Th and the vehicle speed V, as shown in FIG. 35. The base assist torque calculation unit 31 receives the information concerning the steering torque Th from the steering torque sensor 21 and the information concerning the vehicle speed V from the vehicle speed sensor 22, and calculates the base assist torque Tas with reference to the base assist map. In this case, the base assist torque Tas increases as the steering torque Th increases, and decreases as the vehicle speed V increases. In the first embodiment of the invention, the base assist torque Tas is calculated with reference to the base assist map. Alternatively, a function that defines the base assist torque Tas which changes in accordance with the steering torque Th and the vehicle speed V may be prepared, and the base assist torque Tas may be calculated using the function.

The compensation value calculation unit 32 receives signals indicating the rotational angle $\theta m$ of the electric motor 15 (corresponding to the steering angle of the driver's steering wheel 11) and the rotational angular speed $\theta m$ of the electric motor 15 (corresponding to the steering angular speed of the driver's steering wheel 11) as well as a signal indicating the vehicle speed V, and calculates the compensation value Trt corresponding to the base assist torque Tas. Namely, the compensation value calculation unit 32 calculates the compensation value Trt basically by adding the force of the steering shaft 12 to return to the reference position, which increases in proportion to the steering angle, to the returning torque corresponding to the resistance force against the rotation of the steering shaft 12, which increases in proportion to the steering angular speed. The compensation value Trt increases with an increase in the vehicle speed V.

Signals indicating the base assist torque Tas and the compensation value Trt are transmitted to a calculation unit 33. The calculation unit 33 adds the base assist torque Tas to the compensation value Trt, and transmits a signal indicating the target command torque T*, which is the result of addition, to a q-axis target current calculation unit 34. Accordingly, in the first embodiment of the invention, the base assist torque calculation unit 31, the compensation value calculation unit 32 and the calculation unit 33 constitute target assist torque setting means according to the invention.

The q-axis target current calculation unit 34 calculates the q-axis target current Iq* that is proportional to the target command torque T*. The q-axis target current Iq* is the q-axis component current in the vector control indicated by the two-phase rotating flux coordination system, and used to control the magnitude of the rotary torque produced by the electric motor 15.

The electronic control unit 30 includes a field-weakening control parameter calculation unit 35 related to the field-weakening control for implementing the more compact, higher-powered and higher-performance electric motor 15. The field-weakening control parameter calculation unit 35 receives signals indicating the rotational angular speed ωm of the electric motor 15, the q-axis command voltage Vq*' for the electric motor 15, and the q-axis actual current Iq of the electric motor 15, and calculates the first parameter Cw, the second parameter Cq and the third parameter Ci corresponding to the rotational angular speed ωm, the q-axis command voltage Vq*', and the q-axis actual current Iq using the first, second, and third parameter maps, respectively. Signals indicating the first to third parameters Cw, Cq and Ci are transmitted to a d-axis target current calculation unit 36. The d-axis target current calculation unit 36 multiples the first to third parameters Cw, Cq and Ci by the positive coefficient k to calculate the d-axis target current Id*(=k×Cw×Cq×Ci). The d-axis target current Id* is the d-axis component current in the vector control indicated by the two-phase rotating flux coordination system, and used to weaken the magnetic field of the electric motor 15.

Figure 36:
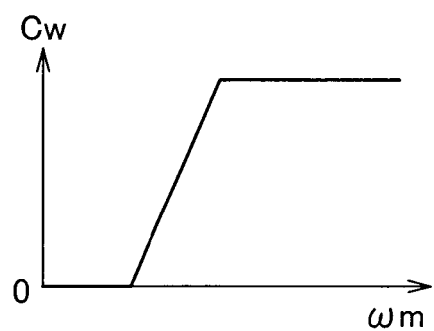
FIG. 36 is a graph showing the relationship between the motor speed and the first parameter according to each embodiment of the invention.

Next, the first to third parameters Cw, Cq and Ci will be described. As shown in the graph in FIG. 36, the first parameter map stores the first parameter Cw that is 0 when the rotational angular speed ωm of the electric motor 15 is low, and that is a substantially constant positive value when the motor rotational angular speed ωm is high. In other words, the first parameter map stores the first parameter Cw that increases until the motor rotational angular speed ωm reaches a predetermined value. Accordingly, the first parameter Cw set based on this characteristic signifies that the field-weakening current is made high when the motor speed of the electric motor 15 is high, and changes the characteristic of the electric motor 15 so that a higher priority is given to the motor speed rather than the output torque. Also, the first parameter Cw is set such that an unnecessary field-weakening current is prevented from flowing when the motor speed of the electric motor 15 is low, namely, when the driver's steering wheel 11 is turned gradually.

Figure 37:
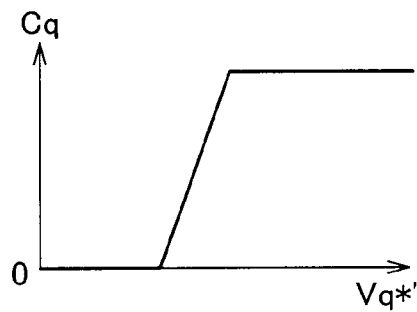
FIG. 37 is a graph showing the relationship between the q-axis command voltage and the second parameter according to each embodiment of the invention.

As shown in the graph in FIG. 37, the second parameter map stores the second parameter Cq that is 0 when the q-axis command voltage Vq*' of the electric motor 15 is low and that is a substantially constant positive value when the q-axis command voltage Vq*' is high. In other words, the second parameter map stores the second parameter Cq that increases until the q-axis command voltage Vq*' reaches a predetermined value. A high q-axis command voltage Vq*' signifies that the q-axis command current ΔIq, described later in detail, is high, namely, the deviation of the actual q-axis current Iq of the electric motor 15 from the q-axis target current Iq*' (the q-axis corrected target current Iq*') is large. As the deviation increases, the field-weakening current of the electric motor 15 increases. The second parameter Cq is set such that, when the driver's steering wheel 11 is turned gradually and slightly while the vehicle is moving, the motor speed of the electric motor 15 is increased by executing the field-weakening control if the deviation is large, and an unnecessary field-weakening current is prevented from flowing when the deviation is small.

Figure 38:
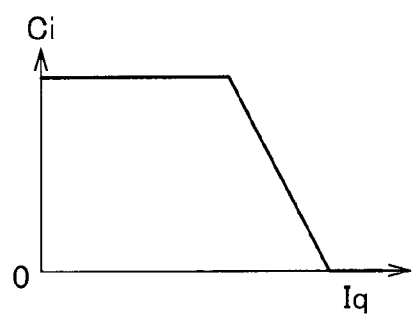
FIG. 38 is a graph showing the relationship between the q-axis actual current and the third parameter according to each embodiment of the invention.

As shown in the graph in FIG. 38, the third parameter map stores the third parameter Ci that is a substantially constant positive value when the q-axis actual current Iq is low, and that is 0 when the q-axis actual current Iq is high. In other words, the third parameter map stores the third parameter Ci that decreases as the q-axis actual current Iq increases after reaching a predetermined value. The third parameter Ci is set so as to prevent the situation where a higher steering torque needs to be applied to the driver's steering wheel 11 due to a decrease in the steering assist torque produced by the electric motor 15 if the driver's steering wheel 11 is turned more quickly when the rotational angular speed cm of the electric motor 15 is high. In the first embodiment of the invention, the first to third parameters Cw, Cq and Ci are calculated using the first to third parameter maps, respectively. Instead of using these parameter maps, the functions that define the first to third parameters Cw, Cq and Ci which change based on the motor rotational angular speed ωm, the q-axis command voltage Vq*' and the q-axis actual current Iq, respectively, may be prepared, and the first to third parameters Cw, Cq and Ci may be calculated using these functions.

Figure 39:
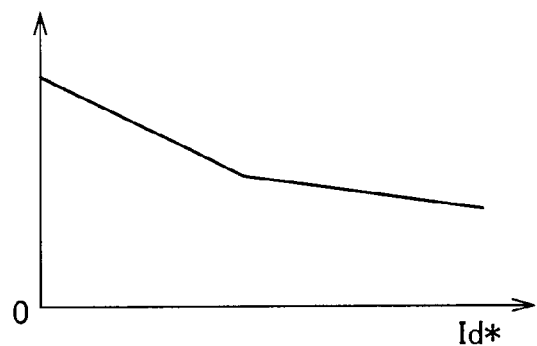
FIG. 39 is a graph showing the relationship between the d-axis target current and the correction coefficient α according to each embodiment of the invention.

Signals indicating the calculated q-axis target current Iq* and d-axis target current Id* are transmitted to a q-axis target current correcting calculation unit 37. The q-axis target current correcting calculation unit 37 receives a signal indicating the q-axis target current Iq* from the q-axis target current calculation unit 34 and a signal indicating the d-axis target current Id* from the d-axis target current calculation unit 36. Then, the q-axis target current correcting calculation unit 37 calculates the correction coefficient α corresponding to the d-axis target current Id* with reference to the correction coefficient map shown in FIG. 39, and calculates the q-axis corrected target current Iq* which is obtained by dividing the q-axis target current Iq* by the correction coefficient α (Iq*'=Iq*/α). Then, the q-axis target current correcting calculation unit 37 transmits a signal indicating the q-axis corrected target current Iq*', which is the result of division, to a calculation unit 38.

The correction coefficient map is stored in the q-axis target current correcting calculation unit 37. The correction coefficient map stores the correction coefficient α that is a positive value and that decreases as the d-axis target current Id* increases. Thus, as the d-axis target current Id* increases, the q-axis corrected target current Iq*' that is derived through correction of the q-axis target current Iq* increases. In the first embodiment of the invention, the correction coefficient α is calculated using the correction coefficient map. Instead of using the correction coefficient map, the function that defines the correction coefficient α which changes based on the d-axis target current Id* may be prepared, and the correction coefficient α may be calculated using the function.

The calculation unit 38 subtracts the q-axis actual current Iq from the q-axis corrected target current Iq*', and transmits a signal indicating the result of subtraction, that is, the q-axis command current ΔIq to a proportional-integral control unit (PI control unit) 41. A calculation unit 39 subtracts the d-axis actual current Id from the d-axis target current Id*, and transmits a signal indicating the result of subtraction, that is, the d-axis command current ΔId, to a proportional-integral control unit (PI control unit) 42. The proportional-integral control units 41 and 42 calculate the q-axis command voltage Vq* and the d-axis command voltage Vd* based on the q-axis command current ΔIq and the d-axis command current ΔId such that the q-axis actual current Iq and the d-axis actual current Id become substantially equal to the q-axis corrected target current Iq*' and the d-axis target current Id*, respectively.

The q-axis command voltage Vq* calculated by the proportional-integral control unit 41 and the d-axis command voltage Vd* calculated by the proportional-integral control unit 42 are corrected to the q-axis corrected command voltage Vq*' and the d-axis corrected command voltage Vd*' by a non-interacting correction value calculation unit 43, a calculation unit 44 and a calculation unit 45. Then, signals indicating the q-axis corrected command voltage Vq*' and the d-axis corrected command voltage Vd*' are transmitted to a two-phase/three-phase coordinate conversion unit 46. The non-interacting correction value calculation unit 43 calculates the non-interacting correction value $-\omega m \times (\phi a + La \times Id)$ and the non-interacting correction value $\omega m \times La \times Iq$ for the q-axis command voltage Vq* and the d-axis command voltage Vd* based on the q-axis actual current Iq, the d-axis actual current Id and the motor rotational angular speed ωm. The inductance La and the magnetic flux φa are the constants set in advance.

The calculation units 44 and 45 calculate the q-axis corrected command voltage Vq*' (=Vq*+ωm×(φa+La×Id)) and the d-axis corrected command voltage Vd*' (=Vd*−ωm×La× Iq) by subtracting the non-interacting correction value −ωm× (φa+La×Id) and the non-interacting correction value ωm×La×Iq from the q-axis command voltage Vq* and the d-axis command voltage Vd*, respectively.

The two-phase/three-phase coordinate conversion unit 46 converts the q-axis corrected command voltage Vq*' and the d-axis corrected command voltage Vd*' into the three-phase command voltages Vu*, Vv* and Vw*, and transmits signals indicating the three-phase command voltages Vu*, Vv* and Vw* to a PWM voltage production unit 47. The PWM voltage production unit 47 transmits PWM control voltage signals UU, VU and WV that correspond to the three-phase command voltages Vu*, Vv* and Vw*, respectively, to an inverter circuit 48. The inverter circuit 48 produces the three-phase exciting voltages Vu, Vv and Vw that correspond to the PWM control voltage signals UU, VU and WV, respectively, and applies the exciting voltages Vu, Vv and Vw to the electric motor 15 through the three-phase exciting current paths.

Current sensors 51 and 52 are provided on the respective two exciting current paths among the three-phase exciting current paths. The current sensors 51 and 52 detect the respective two exciting currents Iu and Iw among the three-phase exciting currents Iu, Iv and Iw for the electric motor 15, and transmits signals indicating the exciting currents Iu and Iw to a three-phase/two-phase coordinate conversion unit 53. A signal indicating the exciting current Iv calculated by a calculation unit 54 based on the actual currents Iu and Iw is also transmitted to the three-phase/two-phase coordinate conversion unit 53. The three-phase/two-phase coordinate conversion unit 53 converts the three-phase actual currents Iu, Iv and Iw to the two-phase actual currents Id and Iq.

A signal from the rotational angle sensor 23 is transmitted to a rotational angle conversion unit 55 and a malfunction determination unit 61. A resolver sensor that is used as the rotational angle sensor 23 includes a resolver rotor (not shown) that rotates together with the rotor of the electric motor 15, and a resolver stator that is fixed to a motor casing. A primary coil that is an exciting coil is fitted to the resolver rotor, and secondary coils formed of paired detection coils which differ from each other in phase by π/2 are fitted to the resolver stator. The secondary coils are caused to output two respective types of induced voltage signals by exciting the primary coil using a sine-wave signal. The rotational angle conversion unit 55 calculates the motor rotational angle (electric angle θ) based on the induced voltage signal output from the rotational angle sensor 23. The rotational angle conversion unit 55 transmits a signal indicating the rotational angle θma, that is, a signal indicating the information concerning the motor rotational angle to a rotational angle selection unit 60.

In the resolver sensor, a break or a defective insulation may occur in the coil. Therefore, the malfunction determination unit 61 monitors the amplitude of a signal output from the rotational angle sensor 23. When the amplitude falls outside the allowable range set in advance, the malfunction determination unit 61 determines that a malfunction has occurred in the rotational angle sensor 23, and outputs a sensor malfunction signal "fail". Also, the malfunction determination unit 61 determines whether a malfunction has occurred in the rotational angle sensor 23 by comparing the induced voltage signals from the paired secondary coils of the resolver sensor with each other. When two detection signals output from the secondary coils are contradictory, for example, when a sine-wave signal is output from one of the secondary coils while a signal indicating a constant value is output from the other secondary coil, the malfunction determination unit 61 outputs the sensor malfunction signal "fail".

The sensor malfunction signal "fail" is transmitted to the rotational angle selection unit 60 and a rotational angle estimation unit 62. The rotational angle selection unit 60 outputs the information concerning the motor rotational angle (electric angle) used to control the rotation of the electric motor 15. The rotational angle selection unit 60 receives signals indicating the detected motor rotational angle θma output from the rotational angle conversion unit 55 and the estimated motor rotational angle θmb output from the rotational angle estimation unit 62, selects one of the motor rotational angles θma and 0 mb depending on the presence or absence of a sensor malfunction signal "fail", and outputs a signal indicating the selected motor rotational angle θma or θmb as the motor rotational angle θm. Namely, when the rotational angle selection unit 60 has not received a sensor malfunction signal "fail" from the malfunction determination unit 61, the rotational angle selection unit 60 outputs a signal indicating the detected motor rotational angle θma which is received from the rotational angle conversion unit 55 and used as the motor rotational angle θm. On the other hand, when the rotational angle selection unit 60 has received a sensor malfunction signal "fail", the rotational angle selection unit 60 outputs a signal indicating the estimated motor rotational angle θmb which is received from the rotational angle estimation unit 62 and used as the motor rotational angle θm.

When the rotational angle estimation unit 62 has received the sensor malfunction signal "fail" from the malfunction determination unit 61, the rotational angle estimation unit 62 estimates the motor rotational angle using the salient-polarity of the motor instead of using the rotational angle sensor 23. There are various methods for estimating a motor rotational angle (electric angle) without using a sensor. An example of the method for calculating a rotational angle without using a sensor will be described below. For example, when the motor is operating at a speed equal to or higher than a predetermined speed, the rotational angle is calculated by the following voltage equations 1 and 2.

$$Vd - R \times Id - p(Ld \times Id) + \omega \times Lq \times Iq = 0 \quad \text{Equation 1}$$

$$Vq - R \times Iq - p(Lq \times Iq) - \omega \times Ld \times Id - E = 0 \quad \text{Equation 2}$$

In the above equations, "V" indicates the value of voltage applied to the motor, "I" indicates the value of electric current passed through the coil of the motor, and "L" indicates the inductance of the coil. The subscripts "d" and "q" attached to "V", "I" and "L" signify that the corresponding values are the values in the so-called d-axis direction and q-axis direction of the motor. With regard to the other parameters in the above equations, "R" indicates the motor coil resistance, "ω" indicates the electric rotational angular speed of the motor, and "E" indicates the counter-electromotive voltage produced by the rotation of the motor. The electric angular speed ω of the motor is a value obtained by multiplying the mechanical angular speed of the motor by a pole logarithm. "p" is a temporal differential operator, that is, $p(Ld \times Id) = d(Ld \times Id)/dt$.

The voltage equations 1 and 2 are constantly satisfied concerning the d-axis and the q-axis. When the motor is controlled without using a sensor, a motor control unit first solves the equations based on an estimated rotational angle θc. At this time, a calculation error corresponding to the deviation Δθ of the estimated rotational angle θ from the actual rotational angle θ is caused in the calculation result. Namely, when the above voltage equations 1 and 2 are solved using the calculated current value and voltage value, the solutions of the above voltage equations 1 and 2, each of which is supposed to be 0, become values other than 0. The rotational angles at the present time are calculated by making a correction to the rotational angles at the preceding calculation time in consideration of the errors, caused in the solutions of the voltage equations 1 and 2 solved using the voltage value, the current value, etc. at the present time.

A concrete example of a method for calculating the rotational angle will be described below. The following equations 3 to 5 are set up by substituting the temporal subtraction (amount of change/time) for the temporal differentiation (d/dt) in the above voltage equations 1 and 2.

$$\Delta Id = Id(n) - Idm = Id(n) - Id(n-1) - t(Vd - R \times Id + \omega \times Lq \times Iq)/Ld \quad \text{Equation 3}$$

$$\Delta Iq = Iq(n) - Iqm = Iq(n) - Iq(n-1) - t(Vq - R \times Iq + \omega \times Ld \times Id - E(n-1))/Lq \quad \text{Equation 4}$$

$$E(n) = E(n-1) - k1 \times \Delta Iq \quad \text{Equation 5}$$

In the above equations, "Id" and "Iq" indicate the electric currents flowing in the d-axis direction and the q-axis direction, namely, the magnetization current and the torque current, respectively; "Ld" and "Lq" indicate the inductances in the d-axis direction and the q-axis direction, respectively; and "Vd" and "Vq" indicate the values of the voltages applied to the coils. The subscript (n), etc. are attached to the parameters on the assumption that the above equations are periodically executed at predetermined intervals. The subscript (n) indicates that the value is obtained at the present time, and the subscript (n−1) indicates that the value is obtained at the preceding calculation time. "Idm" and "Iqm" indicate the model values of the magnetization current and the torque current, respectively, that is, the theoretical values of the currents that are obtained according to the voltage equations when it is assumed that the estimated rotational angle is correct. "k1" is the constant used to associate the counter-electromotive voltages E(n) and E(n−1), and ΔIq with each other and calculate the rotational angle. "k1" is set by experiments. The equations are executed at the intervals of time "t" in the equations.

The counter-electromotive voltage E(n) produced by the rotation of the motor, which is calculated by the equation 5, is proportional to the motor rotational angular speed ω. Accordingly, the motor rotational angular speed ω is expressed by the following equation 6.

$$\omega = k2 \times E(n) \quad \text{Equation 6}$$

The motor rotational angle θ(n) is expressed by the following equation 7 using the motor rotational angular speed ω.

$$\theta(n) = k3 \times \theta(n-1) \times \omega \quad \text{Equation 7}$$

Accordingly, the motor rotational angle θ(n) is calculated by the following equation 8 using the counter-electromotive voltage E(n).

$$\theta(n) = k \times \theta(n-1) \times E(n) \quad \text{Equation 8}$$

The value calculated by the equation 5 may be used as the counter-electromotive voltage E(n) in the equation 8. "k" (=k2×k3) is a proportional constant obtained by experiments. Because there are various other methods for detecting the rotational angle without using a sensor, any method may be employed.

The functional block diagram in FIG. 2 will be described again. The rotational angle selection unit 60 transmits a signal indicating the rotational angle θm that is the information concerning the selected motor rotational angle to an angular speed conversion unit 56, the two-phase/three-phase coordinate conversion unit 47, the three-phase/two-phase coordinate conversion unit 53, and the compensation value calculation unit 32. The angular speed conversion unit 56 differentiates the rotational angle θm to calculate the rotational angular speed ωm of the rotor with respect to the stator. If it is determined that a malfunction has occurred in the rotational angle sensor 23, the angular speed conversion unit 56 uses the motor rotational angular speed, as it is, which is calculated based on the counter-electromotive voltage E, when the rotational angle estimation unit 62 estimates the rotational angle. A signal indicating the motor rotational angular speed ωm is transmitted to the field-weakening control parameter calculation unit 35, the compensation value calculation unit 32, the non-interacting correction value calculation unit 43, etc., and the motor rotational angular speed ωm is then used by these units.

Next, the operation of the electric power steering apparatus according to the first embodiment of the invention will be described. The turning operation of the driver's steering wheel 11 performed by a driver is transmitted to the rack bar 14 via the steering shaft 12 and the pinion gear 13 and moves the rack bar 14 in its axial direction, whereby the left front wheel FW1 and the right front wheel FW2 are steered. At the same time, the steering torque sensor 21 detects the steering torque Th applied to the steering shaft 12. The electronic control unit 30 executes the servo-control on the electric motor 15, whereby the electric motor 15 drives the rack bar 14 using the assist torque corresponding to the steering torque Th. As a result, the left and right front wheels FW1 and FW2 are steered with the assistance of the drive power produced by the electric motor 15.

In the servo-control executed by the electronic control unit 30, the base assist torque calculation unit 31, the compensation value calculation unit 32 and the calculation unit 33 calculate the target command torque T* based on the detected steering torque Th, the vehicle speed V, the rotational angle θm of the electric motor 15 (corresponding to the steering angle of the driver's steering wheel 11), and the rotational angular speed ωm of the electric motor 15 (corresponding to the steering angular speed of the driver's steering wheel 11). In addition, the q-axis target current calculation unit 34 calculates the q-axis target current Iq* based on the target command torque T*. Further, the d-axis target current calculation unit 36 calculates the d-axis target current Iq* using the first to third parameters Cw, Cq and Ci calculated by the field weakening control parameter calculation unit 35 based on the motor rotational angular speed ωm, the q-axis command voltage Vq and the q-axis actual current Iq.

The calculation units 38 and 39, the proportional-integral control units 41 and 42, the two-phase/three-phase coordinate conversion unit 46, the PWM voltage production unit 47, and the inverter circuit 48 control the electric motor 15 using the d-axis actual current Id and the q-axis actual current Iq that are fed back by the current sensors 51 and 52, the three-phase/two-phase coordinate conversion unit 53 and the calculation unit 54. The non-interacting correction value calculation unit 43 and the calculation units 44 and 45 correct the q-axis command voltage Vq* from the proportional-integral control unit 41 and the d-axis command voltage Vd* from the proportional-integral control unit 42 to cancel the speed electromotive forces interacting with each other between the d-axis and the q-axis. Hereinafter, the control, in which the amount of electricity passed through the electric motor 15 is controlled to produce a desired steering assist torque, will be referred to as the assist control.

When the assist control is executed, the electronic control unit 30 controls the electric motor 15 using the detected rotational angle θma detected by the rotational angle sensor 23 if it is determined that there is no malfunction in the rotational angle sensor 23. On the other hand, if it is determined that a malfunction has occurred in the rotational angle sensor 23, the electronic control unit 30 controls the electric motor 15 using the estimated rotational angle θmb estimated by the rotational angle estimation unit 62. Hereinafter, the assist control executed based on the estimated rotational angle θmb estimated by the rotational angle estimation unit 62 will be referred to as the sensorless assist control, and the assist control, which is executed based on the rotational angle θma detected by the rotational angle sensor 23 when it is determined that there is no malfunction in the rotational angle sensor 23, will be referred to as the normal assist control.

Next, the description will be provided concerning the units that are used when it is determined that a malfunction has occurred in the rotational angle sensor 23 and the assist control is executed based on the estimated rotational angle θmb estimated by the rotational angle estimation unit 62.

The electronic control unit 30 according to the first embodiment of the invention includes, in addition to the units described above, an assist stop command unit 63 indicated by the heavy-line frame in FIG. 2. The assist stop command unit 63 receives the information concerning the motor rotational angular speed ωm from the angular speed conversion unit 56, and a malfunction determination signal from the malfunction determination unit 61.

Figure 13:
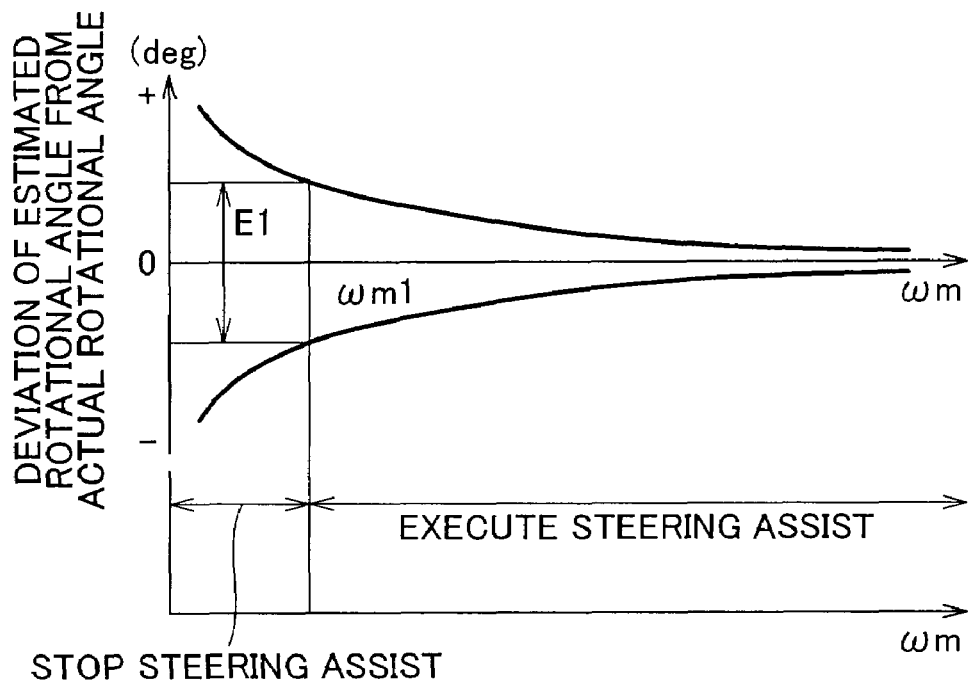
FIG. 13 is a graph showing the relationship between the deviation of the estimated rotational angle from the actual rotational angle and the motor rotational angular speed, and the on/off state of the power assist according to the first embodiment of the invention.

The deviation of the estimated rotational angle θmb from the actual rotational angle decreases as the motor rotational angular speed ωm increases, and increases as the motor rotational angular speed ωm decreases, as shown in FIG. 13. The assist stop command unit 63 stores the motor rotational angular speed ωm1, which corresponds to the limit value (allowable limit value) of the preset allowable deviation range E1 of the motor rotational angle θm, as the threshold value used to determine whether the assist control should be stopped, as shown in FIG. 13. In this specification, the comparison of the magnitudes of the motor rotational angular speed cm, the motor rotational angle θm, the steering torque Th, the steering assist torque Tas, the steering angle θh, etc. are made using the absolute values thereof.

When the assist stop command unit 63 has not received a sensor malfunction signal "fail" from the malfunction determination unit 61, namely, when the normal assist control is executed, the assist stop command unit 63 is in the inactive state and does not operate. On the other hand, when the assist stop command unit 63 has received a sensor malfunction signal "fail" from the malfunction determination unit 61, namely, when the sensorless assist control is executed, the assist stop command unit 63 is in the active state.

When being in the active state, the assist stop command unit 63 compares the motor rotational angular speed ωm indicated by a signal received from the angular speed conversion unit 56 with the threshold value ωm1. If the motor rotational angular speed ωm is equal to or higher than the threshold value ωm1, the assist stop command unit 63 continues the assist control. On the other hand, if the motor rotational angular speed ωm is lower than the threshold value ωm1, the assist stop command unit 63 stops production of the assist torque (hereinafter, referred to as the "stop of power assist"). Namely, when it is determined that a malfunction has occurred in the rotational angle sensor 23, the electronic control unit 30 brings the assist stop command unit 63 into the active state to compare the motor rotational angular speed ωm with the threshold value ωm1. In addition, the electronic control unit 30 changes the control manner such that power assist is stopped or continued depending on the magnitude relationship between the motor rotational angular speed ωm and the threshold value ωm1.

Figure 12:
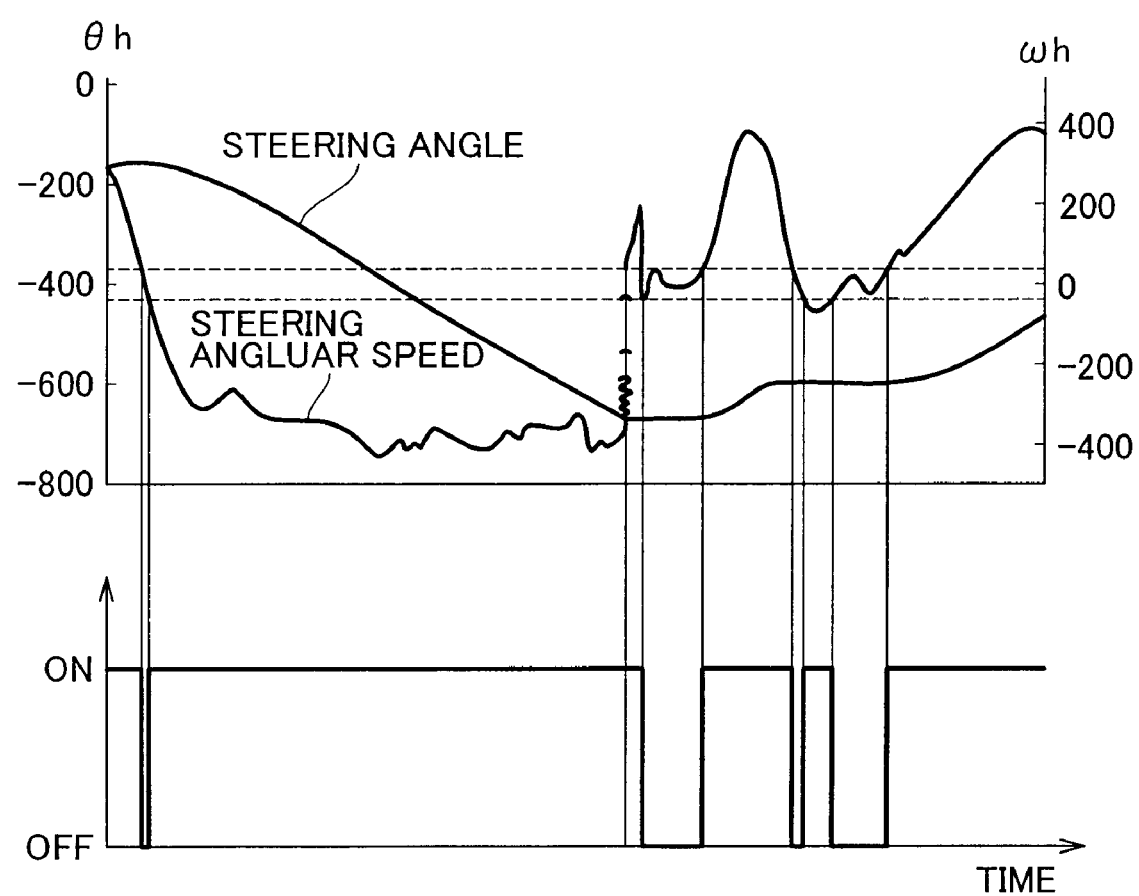
FIG. 12 is a graph showing the on/off state of the power assist in accordance with the steering state according to the first embodiment of the invention.

According to the first embodiment of the invention, in order to stop the power assist, a stop command signal is transmitted from the assist stop command unit 63 to the PWM voltage production unit 47. When receiving the stop command signal from the assist stop command unit 63, the PWM voltage production unit 47 stops transmission of the PWM control voltage signals UU, VU and WV to the inverter circuit 48, and keeps switching elements of the inverter circuit 48 off. When the motor rotational angular speed ωm is equal to or higher than the threshold value ωm1, the assist stop command unit 63 transmits an assist enabling signal to the PWM voltage production unit 47 to continue the sensorless assist control. FIG. 12 shows the time-change in a signal (a stop command signal: OFF, an enabling signal: ON) output from the assist stop command unit 63 based on the steering state (the steering angle θh, the steering angular speed ωh).

Figure 14:
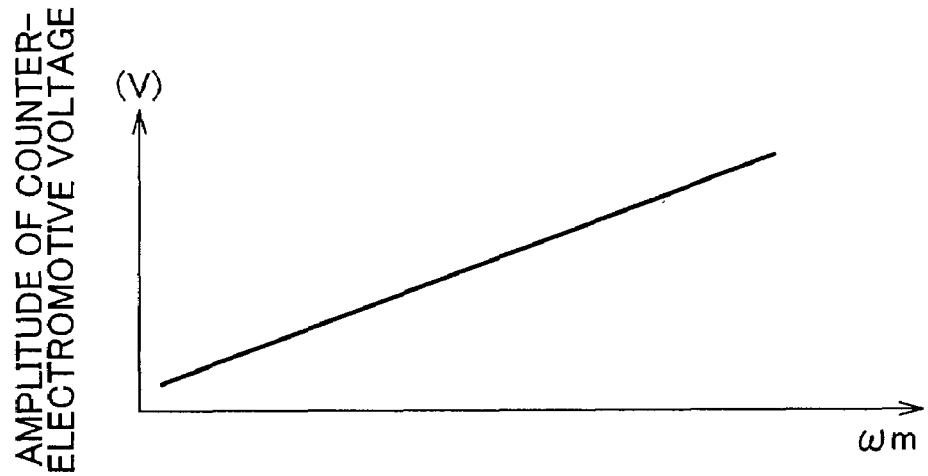
FIG. 14 is a graph showing the relationship between the motor rotational angular speed and the amplitude of counter-electromotive voltage according to the first embodiment of the invention.

The assist stop command unit 63 may determine whether the motor rotational angular speed ωm becomes lower than the threshold value ωm1 based on a degree of decrease in the amplitude of the counter-electromotive voltage E produced by the electric motor 15. Namely, the motor rotational angular speed ωm is proportional to the counter-electromotive voltage E as shown in FIG. 14, and the counter-electromotive voltage E is calculated in the process of estimating the rotational angle θmb using the rotational angle estimation unit 62.

Accordingly, the power assist is stopped or continued based on the determination as to whether the counter-electromotive voltage E is lower than a predetermined value. In this way, it is possible to easily and accurately determine whether the motor rotational angular speed ωm is lower than the threshold value ωm1.

With the electric power steering apparatus according to the first embodiment of the invention, even if a malfunction has occurred in the rotational angle sensor 23, the assist control is executed by executing the sensorless control based on the estimated rotational angle. Accordingly, a strong force is not required to operate the driver's steering wheel. When the motor rotational angular speed ωm becomes lower and the reliability of the estimated rotational angle is reduced, the power assist is stopped. Accordingly, it is possible to prevent production of undesirable steering assist torque to ensure sufficient level of safety. Namely, even if a malfunction has occurred in the rotational angle sensor 23, the power assist is performed safely, which is advantageous for the driver.

Figure 3:
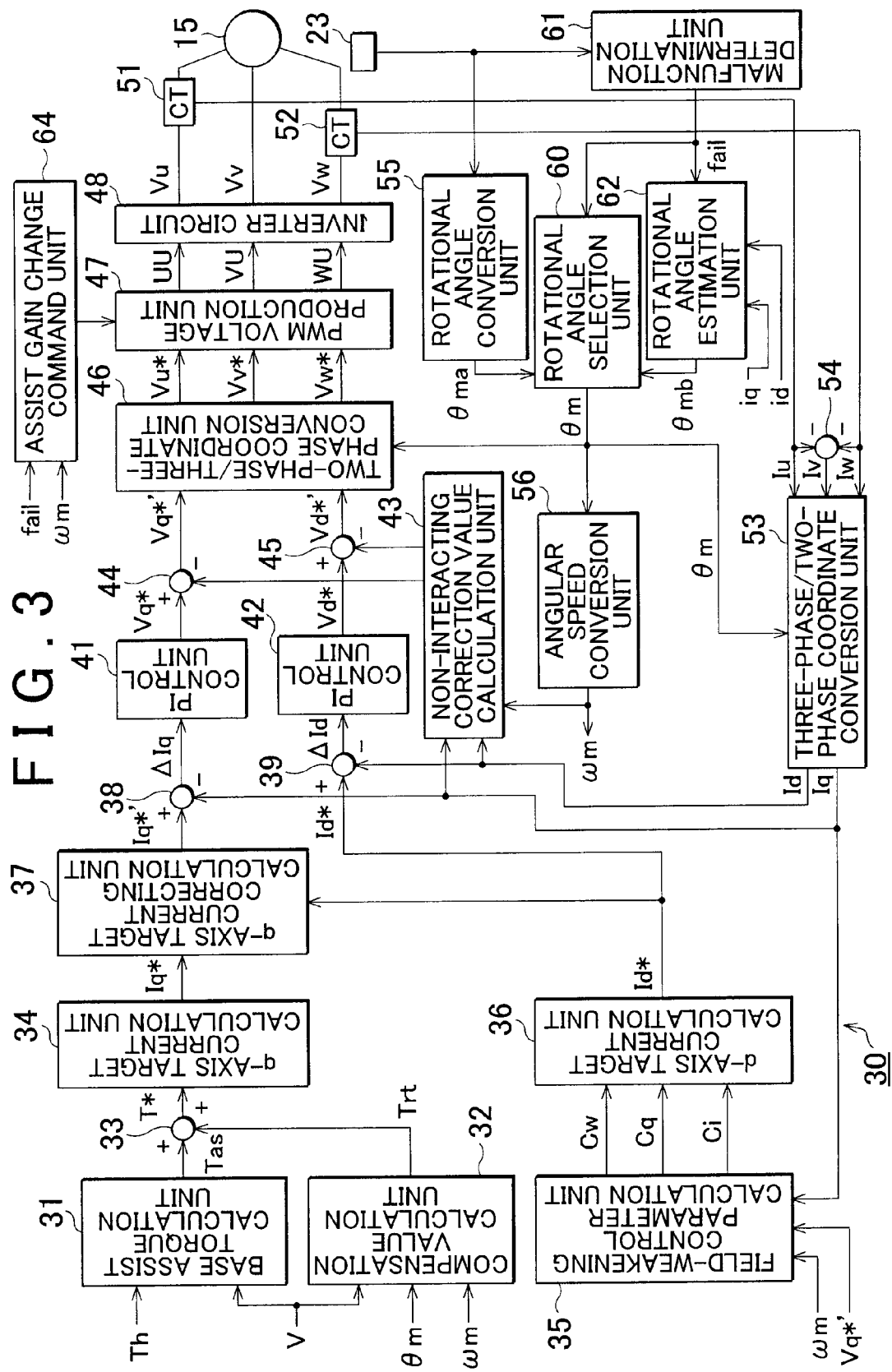
FIG. 3 is a block diagram showing the functional configuration of an electronic control unit according to a second embodiment of the invention.

Next, an electric power steering apparatus according to a second embodiment of the invention will be described. FIG. 3 shows the functions of the electronic control unit 30 of the electric power steering apparatus according to the second embodiment of the invention. The electronic control unit 30 according to the second embodiment is provided with an assist gain change command unit 64 indicated by the heavy-line frame instead of the assist stop command unit 63 according to the first embodiment. Because the other structure is the same as that in the first embodiment of the invention, the same portions as those in the first embodiment are denoted by the same reference numerals as those in the first embodiment and the description thereof will not be provided below.

The assist gain change command unit 64 receives the information concerning the motor rotational angular speed ωm from the angular speed conversion unit 56, and receives a sensor malfunction signal "fail" from the malfunction determination unit 61 when it is determined that a malfunction has occurred in the rotational angle sensor 23. As described above, the deviation of the estimated rotational angle θmb from the actual rotational angle decreases as the motor rotational angular speed ωm increases, and increases as the motor rotational angular speed ωm decreases. Therefore, according to the second embodiment of the invention, the correction gain K1x, with which the steering assist torque is decreased as the motor rotational angular speed ωm decreases, is set to prevent the deviation of the estimated rotational angle θmb from the actual rotational angle from exerting a great influence on the steering assist torque.

Figure 15A:
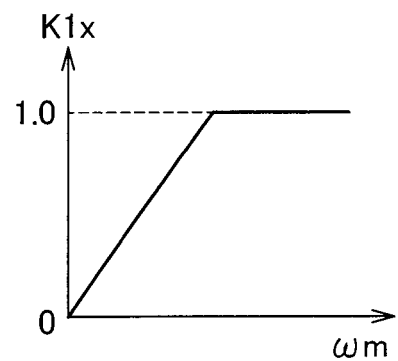
FIGS. 15A to 15D illustrate graphs each showing the relationship between the motor rotational angular speed and the correction gain K1x according to the second embodiment of the invention.
Figure 15B:
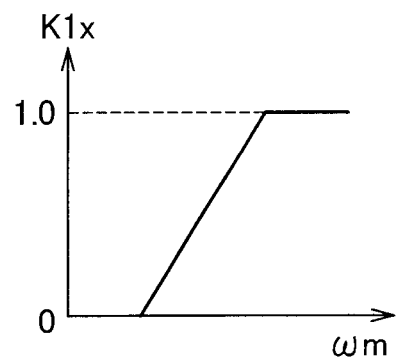
Figure 15C:
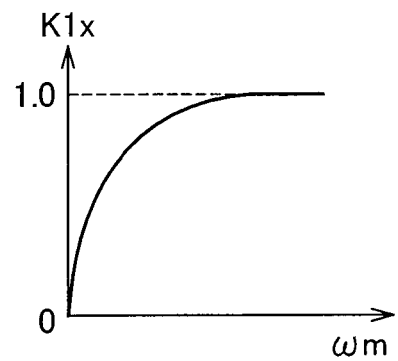
Figure 15D:
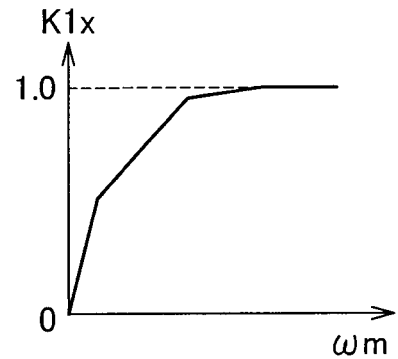

As shown in FIG. 15A, the correction gain K1x is set to a smaller value as the motor rotational angular speed ωm decreases. The relationship between the correction gain K1x (≦1) and the motor rotational angular speed ωm is stored, as a reference map, in the assist gain change command unit 64. However, the relationship between the correction gain K1x and the motor rotational angular speed ωm is not limited to the one in FIG. 15A. Any relationships between the correction gain K1x and the motor rotational angular speed ωm, for example, the relationships shown in FIGS. 5B to 5D, may be employed, as long as the reduction rate is set to a higher value (i.e., the correction gain K1x is set to a smaller value) as the motor rotational angular speed ωm decreases.

The assist gain change command unit 64 calculates the correction gain K1x corresponding to the motor rotational angular speed ωm with reference to the reference map while the sensorless assist control is executed, and transmits the information concerning the correction gain K1x to the PWM voltage production unit 47. The PWM voltage production unit 47 calculates the PWM control voltage signals UU, VU and WV corresponding to the three-phase command voltages Vu*, Vv* and Vw* output from the two-phase/three-phase coordinate conversion unit 46. In addition, the PWM voltage production unit 47 corrects the PWM control voltage signals UU, VU and WV to the voltage signals by amplifying the PWM control voltage signals UU, VU and WV using the correction gain K1x, and outputs the voltage signals to the inverter circuit 48.

Accordingly, as the motor rotational angular speed ωm decreases, the PWM control voltage signals UU, VU and WV to be output to the inverter circuit 48 are corrected to smaller values. As a result, as the motor rotational angular speed ωm decreases, the amount of electricity passed through the electric motor 15 is reduced and the steering assist torque is also reduced. Namely, when the motor rotational angular speed ωm is low, that is, when the reliability of the estimated rotational angle is low, the steering assist torque is gradually reduced with a decrease in the rotational angular speed. Accordingly, the influence of the deviation of the estimated rotational angle from the actual rotational angle on the assist torque is reduced, which reduces a sense of discomfort felt by the driver. In addition, because the power assist is not suddenly stopped, an abrupt change in the steering feel is suppressed.

Next, an electric power steering apparatus according to a third embodiment of the invention will be described. FIG. 4 shows the functions of the electronic control unit 30 of the electric power steering apparatus according to the third embodiment of the invention. The electronic control unit 30 according to the third embodiment of the invention uses a signal indicating the steering angle θh of the driver's steering wheel 11 instead of a signal indicating the motor rotational angular speed ωm transmitted to the assist stop command unit 63 according to the first embodiment of the invention. According to the third embodiment of the invention, a steering angle sensor 24 (indicated by the dashed line in FIG. 1) that detects the rotational angular position of the driver's steering wheel 11 is employed in the system configuration of the electric power steering apparatus in FIG. 1. Because the other structure is the same as that in the first embodiment of the invention, the same portions as those in the first embodiment will be denoted by the same reference numerals as those in the first embodiment, and the description thereof will not be provided below.

The electronic control unit 30 according to the third embodiment of the invention is provided with a steering speed detection unit 65 and an assist stop command unit 63'. The steering speed detection unit 65 receives a signal indicating the steering angle θh from the steering angle sensor 24, and calculates the temporal change (the derivative value) in the steering angle θh to obtain the steering speed ωh. The steering speed detection unit 65 transmits the information concerning the calculated steering speed ωh to the assist stop command unit 63'. Because the driver's steering wheel 11 and the electric motor 15 are mechanically connected to each other by the steering mechanism 10, the steering speed and the motor rotational angular speed are proportional to each other. Accordingly, the assist stop command unit 63' receives a signal indicating the steering speed ωh instead of a signal indicating the motor rotational angular speed ωm, thereby determining whether the motor rotational angular speed ωm becomes lower than the threshold value ωm1.

Figure 16:
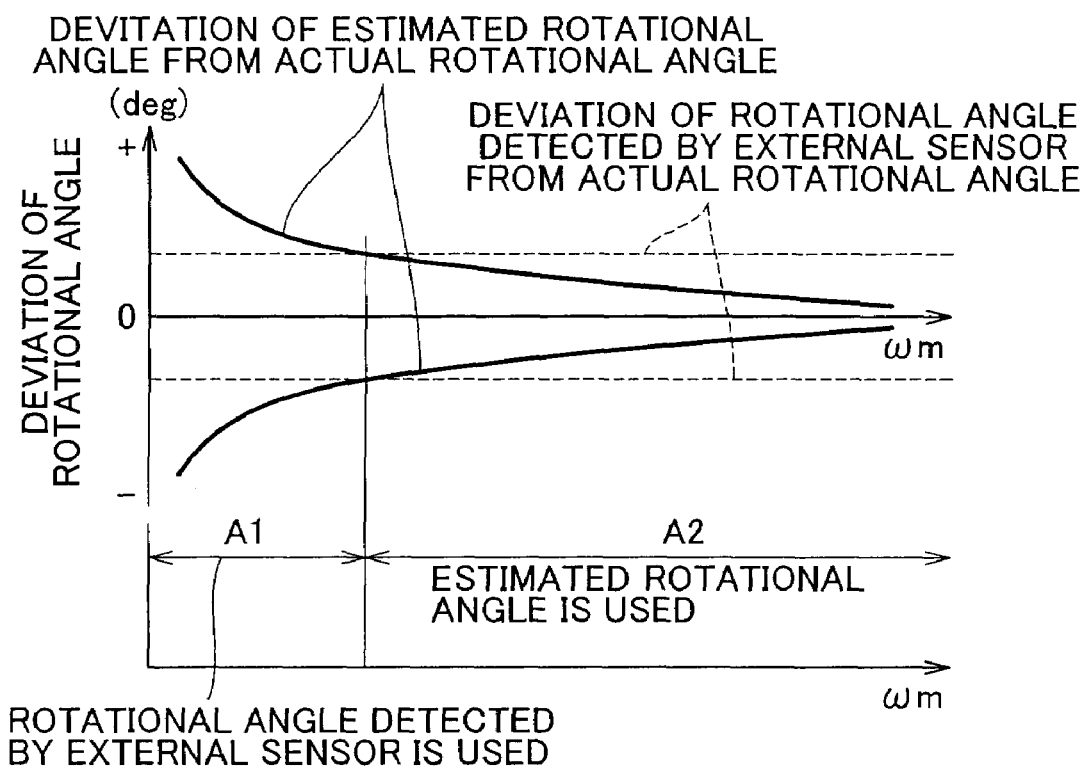
FIG. 16 is a graph showing the relationship between the deviation of the estimated rotational angle from the actual rotational angle and the motor rotational angular speed according to the third embodiment of the invention.

FIG. 16 shows the relationship between the deviation of the estimated rotational angle θmb from the actual rotational angle and the motor rotational angular speed cm, and the relationship between the deviation of rotational angle (the value converted into the motor rotational angle) detected by the steering angle sensor 24 (external sensor) from the actual rotational angle and the motor rotational angular speed ωm. The deviation of the rotational angle detected by the steering angle sensor 24 from the actual rotational angle is within a constant range independently of the motor rotational angular speed ωm. Meanwhile, the deviation of the estimated rotational angle θmb estimated by the rotational angle estimation unit 62 from the actual rotational angle decreases as the motor rotational angular speed ωm increases, and increases as the motor rotational angular speed ωm decreases.

Accordingly, in the range A1 in which the motor rotational angular speed ωm is low and the deviation of the rotational angle θh detected by the steering angle sensor 24 from the actual rotational angle is smaller than the deviation of the estimated rotational angle θmb estimated by the rotational angle estimation unit 62 from the actual rotational angle, the motor rotational angular speed ωm may be calculated using the steering angle θh detected by the steering angle sensor 24. In the range A2 in which the motor rotational angular speed ωm is high and the deviation of the rotational angle θh detected by the steering angle sensor 24 from the actual rotational angle is larger than the deviation of the estimated rotational angle θmb estimated by the rotational angle estimation unit 62 from the actual rotational angle, the motor rotational angular speed ωm may be calculated using the estimated rotational angle θmb estimated by the rotational angle estimation unit 62.

The threshold value ωm1, that is, the motor rotational angular speed ωm used to determine whether the power assist should be stopped is within the range A1. Accordingly, when the assist stop command unit 63' has received a sensor malfunction signal "fail" from the malfunction determination unit 61, the assist stop command unit 63' constantly determines the magnitude relationship between the steering speed ωh indicated by a signal output from the steering speed determination unit 65 and the threshold value ωh1 set in advance. When the steering speed ωh falls below the threshold value ωh1, the assist stop command unit 63' regards the motor rotational angular speed ωm as falling below the threshold value ωm1, and therefore transmits a stop command signal to the PWM voltage production unit 47 to stop the power assist. On the other hand, when the steering speed ωh is equal to or higher than the threshold value ωh1, the assist stop command unit 63' regards the motor rotational angular speed ωm as being equal to or higher than the threshold value ωm1, and therefore transmits an assist enabling signal to the PWM voltage production unit 47 to continue the assist control. When the assist stop command unit 63' has not received a sensor malfunction signal "fail" from the malfunction determination unit 61, the assist stop command unit 63a' is kept in the non-active state, as in the first embodiment of the invention. Accordingly, the assist control is continued.

According to the third embodiment of the invention, it is determined whether the motor rotational angular speed ωm has falls below the threshold value oωm1 based on a detection signal from the steering angle sensor 24, which serves as the external sensor, without using the rotational angle sensor 23. Accordingly, the determination is made accurately. As a result, the reliability and safety of the electric power steering apparatus are further enhanced.

The steering speed detection unit 65 may receive a rotational angle signal from the resolver sensor 21a or the resolver sensor 21b provided in the steering torque sensor 21 instead of the steering angle sensor 24. In this case as well, the same effects can be obtained.

In the second embodiment of the invention as well, the steering speed detection unit 65 may be provided, and the steering angular speed ωh detected by the steering speed detection unit 65 may be used instead of a signal indicating the motor rotational angular speed ωm transmitted to the assist gain change command unit 64.

Figure 5:
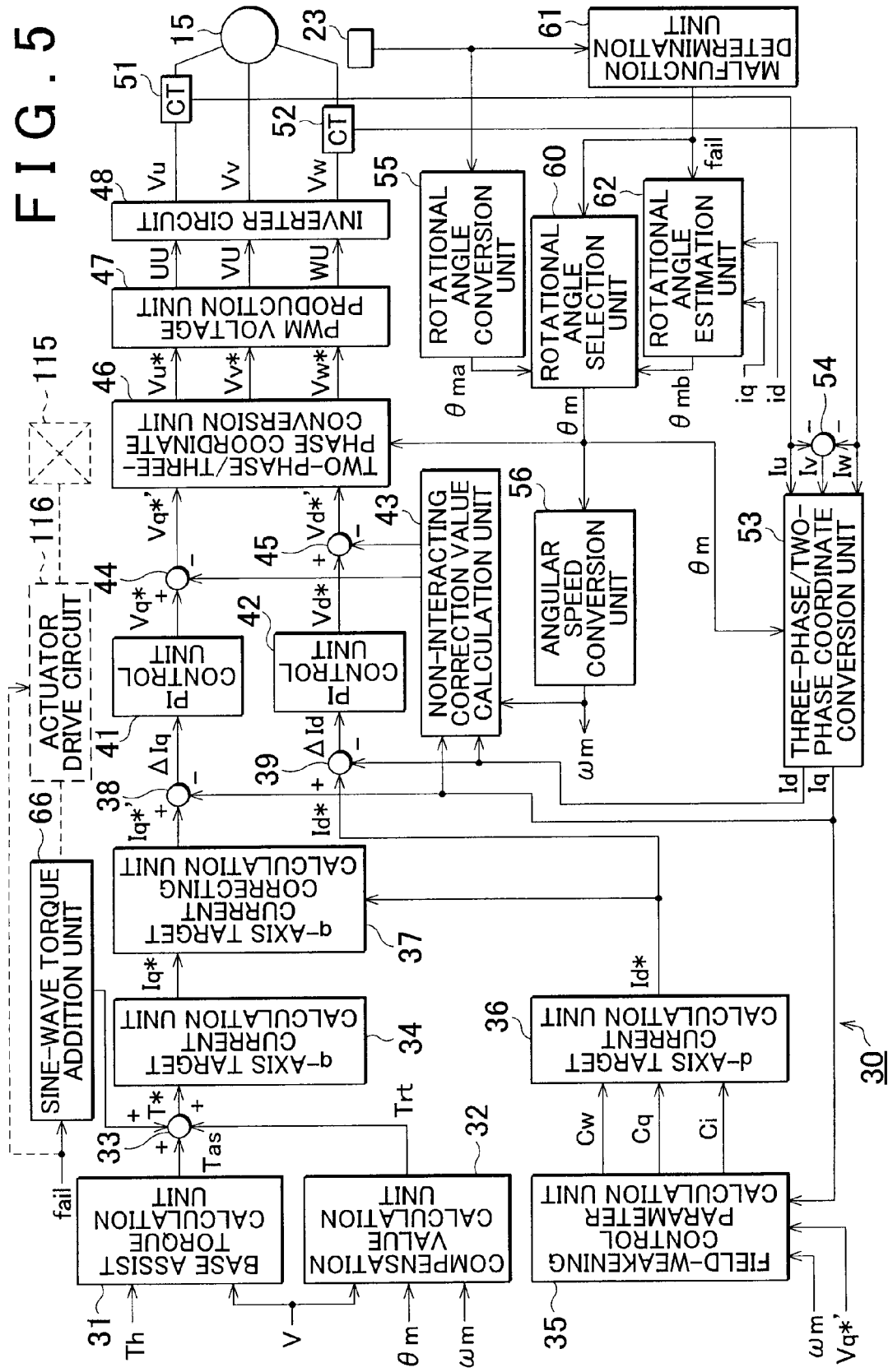
FIG. 5 is a block diagram showing the functional configuration of an electronic control unit according to each of a fourth embodiment and a twelfth embodiment of the invention.

Next, an electric power steering apparatus according to a fourth embodiment of the invention will be described. FIG. 5 shows the functions of the electronic control unit 30 of the electric power steering apparatus according to the fourth embodiment of the invention. The electronic control unit 30 according to the fourth embodiment is provided with a sine-wave torque addition unit 66 indicated by the heavy-line frame instead of the assist stop command unit 63 according to the first embodiment of the invention. Because the other structure is the same as that in the first embodiment of the invention, the same portions as those in the first embodiment will be denoted by the same reference numerals as those in the first embodiment, and the description thereof will not be provided below. The structure indicated by the dashed line in FIG. 5 is applied in a twelfth embodiment of the invention, and is not applied in the fourth embodiment of the invention.

Figure 17:
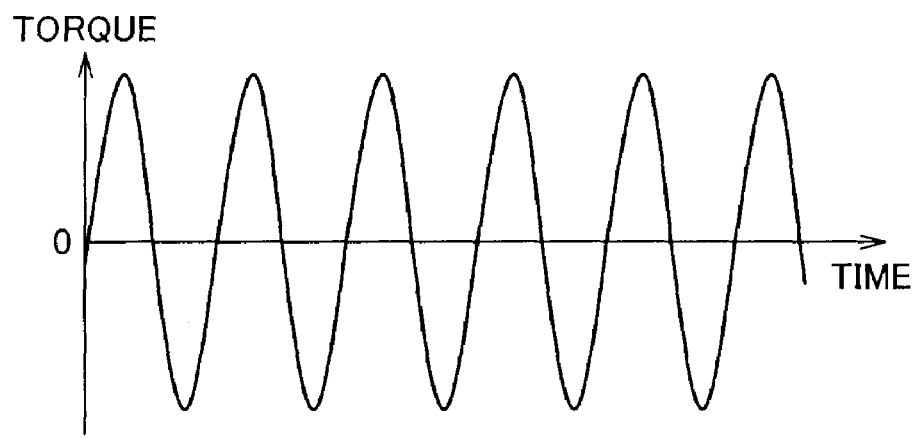
FIG. 17 is a graph showing a time-change in the sine-wave torque according to the fourth embodiment of the invention.

The sine-wave torque addition unit 66 receives a malfunction determination signal from the malfunction determination unit 61. When determining that a malfunction has occurred in the rotational angle sensor 23, the malfunction determination unit 61 outputs a sensor malfunction signal "fail" as the malfunction determination signal. When receiving the sensor malfunction signal "fail", the sine-wave torque addition unit 66 transmits a high-frequency sine-wave torque command signal, for example, shown in FIG. 17 to the calculation unit 33. In the embodiments of the invention described above, the calculation unit 33 adds the base assist torque Tas calculated by the base assist torque calculation unit 31 to the compensation value Trt calculated by the compensation value calculation unit 32, and uses the result of addition as the target command torque T*. In contrast, according to the fourth embodiment of the invention, the calculation unit 33 adds the base assist torque Tas, the compensation value Trt, and, in addition, the sine-wave torque command value output from the sine-wave torque addition unit 66 together, and uses the result of addition as the target command torque T*.

When it is determined that a malfunction has occurred in the rotational angle sensor 23, the rotation of the electric motor 15 is controlled based on the estimated rotational angle θmb estimated by the rotational angle estimation unit 62. In this case, if the motor rotational angular speed ωm decreases, the accuracy of the estimated rotational angle θmb decreases. Especially, in the electric power steering apparatus, it is difficult to accurately estimate the rotational angle, because the electric motor 15 is rotated at a considerably low speed in many cases. Therefore, according to the fourth embodiment of the invention, when it is determined that a malfunction has occurred in the rotational angle sensor 23, the control manner is changed such that the sine-wave torque is added to the target command torque. Thus, it is possible to prevent the motor rotational angular speed ωm from being maintained below a predetermined value, thereby improving the accuracy of the estimated rotational angle θmb. Hereinafter, the high-frequency wave torque added to the steering assist torque will be referred to as the additional torque.

When the sine-wave torque is added to the steering assist torque, the vibration due to such addition is transmitted to the driver's steering wheel 11. However, the wave-form of the additional torque is the sine-wave form. It is therefore possible to smoothly change the rotational angle of the driver's steering wheel 11, thereby minimizing a sense of discomfort felt by the driver.

The transmissibility (the transfer functional gain) of the vibration to the driver's steering wheel 11 is related to the frequency of the additional torque. FIG. 18 shows the relationship between the frequency of the additional torque and the amplitude of the vibration transmitted to the driver's steering wheel 11. In the fourth embodiment of the invention, the frequency of the additional torque, at which the amplitude of the vibration is less than the threshold value "a" set in advance, is set based on the relationship shown in FIG. 18. If the frequency of the additional torque is excessively high, the electric motor 15 cannot rotate at a speed high enough to produce the additional torque having such high frequency. Accordingly, the frequency of the additional torque is set to a value within a predetermined range. The electric motor 15 can rotate at a speed at which the additional torque having a frequency within the predetermined range is produced. In the other embodiments of the invention described later, in which the high-frequency torque is added to the steering assist torque, the frequency may be set in the same manner as described above.

Therefore, according to the fourth embodiment of the invention, it is possible to prevent a torque change and the vibration from being transmitted to the driver's steering wheel 11 while maintaining the motor rotational angular speed ωm at a high value. As a result, it is possible to minimize a sense of discomfort felt by the driver.

Figure 6:
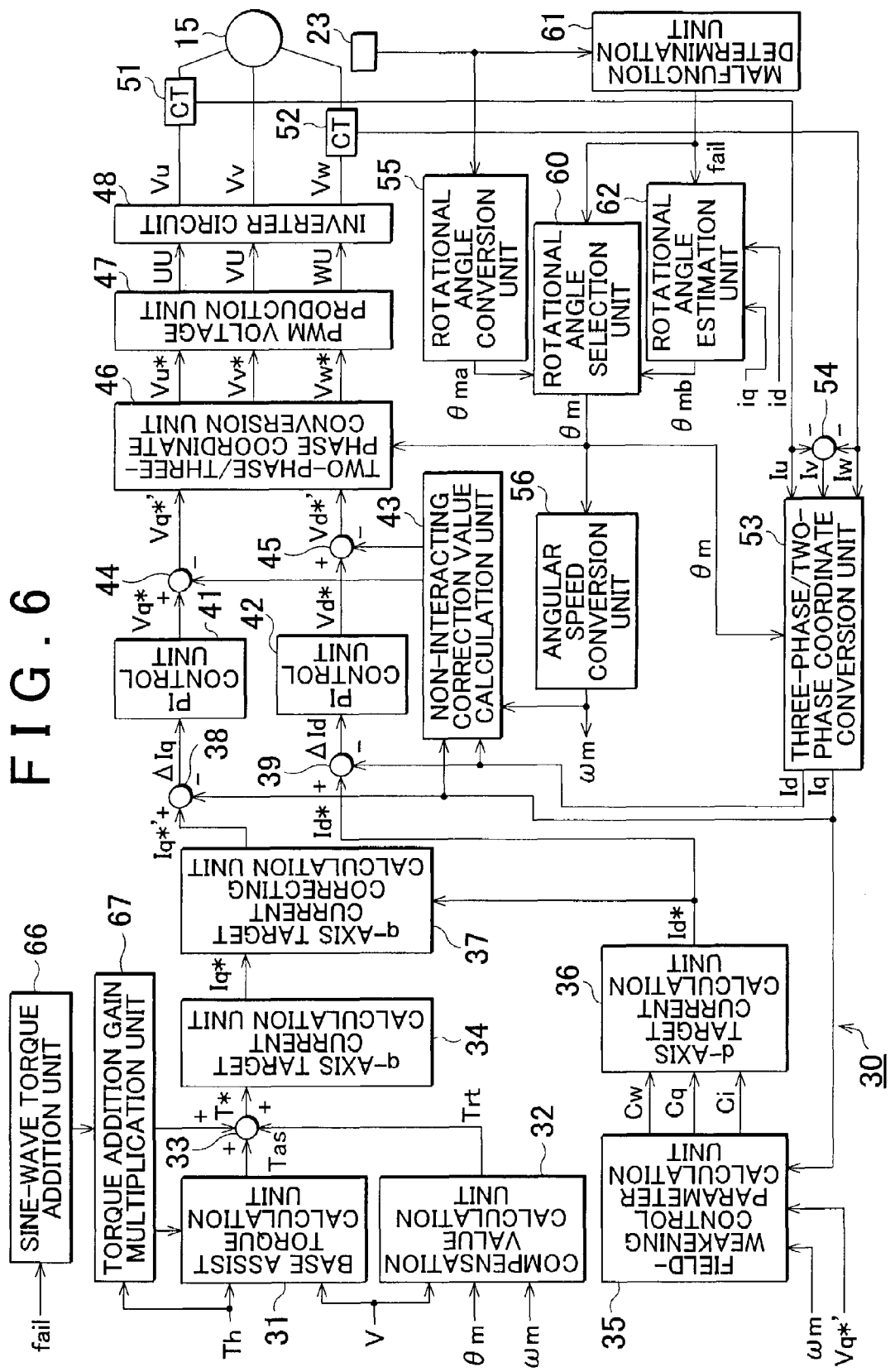
FIG. 6 is a block diagram showing the functional configuration of an electronic control unit according to a fifth embodiment of the invention.

Next, an electric power steering apparatus according to a fifth embodiment of the invention will be described. FIG. 6 shows the functions of the electronic control unit 30 of the electric power steering apparatus according to the fifth embodiment of the invention. The electronic control unit according to the fifth embodiment of the invention has mostly the same structure as the electronic control unit 30 according to the fourth embodiment of the invention except that a torque addition gain multiplication unit 67 indicated by the heavy-line frame is further provided. Because the other structure is the same as that in the fourth embodiment of the invention, the same portions as those in the fourth embodiment will be denoted by the same reference numerals as those in the fourth embodiment, and the description thereof will not be provided below.

A high-frequency sine-wave torque command from the sine-wave torque addition unit 66 is transmitted to the torque addition gain multiplication unit 67. The torque addition gain multiplication unit 67 receives the information concerning the steering torque Th from the steering torque sensor 21, and multiples the sine-wave torque command value by the torque addition gain K2$x$ set based on the steering torque Th. The torque addition gain multiplication unit 67 transmits a signal indicating the value obtained by multiplying the sine-wave torque command value by the torque addition gain K2$x$ to the calculation unit 33.

The torque addition gain K2$x$ is set to 0 when the steering torque Th is equal to or lower than the predetermined value Th1 (K2$x$=0), and set to 1 when the steering torque Th is higher than the predetermined value Th1 (k2$x$=1), as shown in FIG. 19A. The relationship between the steering torque Th and the torque addition gain K2$x$ is stored in the torque addition gain multiplication unit 67. Accordingly, when the steering torque Th is equal to or lower than the predetermined value Th1, the sine-wave torque command value indicated by a signal transmitted to the calculation unit 33 is 0, and the sine-wave torque is not added. On the other hand, if the steering torque Th is higher than the predetermined value Th1, a signal indicating the sine-wave torque command value transmitted from the sine-wave torque addition unit 66 is transmitted, as it is, to the calculation unit 33.

The steering assist torque is calculated mainly by the base assist torque calculation unit 31 based on the steering torque Th and the vehicle speed V. The steering assist torque and the steering assist torque rate (the steering assist torque/steering torque) increase as the steering torque Th detected by the steering torque sensor 21 increases, as shown in the base assist map (FIG. 35). In the system in which the steering assist torque is set based on the steering torque Th, when the steering torque is low, the driver easily is more likely to feel the torque fluctuations due to the sine-wave torque. Therefore, according to the fifth embodiment of the invention, the torque addition gain multiplication unit 67 is provided. When the steering torque Th is equal to or lower than the predetermined value Th1, the sine-wave torque command value is set to 0, namely, addition of the sine-wave torque to the steering assist torque is stopped, whereby a sense of discomfort felt by the driver is reduced.

The threshold value Th1, that is, the reference steering torque Th used to determine whether the addition of the sine-wave torque to the steering assist torque should be stopped is preferably 2 Nm+1 Nm (Th1=2 Nm+1 Nm). The threshold value Th1 is set based on the characteristics in the base assist map.

When the addition of the sine-wave torque to the steering assist torque is stopped because the steering torque Th becomes equal to or lower than the predetermined value Th1, the magnitude of the sine-wave torque may be gradually reduced until the addition of the sine-wave torque to the steering assist torque is finally stopped instead of suddenly stopping the addition of the sine-wave torque to the steering assist torque. For example, as shown in FIG. 19B, the torque addition gain K2$x$ may be reduced linearly between the toque addition gain K2$x$ corresponding to the threshold value Th2 and the torque addition gain K2$x$ corresponding to the threshold value Th1 as the steering torque Th decreases. Alternatively, the torque addition gain K2$x$ may be reduced in a stepwise manner. Such relationship between the steering torque Th and the torque addition gain K2$x$ is stored in the torque addition gain multiplication unit 67 in a form of, for example, a map. For example, in a seventh embodiment of the invention described later, in which a rectangular-wave torque is added to the steering assist torque, the torque addition gain multiplication unit 67 may be provided.

Figure 7:
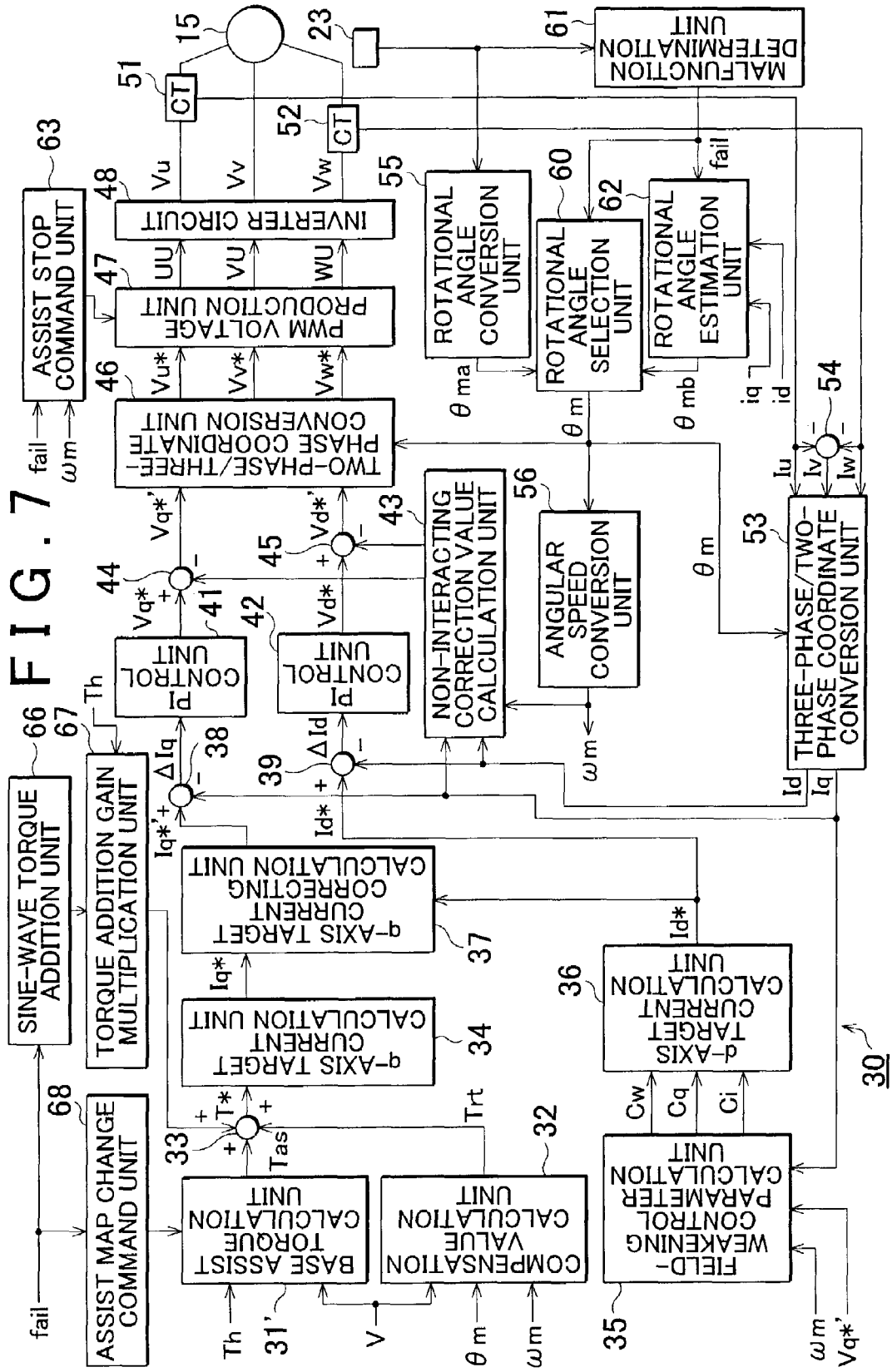
FIG. 7 is a block diagram showing the functional configuration of an electronic control unit according to a sixth embodiment of the invention.

Next, an electric power steering apparatus according to a sixth embodiment of the invention will be described. FIG. 7 shows the functions of the electronic control unit 30 of the electric power steering apparatus according to the sixth embodiment of the invention. The electronic control unit 30 according to the sixth embodiment of the invention has mostly the same structure as that of the electronic control unit 30 according to the fifth embodiment of the invention except that an assist map change command unit 68 and the assist stop command unit 63 indicated by the heavy-line frames are further provided and a base assist torque calculation unit 31' is provided instead of the base assist torque calculation unit 31. Because the other structure is the same as that in the fifth embodiment of the invention, the same portions as those in the fifth embodiment will be denoted by the same reference numerals as those in the fifth embodiment and the description thereof will not be provided below.

Figure 20A:
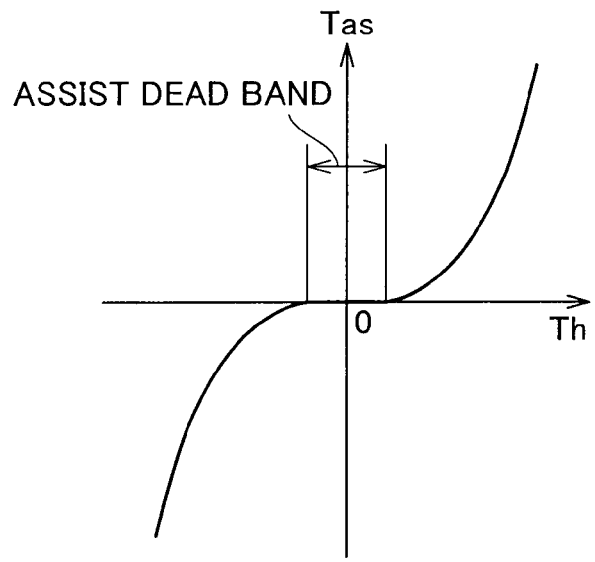
FIGS. 20A and 20B illustrate graphs each showing the assist map according to the sixth embodiment of the invention.
Figure 20B:
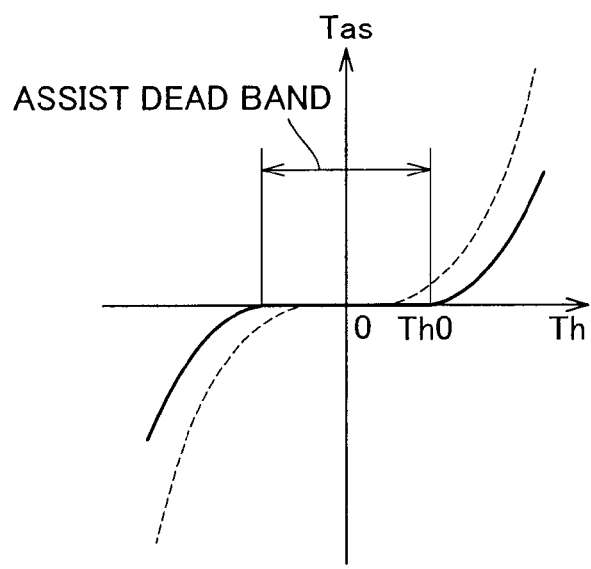
Figure 23A:
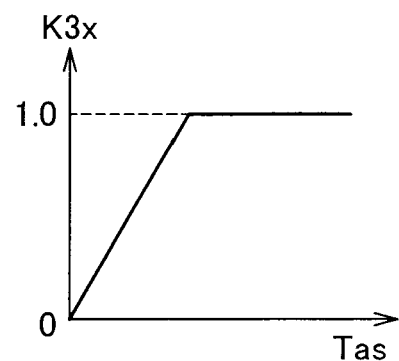
FIGS. 23A to 23D illustrate graphs each showing the relationship between the assist torque and the torque addition gain K3x according to the eighth embodiment of the invention.
Figure 23B:
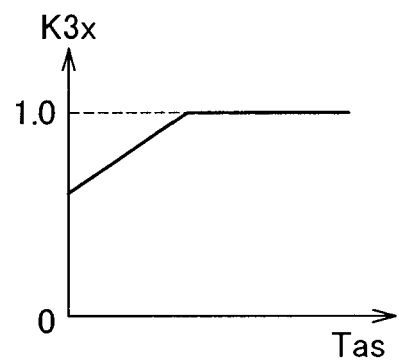
Figure 23C:
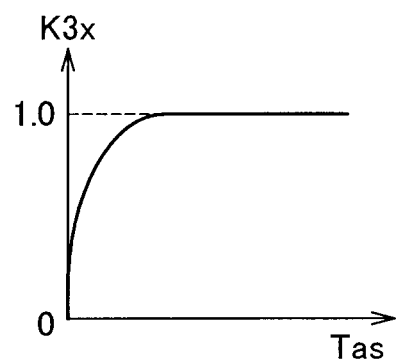
Figure 23D:
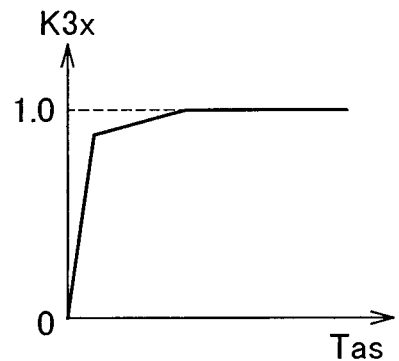

The base assist torque calculation unit 31' stores the base assist maps which differ from each other. One of the base assist maps is used in the normal assist control for controlling the rotation of the electric motor 15 based on the rotational angle θma detected by the rotational angle sensor 23, and the other of the base assist maps is used in the sensorless assist control executed based on the estimated rotational angle θmb. FIG. 20A shows the base assist map used in the normal assist control, and FIG. 20B shows the base assist map used in the sensorless assist control. The base assist map for the normal assist control corresponds to normal-time relational data according to the invention. In the sixth embodiment of the invention, the base assist map for the normal assist control will be referred to as the normal assist map. The base assist map for the sensorless assist control corresponds to malfunction-time relational data according to the invention. In the sixth embodiment of the invention, the base assist map for the sensorless assist control will be referred to as the sensorless assist map. Each map in FIG. 20 shows the relationship between the base assist torque Tas and the steering torque Th at a given vehicle speed V. At a given steering torque Th, the base assist torque Tas is set to a lower value as the vehicle speed V increases, as described above (see FIG. 35). The relationship shown by the dashed line in FIG. 20B shows relationship in the normal assist map in FIG. 20A to facilitate the comparison between the relationships in FIGS. 20A and 20B.

In each assist map, the base assist torque Tas is set to 0 when the steering torque Th is below a predetermined value. The range of the steering torque Th, in which the base assist torque Tas is set to 0, will be referred to as the assist dead band. The width of the assist dead band in relationship in the sensorless assist map is broader than the width of the assist dead band in the relationship in the normal assist map. The value Th0 of the dead band in the sensorless assist map (the value of the steering torque Th at which the base assist torque Tas becomes 0 after decreasing) may be set to a value expressed by the following equation.

$$Th0 \geq Th1 - 0.3 \text{ Nm} \quad \text{Equation 10}$$

In the equation, Th1 is the predetermined value Th1 used to determine whether addition of the torque to the steering assist torque should be stopped.

At a given steering torque Th, the magnitude of the base assist toque Tas in the sensorless assist map is set to be lower than that in the normal assist map.

The electronic control unit 30 includes the assist map change command unit 68 that transmits a map change command to the base assist torque calculation unit 31'. The assist map change command unit 68 receives a sensor malfunction signal "fail" from the malfunction determination unit 61 when it is determined that a malfunction has occurred in the rotational angle sensor 23. When receiving the sensor malfunction signal "fail", the assist map change command unit 68 transmits a map change command to the base assist torque calculation unit 31'.

When a map change command has not been transmitted from the assist map change command unit 68, namely, when it is determined that there is no malfunction in the rotational angle sensor 23, the base assist torque calculation unit 31' calculates the base assist torque Tas based on the normal assist map. When receiving the map change command from the assist map change command unit 68, the base assist torque calculation unit 31' changes the assist map used to calculate the base assist torque Tas from the normal assist map to the sensorless assist map.

The electronic control unit 30 further includes the assist stop command unit 63. The assist stop command unit 63 is the same as that in the first embodiment of the invention. Namely, when the assist stop command unit 63 has not received a sensor malfunction signal "fail" from the malfunction determination unit 61, the assist stop command unit 63 does not operate. However, when a sensor malfunction signal "fail" has been transmitted from the failure determination unit 61 to the assist stop command unit 63, the assist stop command unit 63 compares the motor rotational angular speed ωm received from the angular speed conversion unit 56 with the threshold value ωm1. If the motor rotational angular speed ωm received from the angular speed conversion unit 56 is equal to or higher than the threshold value ωm1, the assist stop command unit 63 continues the assist control. On the other hand, if the motor rotational angular speed ωm is lower than the threshold value ωm1, the assist stop command unit 63 transmits a stop command signal to the PWM voltage production unit 47 to stop the power assist.

In the electronic control unit 30 according to the sixth embodiment of the invention, when the malfunction determination unit 61 determines that a malfunction has occurred in the rotational angle sensor 23, the sine-wave torque addition unit 66 outputs a high-frequency sine-wave torque command based on the sensor malfunction signal "fail". The torque addition gain multiplication unit 67 receives the sine-wave torque command, receives the information concerning steering torque Th from the steering torque sensor 21, multiplies the sine-wave torque command value by the torque addition gain K2x set based on the steering torque Th, and transmits a signal indicating the sine-wave torque command value, obtained by multiplying the sine-wave torque command value by the torque addition gain K2x, to the calculation unit 33. As shown in FIG. 19A, the torque addition gain K2x is set to 0 when the steering torque Th is equal to or lower than the predetermined value Th1, and set to 1 when the steering torque Th exceeds the predetermined value Th1. Accordingly, when the steering torque Th is equal to or lower than the predetermined value Th1, the sine-wave torque command value indicated by a signal transmitted to the calculation unit 33 is 0, and the sine-wave torque is not added to the base assist torque Tas. When the steering torque Th exceeds the predetermined value Th1, the sine-wave torque command value indicated by a signal transmitted from the sine-wave torque addition unit 66 is transmitted, as it is, to the calculation unit 33.

When the malfunction determination unit 61 determines that a malfunction has occurred in the rotational angle sensor 23, the assist stop command unit 63 and the assist map change command unit 68 operate while the control for adding the sine-wave torque to the base assist torque Tas is executed. The assist map change command unit 68 transmits a map change command to the base assist torque calculation unit 31' as described above to change the assist map used to calculate the base assist torque Tas from the normal assist map to the sensorless assist map.

When the motor rotational angular speed ωm is lower than the threshold value ωm1, the assist stop command unit 63 transmits a stop command signal to the PWM voltage production unit 47 to stop the power assist. However, when the sine-wave torque is added to the base assist torque Tas, the motor rotational angular speed ωm is maintained equal to or higher than the threshold value ωm1 to continue the power assist. Even when the sine-wave torque is added to the base assist torque Tas, the motor rotational angular speed ωm instantaneously falls below the threshold value ωm1 when the direction in which the motor rotates changes. However, such instantaneous decrease in the motor rotational angular speed ωm does not exert a considerable influence on the accuracy of estimation of the rotational angle. Accordingly, the assist stop command unit 63 continues the power assist.

If the steering torque Th becomes equal to or lower than the predetermined value Th1, the addition of the sine-wave torque to the steering assist torque is stopped and the power assist is discontinued. Namely, the motor rotational angular speed ωm cannot be maintained equal to or higher than the threshold value ωm1 due to the stop of addition of the sine-wave torque to the steering assist torque. When the motor rotational angular speed ωm falls below the threshold value ω1, the power assist is stopped.

According to the sixth embodiment of the invention, when the malfunction determination unit 61 determines that a malfunction has occurred in the rotational angle sensor 23, the sine-wave torque is added to the base assist torque Tas set according to the sensorless assist map to prevent a decrease in the motor rotational angular speed ωm. In this case, because the steering assist torque is reduced on the whole due to the use of the sensorless assist map, the driver is given a heavier feel in the operation of the driver's steering wheel than usual. Accordingly, the driver safely recognizes that a malfunction has occurred.

If the steering torque Th becomes equal to or lower than the predetermined value Th1, the addition of the sine-wave torque to the steering assist torque is stopped. The motor rotational angular speed ωm cannot be maintained at a high value due to the stop of addition of the sine-wave torque to the steering assist torque. If the motor rotational angular speed ωm falls below the threshold value ωm1, the power assist is stopped. In this case, the sensorless assist map in which the assist dead band is broad is used as the assist map for calculating the assist torque. Accordingly, the base assist torque Tas (the target steering assist torque) decreases more quickly with respect to a decrease in the steering torque Th. Therefore, when the power assist is stopped, the base assist torque Tas is substantially equal to 0. As a result, abrupt torque fluctuations due to the stop of the power assist are not caused, and therefore, a sense of discomfort is not given to the driver. Such effects are obtained by setting the value Th0 of the assist dead band to 0 as expressed by the above equation 10.

In the above equation 10, when Th0=Th1−0.3 Nm, if the addition of the additional torque to the steering assist torque is stopped due to a decrease in the steering torque Th, the steering torque Th is out of the assist dead band by 0.3 Nm. Accordingly, slight torque fluctuations are caused. However, such torque fluctuations are within an allowable range in which a sense of discomfort is not given to the driver. If Th0≧Th1, the base assist torque becomes 0 without fail before the power assist is stopped. Accordingly, torque fluctuations that give a sense of discomfort to the driver are not caused.

Figure 8:
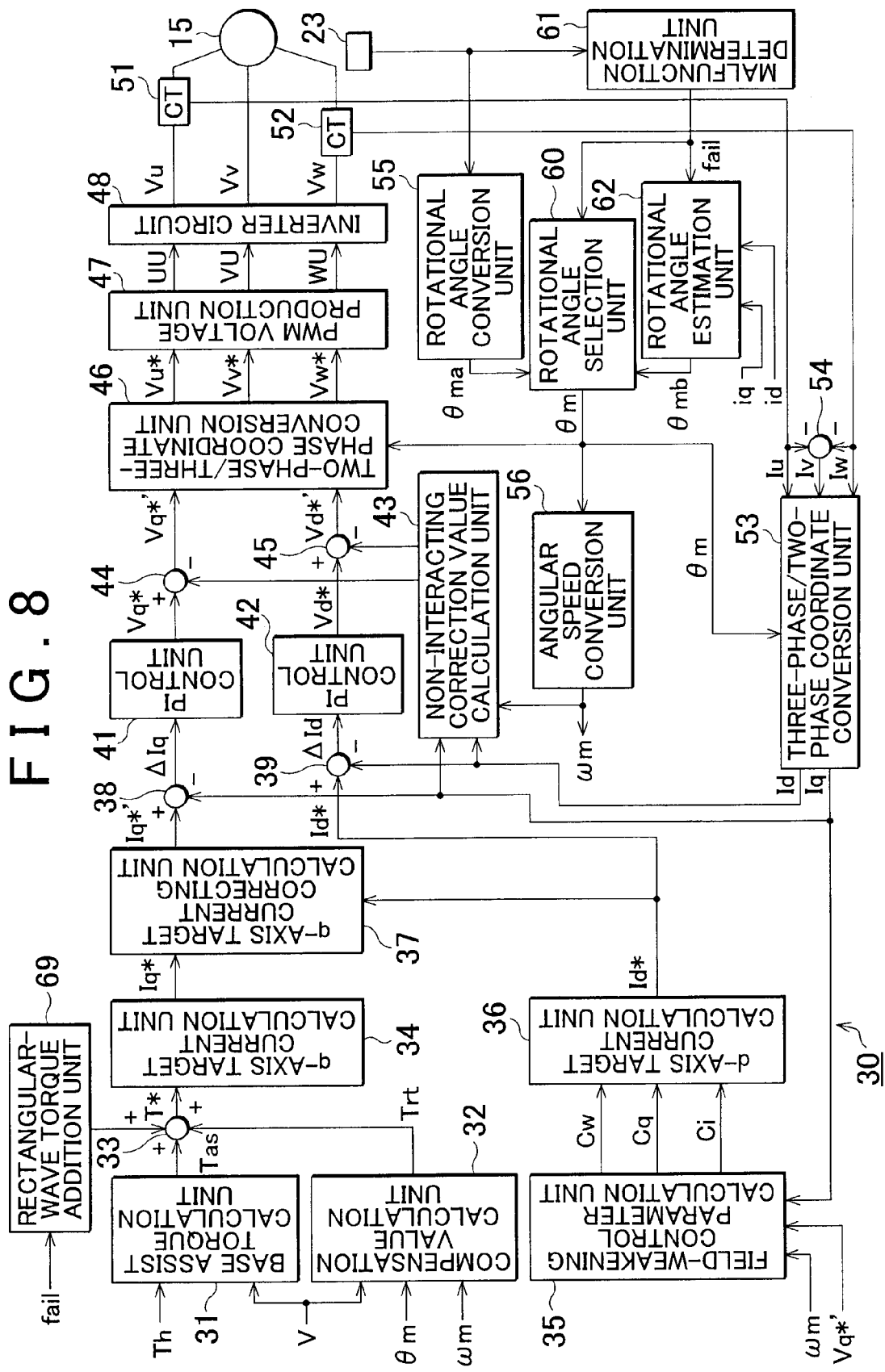
FIG. 8 is a block diagram showing the functional configuration of an electronic control unit according to a seventh embodiment of the invention.

Next, an electric power steering apparatus according to a seventh embodiment of the invention will be described. FIG. 8 shows the functions of the electronic control unit 30 of the electric power steering apparatus according to the seventh embodiment of the invention. The electronic control unit 30 according to the seventh embodiment of the invention has mostly the same structure as that of the electronic control unit 30 according to the fourth embodiment of the invention except that a rectangular-wave torque addition unit 69 indicated by the heavy-line frame in FIG. 8 is provided instead of the sine-wave torque addition unit 66 according to the fourth embodiment of the invention. Because the other structure is the same as that in the fourth embodiment, the same portions as those in the fourth embodiment will be denoted by the same reference numerals as those in the fourth embodiment and the description thereof will not be provided below.

The rectangular-wave torque addition unit 69 receives a malfunction determination signal from the malfunction determination unit 61. When determining that a malfunction has occurred in the rotational angle sensor 23, the malfunction determination unit 61 outputs a sensor malfunction signal "fail" as the malfunction determination signal. When receiving the sensor malfunction signal "fail", the rectangular-wave torque addition unit 69 outputs a high-frequency rectangular-wave torque command to the calculation unit 33. The upper graph in FIG. 21 shows the wave-form of the torque command value. The current waveform produced when the electric motor 15 is driven according to the rectangular-wave torque command is the same as the waveform shown in the upper graph in FIG. 21. The middle graph in FIG. 21 shows the time-change in the motor rotational angle when the electric motor 15 is driven according to the rectangular-wave torque command. The lower graph in FIG. 21 shows the motor rotational angular speed when the electric motor 15 is driven according to the rectangular-wave torque command.

As in the fourth embodiment of the invention, the calculation unit 33 calculates the target command torque T* by adding the base assist torque Tas calculated by the base assist torque calculation unit 31, the compensation value Trt calculated by the compensation value calculation unit 32, and the rectangular-wave torque command value indicated by a signal transmitted from the rectangular-wave torque addition unit 69 together.

When it is determined that a malfunction has occurred in the rotational angle sensor 23, the rotation of the electric motor 15 is controlled based on the estimated rotational angle obtained by the rotational angle estimation unit 62. However, if the motor rotational angular speed ωm decreases at this time, the accuracy of the estimated rotational angle θmb is reduced. Especially, in the electric power steering apparatus, it is difficult to accurately estimate the rotational angle because the electric motor is rotated at a considerably low speed in many cases. Therefore, according to the seventh embodiment of the invention, the rectangular-wave torque is added to the target command torque. As a result, it is possible to prevent the motor rotational angular speed ωm from being maintained below a predetermined value, thereby improving the accuracy of the estimated rotational angle θmb.

Especially, according to the seventh embodiment of the invention, because the rectangular-wave torque is added to the target command torque, the time required to change the direction in which the electric motor 15 rotates is reduced and the period during which the motor rotational angular speed is below the predetermined value is reduced. When the rotational angle is estimated, an instantaneous decrease in the motor rotational angular speed does not cause considerable inconvenience. Accordingly, it is possible to actually stabilize the motor rotational angular speed. As a result, the accuracy of the estimated value estimated by the rotational angle estimation unit 62 further improves. Also, because periodic vibration is transmitted to the driver's steering wheel 11, it is easy to notify the driver of continuation of the malfunction state.

The high-frequency torque added to the target command torque by the rectangular-wave torque addition unit 69 is not limited to a torque having a wave-form that exhibits part of a square or a rectangle. For example, the high-frequency torque may be a torque having a substantially trapezoidal wave-form shown in FIG. 22.

Figure 9:
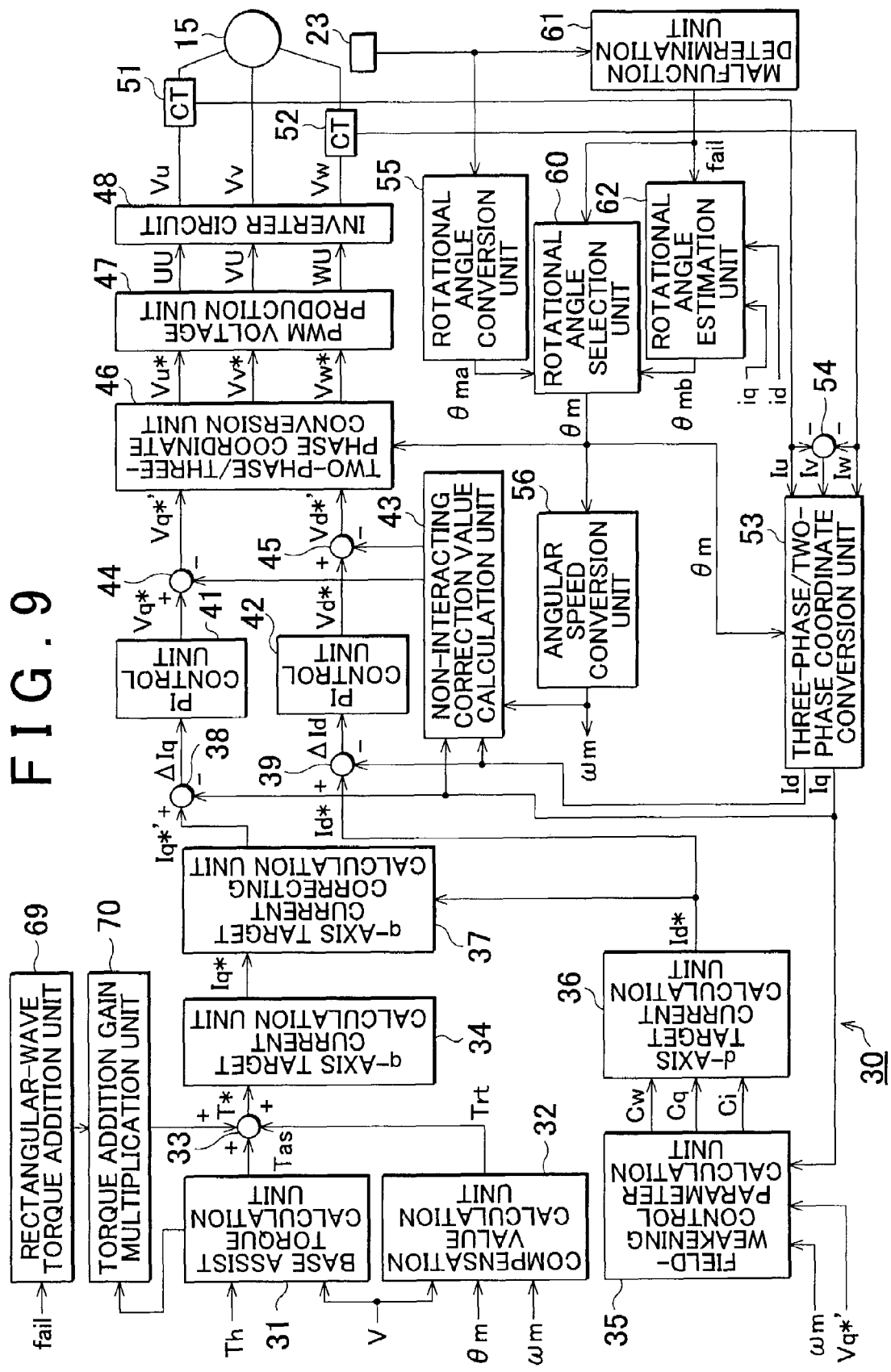
FIG. 9 is a block diagram showing the functional configuration of an electronic control unit according to an eighth embodiment of the invention.

Next, an electric power steering apparatus according to an eighth embodiment of the invention will be described. FIG. 9 shows the functions of the electronic control unit 30 of the electric power steering apparatus according to the eighth embodiment of the invention. The electronic control unit 30 according to the eighth embodiment has mostly the same structure as that in the seventh embodiment of the invention except that a torque addition gain multiplication unit 70 indicated by the heavy-line frame is further provided. Because the other structure is the same as that in the seventh embodiment of the invention, the same portions as those in the seventh embodiment will be denoted by the same reference numerals as those in the seventh embodiment and the description thereof will not be provided below.

A high-frequency rectangular-wave torque command transmitted from the rectangular-wave torque addition unit 69 is received by the torque addition gain multiplication unit 70. The torque addition gain multiplication unit 70 receives the information concerning the base assist torque Tas from the base assist torque calculation unit 31, and multiples the rectangular-wave torque command value by the torque addition gain K3x set based on the base assist torque Tas. The torque addition gain multiplication unit 70 transmits a signal indicating the value obtained by multiplying the rectangular-wave torque command value by the torque addition gain K3x.

The torque addition gain K3x is set to a smaller value as the base assist torque Tas decreases. Namely, the torque addition gain K3x is set such that the amplitude of the rectangular-wave torque is decreased as the base assist torque Tas decreases. FIG. 23 shows four examples A to D of the relationship between the base assist torque Tas and the torque addition gain K3x. The relationship between the base assist torque Tas and the torque addition gain K3x is stored in the torque addition gain multiplication unit 70 as a gain map.

In the electric power steering apparatus, the stiffness of the steering system changes in accordance with the steering assist torque. Namely, a spring body (for example, a torsion bar) is included in the steering mechanism 10 arranged between the driver's steering wheel 11 and the steering wheels FW1 and FW2. The degree to which the spring is twisted changes in accordance with the steering assist torque, and the stiffness of the steering system changes. For example, when the steering assist torque is low, the stiffness of the steering system is low. On the other hand, when the steering assist torque is high, the stiffness of the steering system is high. Accordingly, when a constant magnitude of the additional torque is set to be produced by the electric motor 15, an increase in the amplitude, which is required to maintain the motor rotational angular speed ωm equal to or higher than a predetermined value cannot be achieved.

Therefore, according to the eighth embodiment of the invention, the amplitude of the rectangular-wave torque is increased with an increase in the base assist torque Tas (corresponding to the target steering assist torque) calculated by the base assist torque calculation unit 31, whereby a required increase in the amplitude is constantly achieved. As a result, it is possible to constantly maintain the motor rotational angular speed ωm equal to or higher than the predetermined value. Accordingly, it is possible to improve the accuracy of the estimated rotational angle θmb estimated by the rotational angle estimation unit 62. As a result, the reliability and safety are further enhanced.

The gain map that associates the base assist torque Tas with the torque addition gain K3x may be prepared based on the compatibility between the steering assist torque and the additional torque, and the system model. The configuration may be such that the sine-wave torque may be added to the steering assist torque using the sine-wave torque addition unit 66 instead of the rectangular-wave torque addition unit 69.

Figure 10:
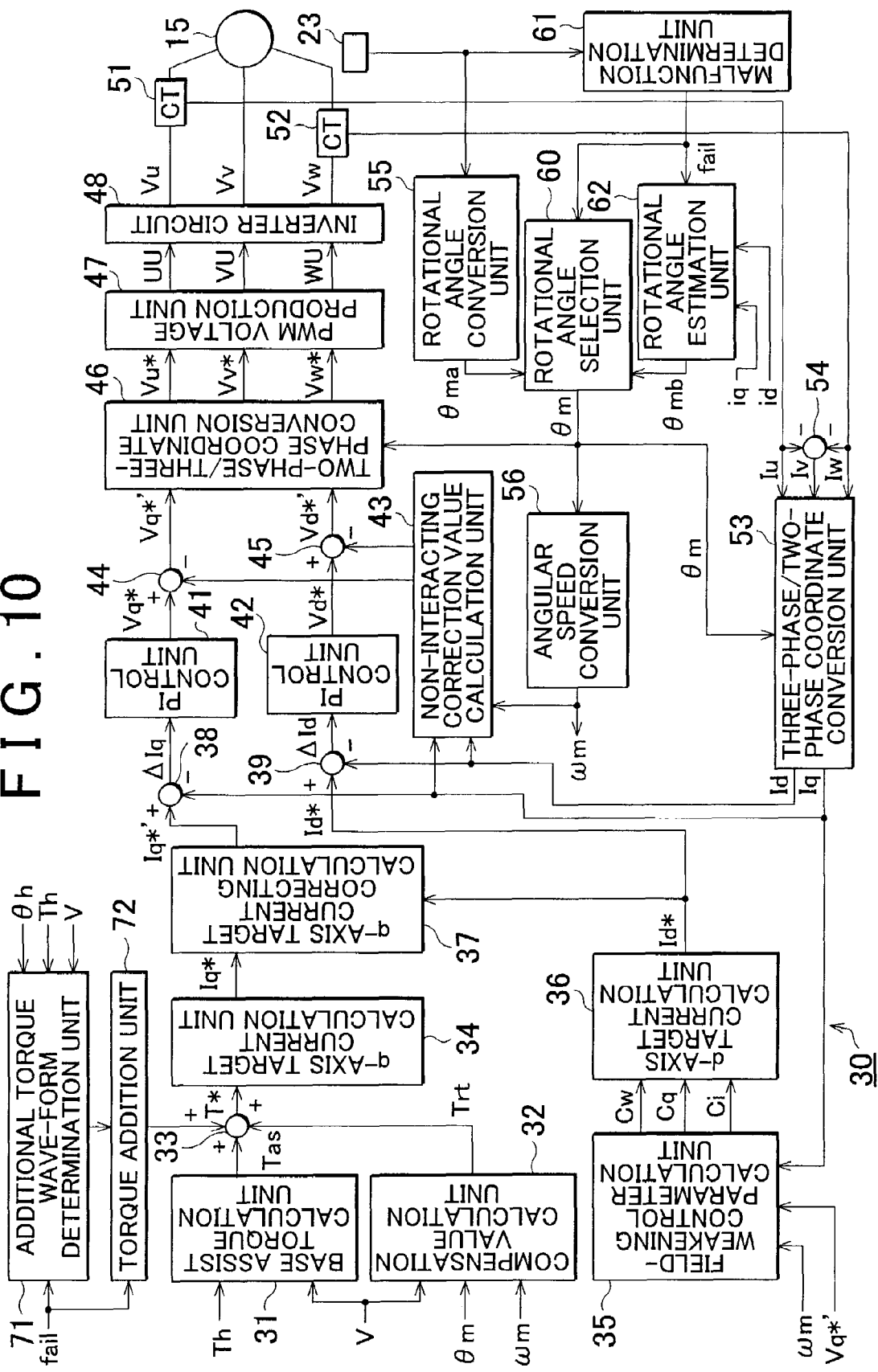
FIG. 10 is a block diagram showing the functional configuration of an electronic control unit according to a ninth embodiment of the invention.

Next, an electric power steering apparatus according to a ninth embodiment of the invention will be described. FIG. 10 shows the functions of the electronic control unit 30 of the electric power steering apparatus according to the ninth embodiment of the invention. The electronic control unit 30 according to the ninth embodiment is mostly the same as that in the fourth embodiment except that an additional torque wave-form determination unit 71 and a torque addition unit 72 indicated by the heavy-line frames are provided instead of the sine-wave torque addition unit 66 according to the fourth embodiment of the invention. Because the other structure is the same as that according to the fourth embodiment of the invention, the same or corresponding portions will be denoted by the same reference numerals and the description thereof will not be provided below.

The additional torque wave-form determination unit 71 and the torque addition unit 72 receive a malfunction determination signal, indicating that a malfunction has occurred in the rotational angle sensor 23, from the malfunction determination unit 61. When a sensor malfunction signal "fail" has been received due to a malfunction of the rotational angle sensor 23, the additional torque wave-form determination unit 71 and the torque addition unit 72 are in the active state. On the other hand, when a sensor malfunction signal "fail" has not been received, the additional torque wave-form determination unit 71 and the torque addition unit 72 are in the non-active state.

The additional torque wave-form determination unit 71 receives the information concerning the steering angle θh detected by the steering angle sensor 24, the information concerning the steering torque Th detected by the steering torque sensor 21, and the information concerning the vehicle speed V detected by the vehicle speed sensor 22. The additional torque wave-form determination unit 71 determines the wave-form of the additional torque based on the three pieces of information (θh, Th, V). Namely, in the fourth to eighth embodiments of the invention described above, the motor rotational angular speed ωm is maintained at a high value by adding the high-frequency torque (the sine-wave torque or the rectangular-wave torque) having a wave-forms set in advance to the base assist torque Tas. In contrast, according to the ninth embodiment of the invention, the wave-form of the additional torque is determined based on the steering information (θh and Th) and the information concerning vehicle speed V.

Figure 24A:
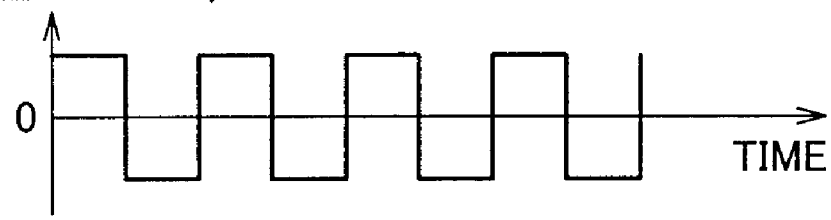
FIGS. 24A and 24B illustrate graphs showing time-changes in the target rotational angular speed and the motor torque according to the ninth embodiment of the invention.

To enhance the accuracy of estimation of the rotational angle, the motor rotational angular speed ωm needs to be maintained equal to or higher than a predetermined value. Accordingly, as shown in FIG. 24A, the target value of the motor rotational angular speed is set to have a rectangular wave-form. In this case, the time required to change the direction in which the motor rotates becomes the minimum value, and motor rotational angular speed is maintained equal to or higher than the predetermined value.

The additional torque wave-form determination unit 71 determines the wave-form of the additional torque used to achieve the motor rotational angular speed having the rectangular wave-form. The wave-form of the additional torque is determined with the steering system model taken into account. The steering system model is set based on the stiffness of the system, the inertia of the system, the mass of the system, the steering assist torque, etc. The stiffness of the system and the steering assist torque are set based on the parameters, for example, the steering state amounts such as the steering angle θh and the steering torque Th, and the vehicle speed V.

Therefore, according to the ninth embodiment of the invention, the steering system model is set based on the parameters, and the target wave-form of the additional torque corresponding to the system model is determined. For example, the amplitude of the additional torque required to maintain the motor rotational angular speed ωm equal to or higher than the predetermined value varies depending on the magnitude of stiffness of the system. Accordingly, the additional torque wave-form determination unit 71 increases the amplitude of the additional torque with an increase in the stiffness of the system. The response of the rotation of the electric motor 15 changes in accordance with the inertia and the mass of the system. Accordingly, the additional torque wave-form determination unit 71 changes the rate at which the additional torque is increased, the rate at which the additional torque is decreased, etc.

Figure 24B:
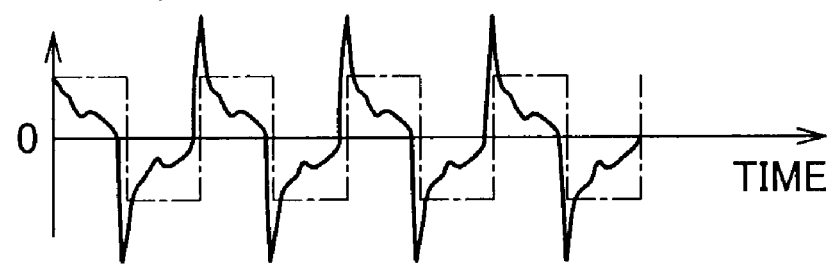
Figure 25:
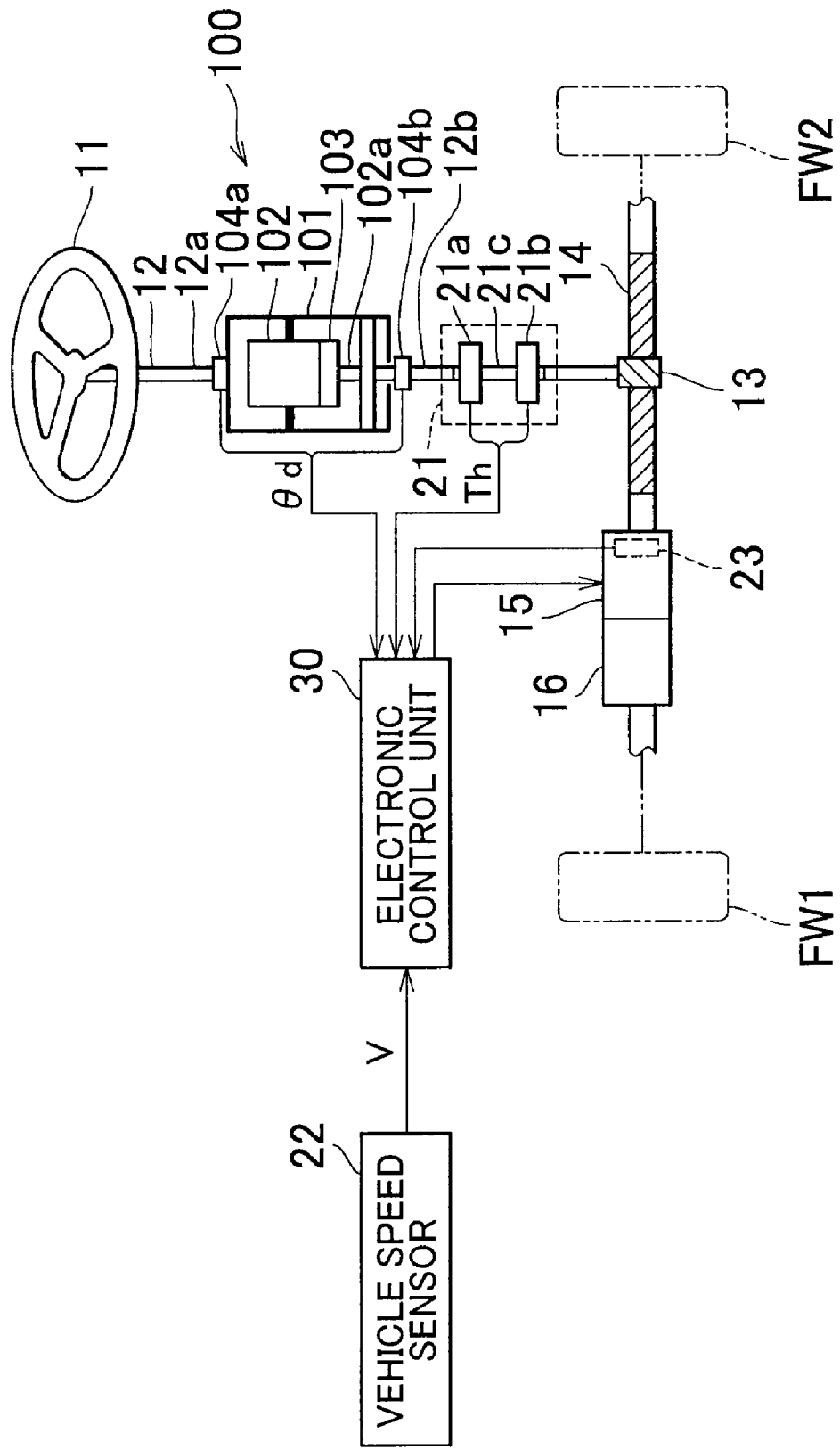
FIG. 25 is a view schematically showing the structure of a steering mechanism of an electric power steering apparatus according to the tenth embodiment of the invention.

Accordingly, the additional torque wave-form determination unit 71 determines the wave-form of the additional torque wave-form, which is optimum for the steering system model set based on the steering angle θh, the steering torque Th, and the vehicle speed V. In this case, the additional torque wave-form determination unit 71 stores the wave-form map (not shown) used to determine the wave-form of the additional torque based on the three parameters (θh, Th, V), and determine the wave-form of the additional torque with reference to the wave-form map. Alternatively, the wave-form of the additional torque may be determined using a function. For example, in order to determine the wave form of the motor rotational angular speed shown in FIG. 24A, the wave-form of the torque wave-form shown in FIG. 24B is determined based on the three parameters (θh, Th, V).

A signal indicating the torque wave-form determined by the additional torque wave-form determination unit 71 is transmitted to the torque addition unit 72. The torque addition unit 72 transmits a high-frequency torque command to the calculation unit 33 based on the signal indicating the torque wave-form transmitted from the additional torque wave-form determination unit 71. The calculation unit 33 calculates the target command torque T* by adding up the base assist torque Tas calculated by the base assist torque calculation unit 31, the compensation value Trt calculated by the compensation value calculation unit 32, and the torque command value indicated by a signal output from the torque addition unit 72.

According to the ninth embodiment of the invention, the wave form of the additional torque, with which desired motor speed characteristics are obtained, is determined by the additional torque wave-form determination unit 71 based on the steering system model. Accordingly, the optimum torque is added to the steering assist torque. In this example, the target motor rotational angular speed has a rectangular wave-form. However, if priority is given to suppression of transmission of the vibration to the driver's steering wheel 11, the motor rotational angular speed may have a sine-wave form.

Next, an electric power steering apparatus according to a tenth embodiment of the invention will be described. The electric power steering apparatus according to the tenth embodiment of the invention prevents transmission of the vibration due to the additional torque to the driver's steering wheel 11 using a steering gear ratio changing device. The electric power steering apparatus according to the tenth embodiment of the invention is implemented by applying the steering gear ratio changing device to the electric power steering apparatus according to any one of the fourth to ninth embodiments described above. The example where the steering gear ratio changing device is applied to the electric power steering apparatus according to the fourth embodiment of the invention will be described below.

In the electric power steering apparatus according to the tenth embodiment of the invention, the steering shaft 12 has an upper shaft 12a and a lower shaft 12b, the driver's steering wheel 11 is fixed to the upper end of the upper shaft 12a, the pinion 13 is provided at the lower end portion of the lower shaft 12b, and the pinion 13 meshes with the rack teeth formed in the rack bar 14 to form the rack-and-pinion mechanism. The structure in which the pinion 13 is meshed with the rack bar 14 is the same as that in the fourth to ninth embodiments of the invention described above. Accordingly, the same or corresponding portions will be denoted by the same reference numerals, and the description thereof will not be provided below. The lower shaft 12b is provided with the steering torque sensor 21 that is the same as that in the fourth embodiment of the invention.

A steering gear ratio changing device 100 is provided between the upper shaft 12a and the lower shaft 12b. The steering gear ratio changing device 100 changes the steering gear ratio that is the ratio of the rotational angle of the driver's steering wheel 11 to the steering angle of the right and left steering wheels FW1 and FW2, that is, the ratio of the rotational angle of the upper shaft 12a to the rotational angle of the lower shaft 12b. The steering gear ratio changing device 100 includes a cylindrical casing 101 that is connected to the lower end of the upper shaft 12a such that the casing 101 rotates together with the upper shaft 12a. In the casing 101, an electric motor 102 that forms a steering gear ratio varying actuator is fixedly arranged. An output shaft 102a of the electric motor 102 is rotatably supported by the casing 101, and connected at its lower end to the lower shaft 12b such that the output shaft 102a rotates together with the lower shaft 12b.

The electric motor 102 is provided with a speed-reduction mechanism 103. The rotational speed of the electric motor 102 is reduced by the speed-reduction mechanism 103, and the rotation having a reduced speed is output to the output shaft 102a. The upper shaft 12a and the lower shaft 12b are provided with a rotational angle sensor 104a and a rotational angle sensor 104b that detect the rotational angles of these shafts, respectively. Each of the rotational angle sensors 104a and 104b is formed, for example, of a resolver sensor. The rotational angle sensors 104a and 104b output rotational angle signals corresponding to the rotational angle positions of the upper shaft 12a and the lower shaft 12b, respectively. Accordingly, the rotational angle difference θd between the upper shaft 12a and the lower shaft 12b (hereinafter, referred to as the "differential angle θd") is detected by calculating the difference between the two rotational angle positions. In the specification, the two rotational angle sensors 104a and 104b will be collectively referred to as a rotational angle sensor 104, and the following description will be provided on the assumption that a signal indicating the differential angle θd is output from the rotational angle sensor 104.

Figure 11:
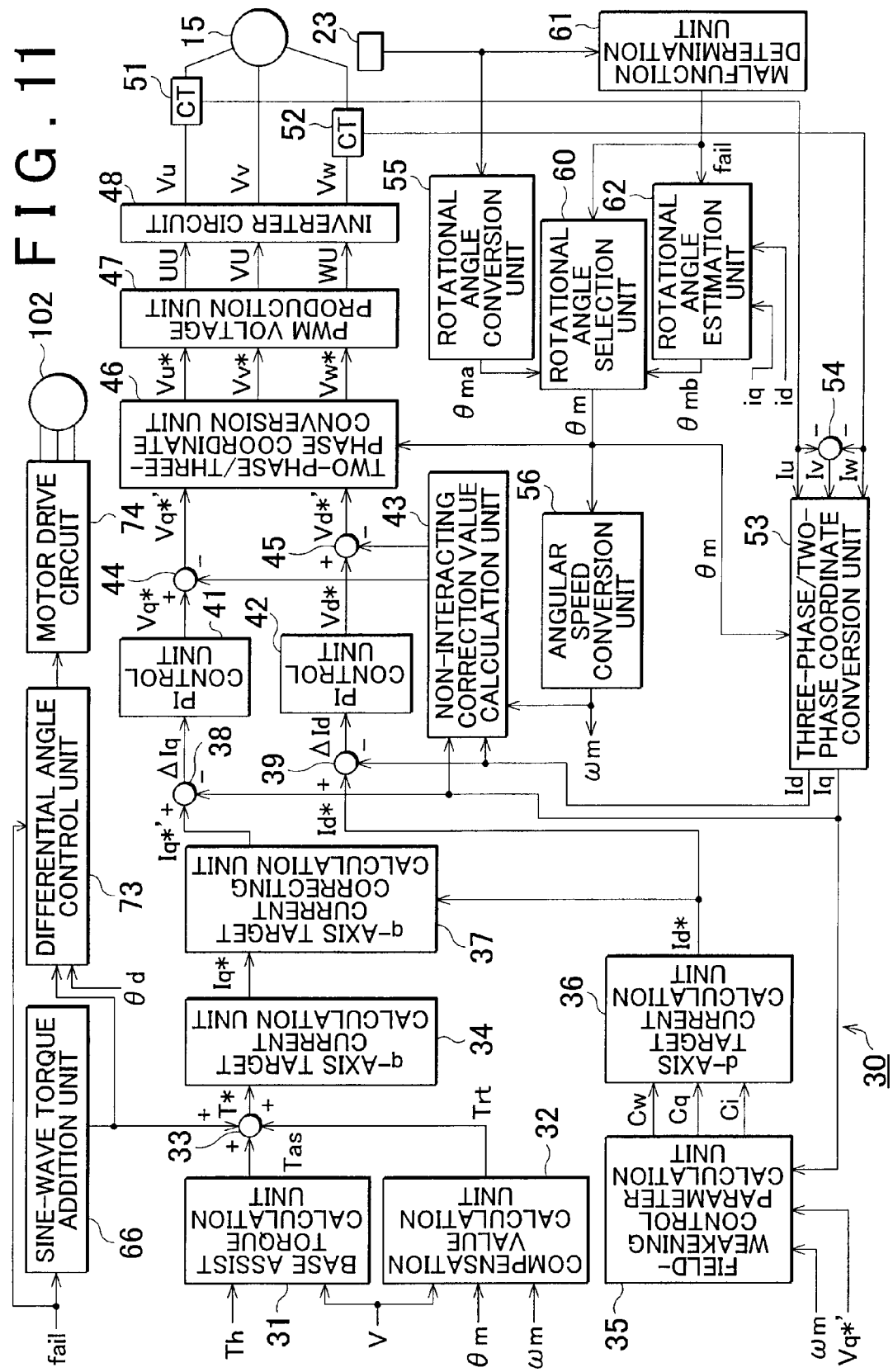
FIG. 11 is a block diagram showing the functional configuration of an electronic control unit according to a tenth embodiment of the invention.

The functions and the structure of the electronic control unit 30 according to the tenth embodiment of the invention will be described with reference to FIG. 11. The electronic control unit 30 according to the tenth embodiment is mostly the same as that according to the fourth embodiment except that a differential angle control unit 73 and a motor drive circuit 74 corresponding to gear ratio control means according to the invention is provided.

As in the fourth embodiment of the invention, the electronic control unit 30 includes the sine-wave torque addition unit 66. When receiving a sensor malfunction signal "fail" from the malfunction determination unit 61, the sine-wave torque addition unit 66 transmits a sine-wave torque command to the calculation unit 33, and adds the sine-wave torque to the target command torque for the electric motor 15. Thus, it is possible to prevent the motor rotational angular speed ωm from being maintained lower than a predetermined value. In this case, in order to maintain the motor rotational angular speed ωm at or higher than the predetermined value, the amplitude of the additional torque increases, and the vibration due to the additional torque is transmitted to the driver's steering wheel 11. As a result, the driver may feel a sense of discomfort. Therefore, according to the tenth embodiment of the invention, the differential angle control unit 73 and the motor drive circuit 74 control the operation of the steering gear ratio changing device 100 to prevent transmission of the vibration.

Figure 26:
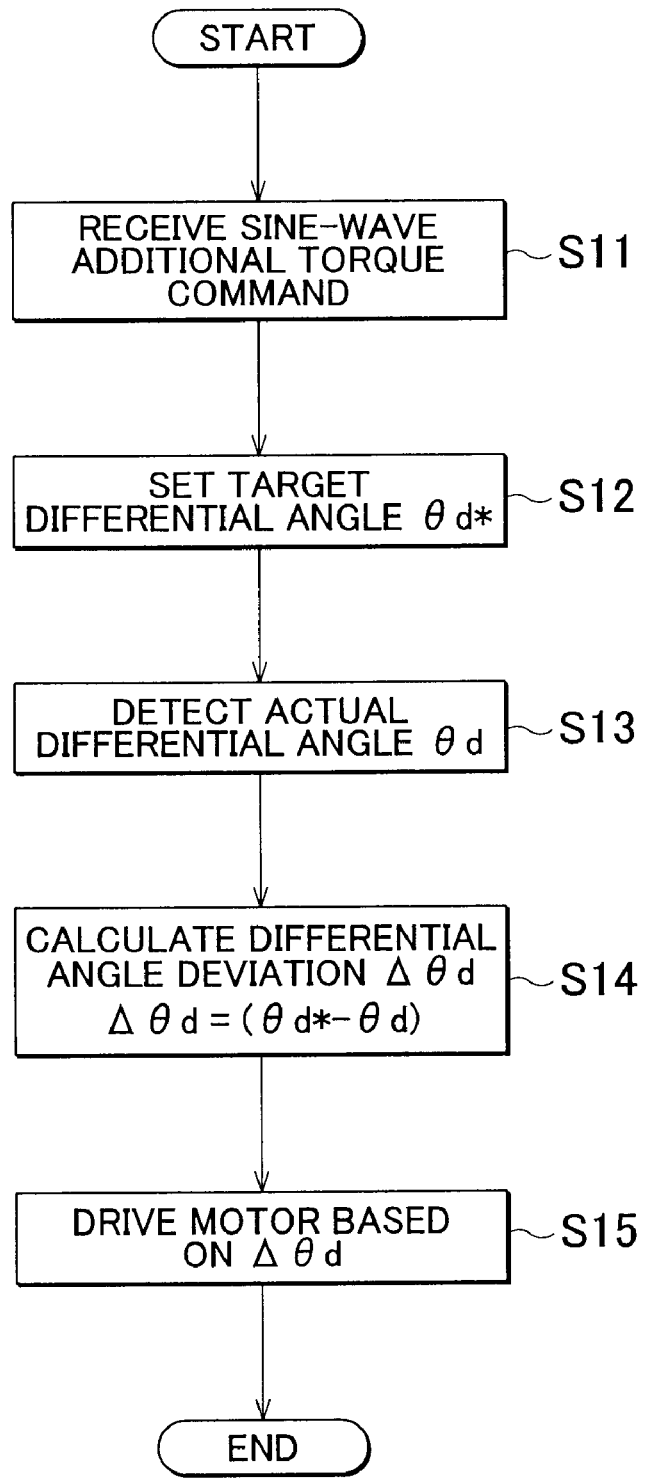
FIG. 26 is a flowchart showing the differential angle control routine according to the tenth embodiment of the invention.

The differential angle control unit 73 receives a high-frequency sine-wave torque command from the sine-wave torque addition unit 66, and transmits a control command to the motor drive circuit 74 through the differential angle control described later, thereby driving the electric motor 102. FIG. 26 is the flowchart showing the differential angle control routine executed by the differential angle control unit 73. The differential angle control routine is stored as the control program in the storage circuit of the differential angle control unit 73, and periodically executed.

Figure 27:
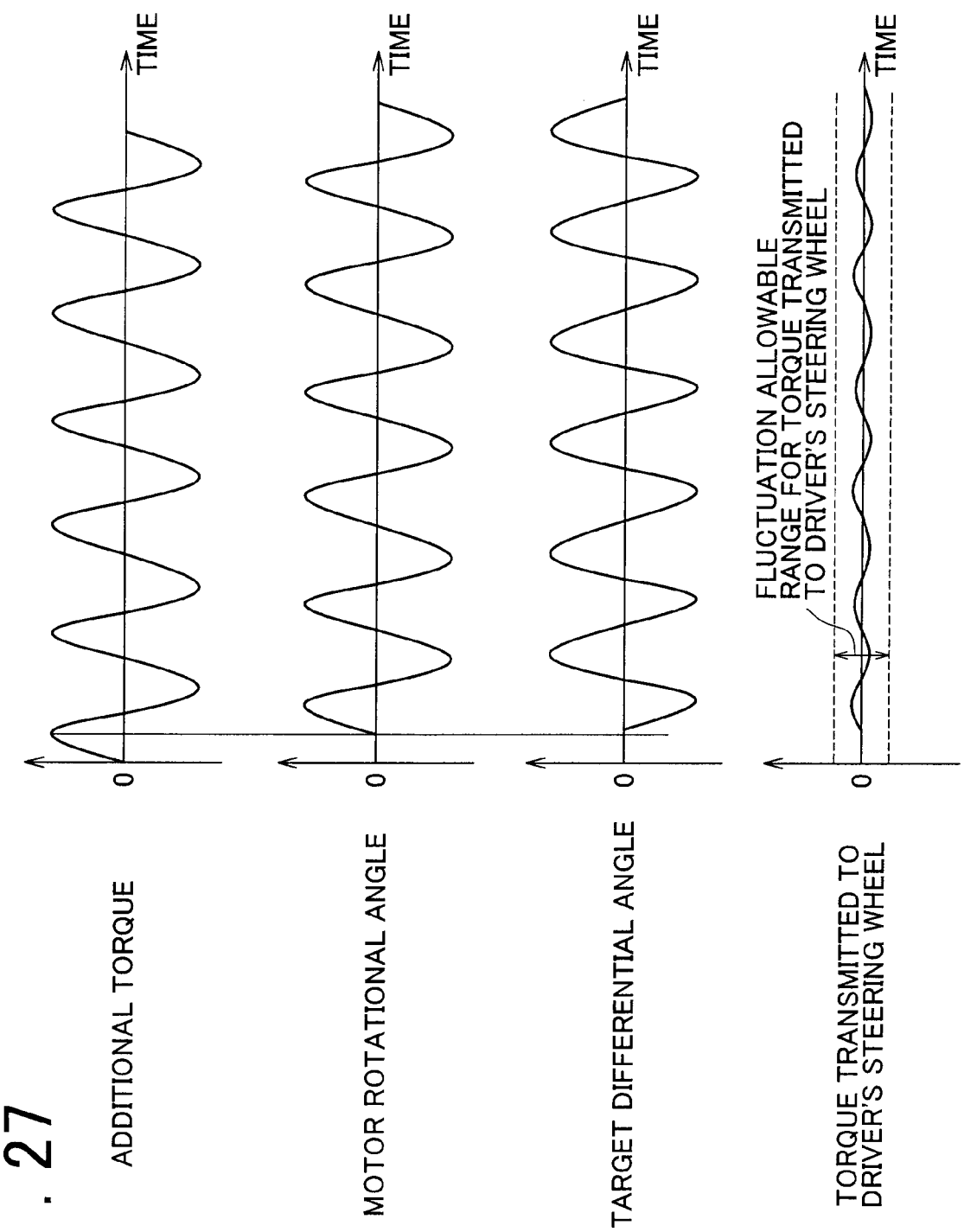
FIG. 27 illustrates graphs showing time-changes in the additional torque, the motor rotational angle, the target differential angle, and the toque applied to the driver's steering wheel according to the tenth embodiment of the invention.
Figure 28:
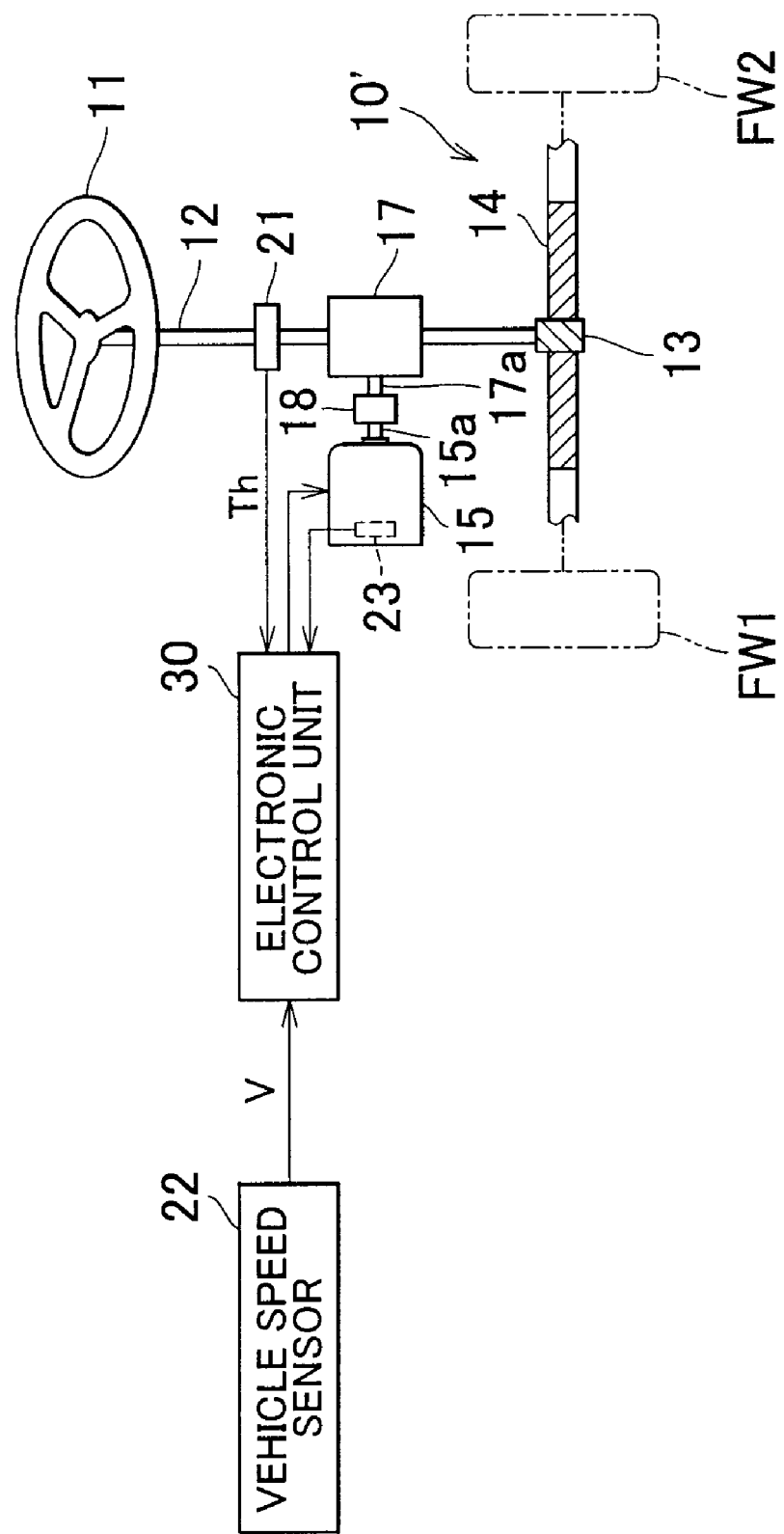
FIG. 28 is a view schematically showing the structure of a steering mechanism of an electric power steering apparatus according to an eleventh embodiment of the invention.

When receiving a sensor malfunction signal "fail", the differential angle control unit 73 starts the control routine. First, in step S11, the differential angle control unit 73 receives a sine-wave torque command transmitted from the sine-wave torque addition unit 66 (S11). The wave-form in the top graph in FIG. 27 shows the wave-form of the sine-wave torque. The wave-form in the second top graph in FIG. 27 shows the motor rotational angle when the electric motor 15 is driven according to the sine-wave torque command. Next, in step S12, the differential angle control unit 73 sets the target differential angle θd* such that the target differential angle θd* synchronizes to the sine-wave torque command. As shown in FIG. 27, the target differential angle θd* is set with a predetermined phase difference with respect to the sine-wave torque command such that the sine-wave torque component added to the steering assist torque is cancelled by the steering gear ratio changing device 100.

In step S13, the differential angle control unit 73 receives the information concerning the actual differential angle θd at the present moment, which is detected by the rotational angle sensor 104. Next, in step S14, the deviation Δθd (=θd*−θd) of the actual differential angle θd from the target differential angle θd* is calculated. In step S15, a motor control command is transmitted to the motor drive circuit 74 based on the deviation Δθd. Namely, the motor control command carrying the control amount set such that the deviation Δθd becomes 0 is transmitted to the motor drive circuit 74. The motor driver circuit 74 is formed, for example of an inverter circuit. The motor drive circuit 74 supplies electricity to the electric motor 102 of the steering gear ratio changing device 100 according to the motor control command from the differential angle control unit 73.

The control routine is periodically executed at predetermined short intervals. According to the control routine, the steering gear ratio changing device 100 operates to cancel the sine-wave torque component added to the steering assist torque. As a result, as shown by the wave-form in the bottom graph in FIG. 27, the vibration transmitted to the driver's steering wheel 11 due to the sine-wave torque is suppressed within the allowable range. Accordingly, the driver does not feel a sense of discomfort. Namely, it is possible to enhance the accuracy of the estimated rotational angle by ensuring a predetermined motor rotational angular speed, and suppress transmission of the vibration to the driver's steering wheel. When the vibration due to the additional torque is reduced using the steering gear ratio changing device 100, the frequency of the additional torque (the same as the frequency of the differential angle) is set to be sufficiently higher than the lateral resonance frequency, the vertical resonance frequency and the resonance frequency around a tire of the vehicle.

Next, an electric power steering apparatus according an eleventh embodiment of the invention will be described with reference to FIGS. 28, 29, 30A and 30B. In the electric power steering apparatus according to the eleventh embodiment of the invention, a variable stiffness portion having variable stiffness is provided to a connection portion between the output shaft of the electric motor 15 and the steering mechanism 10. The stiffness of the variable stiffness portion is changed based on the torque output from the electric motor 15. The eleventh embodiment of the invention may be applied to any one of the fourth to ninth embodiments of the invention in which high-frequency torque is added to the steering assist torque. The portions having the same functions as those in FIG. 1 will be denoted by the same reference numerals, and will be described just briefly below.

In the electric power steering apparatus according to the eleventh embodiment of the invention, the steering assist torque is applied to the steering shaft. A steering mechanism 10' in the electric power steering apparatus according to the eleventh embodiment of the invention is provided with the steering shaft 12 that is connected at its upper end to the driver's steering wheel 11 such that the steering shaft 12 rotates together with the driver's steering wheel 11. The pinion gear 13 is connected to the lower end of the shaft 12 so as to rotate together with the steering shaft 12. The pinion gear 13 meshes with the rack teeth formed in the rack bar 14, whereby the rack-and-pinion mechanism is formed. The left front wheel FW1 and a right front wheel FW2 are connected to the respective ends of the rack bar 14 via the tie rods (not shown) and the knuckle arms (not shown) so that the front wheels FW1 and 2 can be steered. The left front wheel FW1 and the right front wheel FW2 are steered in the clockwise direction or in the counterclockwise direction in accordance with the movement of the rack bar 14 in its axial direction, which is caused due to the rotation of the steering shaft 12 about its axis.

A speed-reduction gear 17 that rotates together with the steering shaft 12 is provided at the middle portion of the steering shaft 12. An input shaft 17a of the speed-reduction gear 17 is connected to an output shaft 15a of the electric motor 15 used to produce the steering assist torque by a connector 18. Accordingly, the torque produced by the electric motor 15 is transmitted to the speed-reduction gear 17 via the connector 18, whereby the steering assist torque is applied to the steering shaft 12. In the eleventh embodiment of the invention, the steering mechanism 10' includes the driver's steering wheel 11, the steering shaft 12, the speed-reduction gear 17, the rack-and-pinion mechanism, the tie rods, the knuckle arms, etc.

Figure 29:
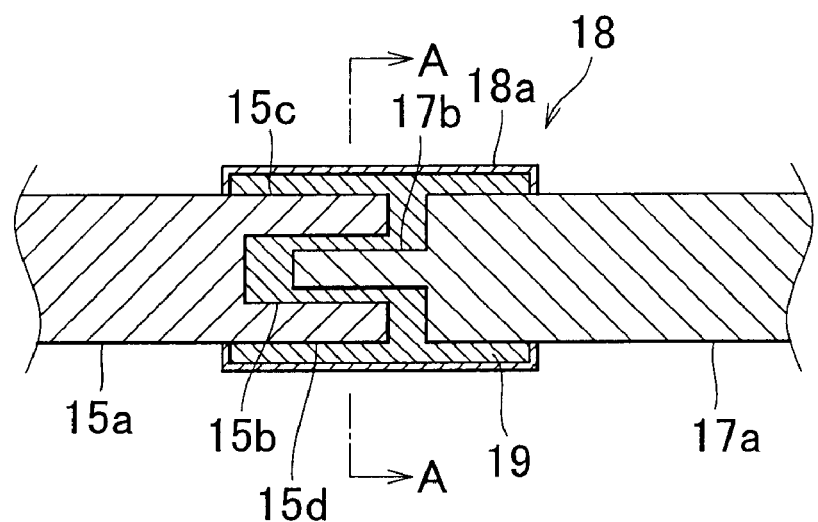
FIG. 29 is a cross-sectional view of a connector, taken along the plane extending in the axial direction thereof according to the eleventh embodiment of the invention.

As shown in FIG. 29, the connector 18 is provided with a cylindrical connection casing 18a that covers the end of the output shaft 15a of the electric motor 15 and the end of the input shaft 17a of the speed-reduction gear 17, which are engaged with each other. The output shaft 15a of the electric motor 15 (hereinafter, referred to as the "motor shaft 15a") is formed in a cylindrical shape, and a groove 15b is formed in its end portion. The cross-section of the end portion, in which the groove 15b is formed, is U-shaped, when the end portion is taken along the plane extending in the axial direction of the output shaft 15a. Pieces 15c and 15d that form the respective ends of the groove 15b and that face each other serve as the portions that transmit the rotational force to the input shaft 17a of the speed-reduction gear 17 (hereinafter, referred to as the "speed-reduction gear shaft 17a"), and is formed in a quadratic prism. Hereafter, the pieces 15c and 15d that face each other will be referred to as connection output pieces 15c and 15d.

The speed-reduction gear shaft 17a is formed in a cylindrical shape. The side portions of the end portion of the speed reduction gear shaft 17a, which face each other are flatly cut off in the axial direction, whereby a quadratic prism 17b is formed at the center portion of the speed-reduction gear shaft 17a. Hereafter, the quadratic prism 17b will be referred to as the connection input piece 17b. The connection input piece 17b is arranged in the groove 15b of the motor shaft 15a such that a predetermined distance is kept between each of the connection output pieces 15c and 15d at the respective ends of the groove 15b and the connection input piece 17b. In this state, the end of the motor shaft 15a and the end of the speed-reduction gear shaft 17a are covered by the connection casing 18a. An elastic member 19 (elastomer) is arranged in the connection casing 18a. Accordingly, the motor shaft 15a and the speed-reduction gear shaft 17a are connected to each other via the elastic member 19 while not contacting each other.

Figure 30A:
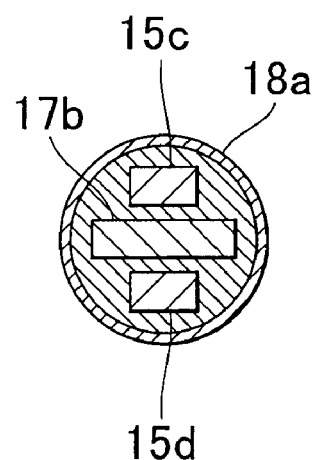
FIGS. 30A and 30B illustrate cross-sectional views of the connector taken along the line A-A in FIG. 29 according to the eleventh embodiment of the invention.
Figure 30B:
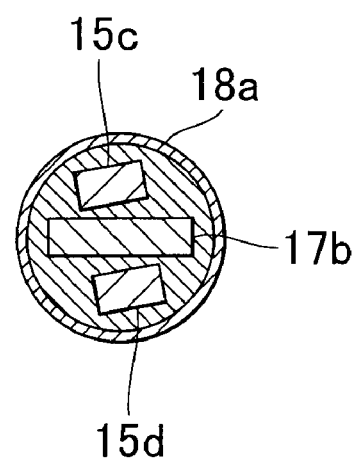

FIGS. 30A and 30B illustrate the cross-sectional views taken along the line A-A in FIG. 29. FIG. 30A shows the non-operating state, namely, the connection state when the electric motor 15 does not produce a rotary torque. In this case, the connection input piece 17b is arranged at the middle position between the connection output pieces 15c and 15d that face each other such that the connection input piece 17b is parallel to the connection output pieces 15c and 15d. The elastic member 19 is arranged between the connection output pieces 15c and 15d, and the connection input piece 17b. In this state, the rotary torque is produced by the electric motor 15. If the rotary torque is low, although the motor shaft 15a rotates, the elastic member 19 is deformed, as shown in FIG. 30B. As a result, the rotary torque is not easily transferred to the speed-reduction gear shaft 17a. Namely, the rotational angle of the speed-reduction gear shaft 17a with respect to the rotational angle of the motor shaft 15a is small due to the deformation of the elastic member 19. If the rotary torque produced by the electric motor 15 increases, further deformation of the elastic member 19 is suppressed, and the rotary torque applied to the connection output pieces 15c and 15d is transmitted to the connection input piece 17b with the elastic member 19 deformed, and the speed-reduction gear shaft 17a rotates.

Figure 31:
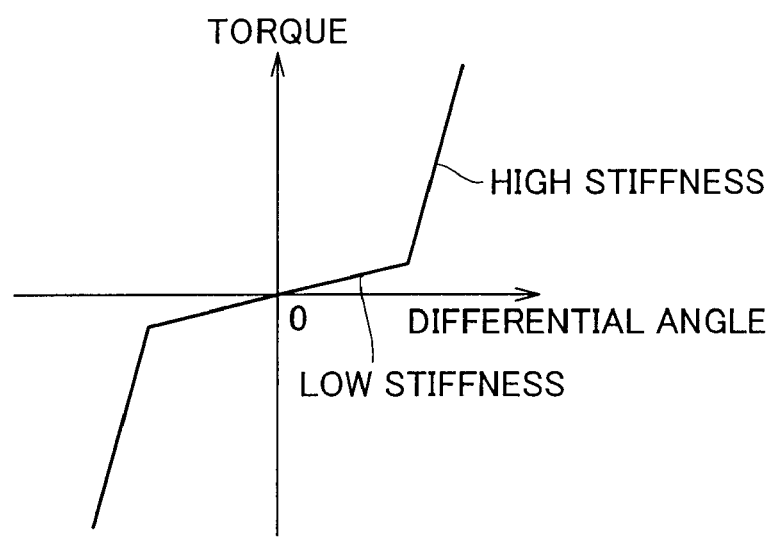
FIG. 31 is a graph showing the stiffness characteristics according to the eleventh embodiment of the invention.

As shown in FIG. 31, in the connector 18, the rate of increase in the differential angle (the difference in the rotational angel between the motor shaft 15a and the speed-reduction gear shaft 17a) with respect to an increase in torque is high in the low torque range in which the torque output from the electric motor 15 is low. Namely, the connector 18 has low stiffness characteristics. On the other hand in the high torque range in which the torque output from the electric motor 15 is high, the rate of increase in the differential angle with respect to an increase in torque is low. Namely, the connector 18 has high stiffness characteristics. The stiffness characteristic of the connector 18 change in accordance with the torque output from the electric motor 15, and the stiffness in the low torque range is lower than that in the high torque range. The range in which the stiffness of the connector 18 is low is preferably the range between 5 degrees and 25 degrees in the motor rotational angle in each of the clockwise direction and the counterclockwise direction.

In each of the fourth to ninth embodiments of the invention described above, when it is determined that a malfunction has occurred in the rotational angle sensor 23, the high-frequency torque (the sine-wave torque or the rectangular-wave torque) is added to the steering assist torque, whereby the motor rotational angular speed ωm is maintained equal to or higher than the predetermined value to ensure accuracy of the estimated rotational angle. However, the additional torque may be transmitted to the driver's steering wheel 11 as vibration, and the driver may feel a sense of discomfort. Therefore, according to the eleventh embodiment of the invention, the connector 18 that has the variable stiffness characteristics is provided between the motor shaft 15a and the speed-reduction gear shaft 17a. The stiffness of the connector 18 in the low torque range is lower than that in the high torque range. Thus, the vibration due to the additional torque is not easily transmitted to the driver's steering wheel 11.

When the force for operating the driver's steering wheel (the steering torque) is small, the driver is more likely to feel the torque fluctuations. In this case, the steering assist torque produced by the electric motor 15 is low. At this time, the stiffness of the connector 18 provided at the connection portion between the electric motor 15 and the steering mechanism 10' is low. Accordingly, when the electric motor 15 produces a high-frequency torque, vibration having a predetermined amplitude is obtained without interfering with the turning operation of the electric motor 15. As a result, a high motor rotational angular speed ωm is ensured. In addition, the vibration is not easily transmitted to the driver's steering wheel 11, because the vibration is absorbed by the elastic member 19 of the connector 18.

When the driver's steering wheel is turned strongly, the electric motor 15 produces a high steering assist torque. In this case, the stiffness of the connector 18 is high. Accordingly, the rotary torque produced by the electric motor 15 is reliably transmitted to the steering mechanism 10', and an appropriate steering assist torque is produced. When the force for turning the driver's steering wheel 11 is large, the driver does not easily feel the torque fluctuations due to the additional torque. Accordingly, the driver does not easily feel a sense of discomfort.

Figure 32:
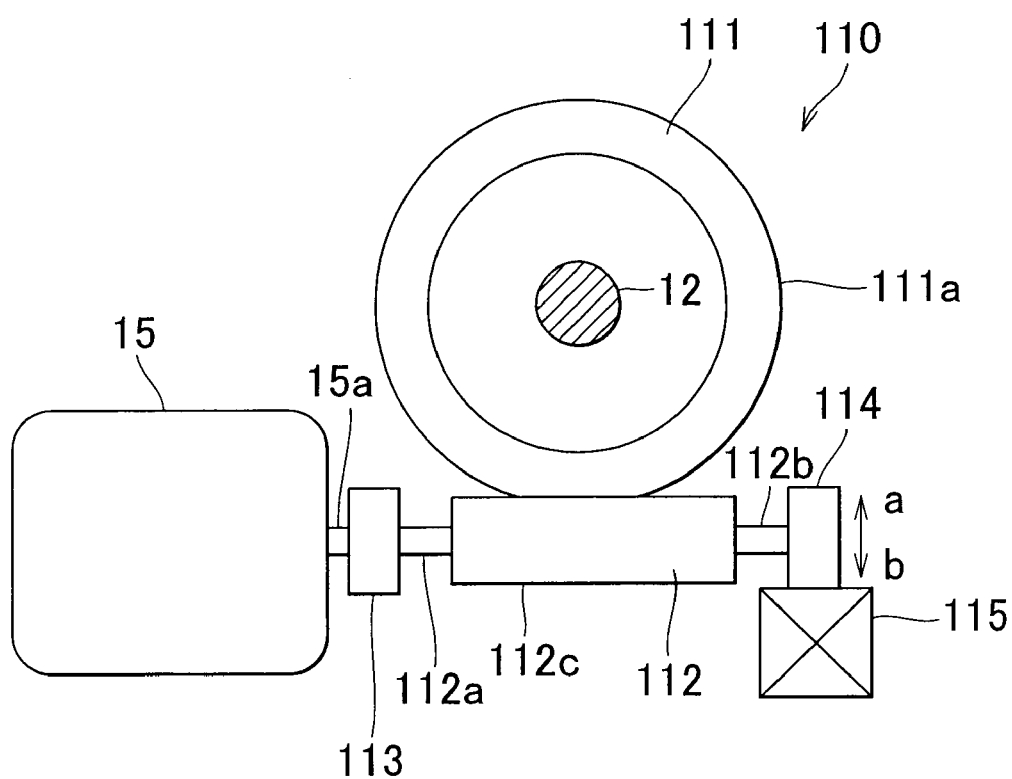
FIG. 32 is a view schematically showing the structure of a speed-reduction mechanism according to the twelfth embodiment of the invention.

Next, an electric power steering apparatus according to the twelfth embodiment of the invention will be described with reference to FIGS. 32 to 34. The electric power steering apparatus according to the twelfth embodiment of the invention differs from that according to the eleventh embodiment of the invention in the structure of the connection portion between the electric motor and the speed-reduction gear. The twelfth embodiment of the invention may be applied to the electric power steering apparatus according to any one of the fourth to ninth embodiments in which a high-frequency torque is added to the steering assist torque. In the description below, only the features of the twelfth embodiment of the invention, which are different from the eleventh embodiment of the invention will be described.

In the electric power steering apparatus according to the twelfth embodiment of the invention, a worm gear 110 is used as the speed-reduction gear provided to the steering shaft 12. FIG. 32 briefly shows the structure of the speed-reduction gear unit, and is the schematic view taken along the plane perpendicular to the axial direction of the steering shaft 12. The worm gear 110 includes a worm wheel 111 fixed to the steering shaft 12, a cylindrical worm 112 meshed with the worm wheel 111. The cylindrical worm 112 is provided with worm shafts 112a and 112b that are the rotating shaft and that extend from the respective ends of the cylindrical worm 112 in the axial direction. The worm shaft 112a is connected to the output shaft 15a of the electric motor 15, and rotatably supported by a first support bearing 113. The other worm shaft 112b is rotatably supported by a second support bearing 114.

Figure 33A:
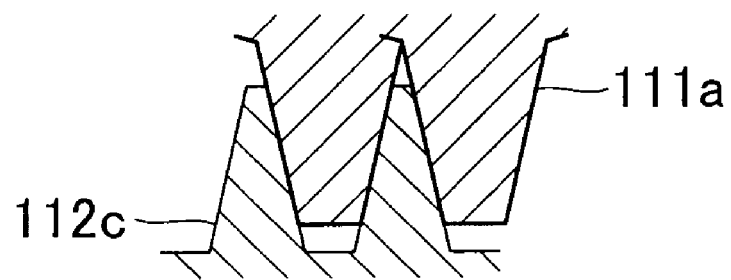
FIGS. 33A and 33B illustrate views each showing the mesh state of a worm gear according to the twelfth embodiment of the invention.

The second support bearing 114 is connected to a push-fit actuator 115. The push-hit actuator 115 is operated by the electricity supplied by the electronic control unit 30, thereby pushing the second support bearing 114 forward (the direction of arrow "a" in FIG. 32). Thus, a tooth row 112c of the cylindrical worm 112 is pushed into a tooth row 111a of the worm wheel 111 under a predetermined load, as shown in FIG. 33A. Hereafter, the state in which the tooth row 112c is meshed with the tooth row 111a shown in FIG. 33A will be referred to as the first mesh state. For example, a solenoid or a piezo element is used as the push-fit actuator 115. The push load is adjusted by electricity supplied by the electronic control unit 30. The tooth row 111a of the worm wheel 111 is made of resin.

Figure 33B:
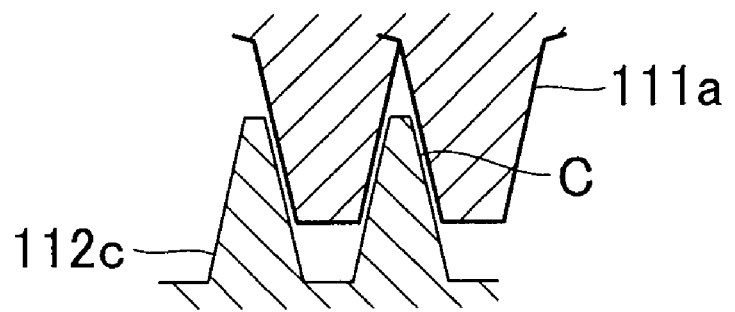

When the supply of electricity by the electronic control unit 30 is shut off, the push-fit actuator 115 cancels the force for pushing the second support bearing 114. In this case, the second support bearing is returned to a predetermined position by, for example, a spring (not shown) (in the direction of arrow "b" in FIG. 32). Thus, a predetermined amount of clearance C is formed between the tooth row 112c of the cylindrical worm 112 and the tooth row 111a of the worm wheel 111, as shown in FIG. 33B. Hereafter, the state in which the tooth row 112c is meshed with the tooth row 111a shown in FIG. 33B will be referred to as the second mesh state.

For example, in each of the fourth to ninth embodiments of the invention, when it is determined that a malfunction has occurred in the rotational angle sensor 23, the high-frequency torque is added to the steering assist torque, whereby the motor rotational angular speed ωm is maintained equal to or higher than the predetermined value to ensure the accuracy of the estimated rotational angle. However, the additional torque may be transmitted to the driver's steering wheel as vibration, and the driver may feel a sense of discomfort. Accordingly, in the twelfth embodiment of the invention, when it is determined that a malfunctions has occurred in the rotational angle sensor 23, the push-fit actuator 115 is operated to change the mesh state of the worm gear 110 from the first mesh state to the second mesh state. Thus, the stiffness of the portion between the electric motor 15 and the steering shaft 12 changes.

Figure 34A:
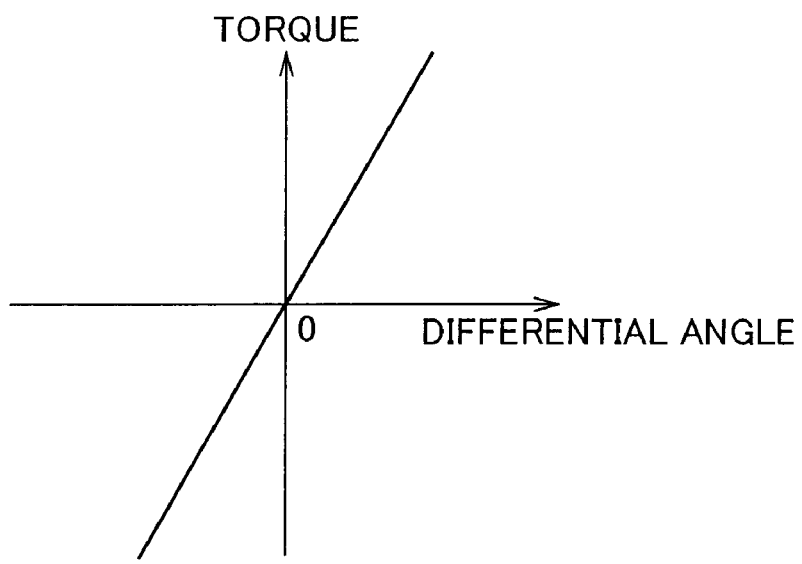
FIGS. 34A and 34B illustrate graphs each showing the stiffness characteristics according to the twelfth embodiment of the invention.
Figure 34B:
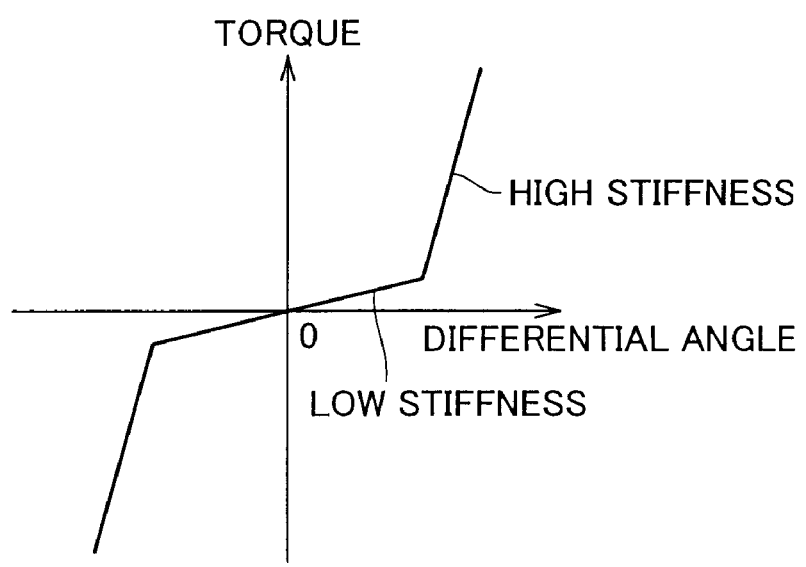

FIGS. 34A and 34B shows the stiffness characteristics of the worm gear 110. FIG. 34A shows the stiffness characteristics in the first mesh state, and FIG. 34B shows the stiffness characteristics in the second mesh state. In the second mesh state, the clearance C is formed between the tooth row 112c of the cylindrical worm 112 and the tooth row 111a of the worm wheel 111. Accordingly, at the early stage of the rotation of the electric motor 15, the rotational angle of the worm wheel 111 with respect to the rotation of the cylindrical worm 112 is small. In addition, because the tooth row 111a of the worm wheel 111 is made of resin, deformation at the resin also appears in the difference in the rotational angle between the cylindrical worm 112 and the worm wheel 111.

Accordingly, as shown in FIG. 34B, in the low torque range in which the torque output from the electric motor 15 is low, the rate of increase in the differential angle (the difference in the rotational angle between the cylindrical worm 112 and the worm wheel 111) with respect to an increase in the torque is high. Namely, the worm gear 110 has low stiffness characteristics. On the other hand, in the high torque range in which the torque output from the electric motor 15 is high, the rate of increase in the differential angle with respect to an increase in the torque is low. Namely, the worm gear 110 has high stiffness characteristics. As described above, when the worm gear 110 is in the second mesh state, the stiffness characteristics of the worm gear 110 change in accordance with the torque output from the electric motor 15. The stiffness of the worm gear 110 in the low torque range is lower than that in the high torque range.

When the worm gear 110 is in the first mesh state, as shown in FIG. 34A, the worm gear 110 has constant high stiffness characteristics. The magnitude of the stiffness is set substantially equal to the stiffness in the high torque range in the second mesh state.

The push-fit actuator 115 is controlled by the electronic control unit 30. For example, as indicated by the dashed line in FIG. 5, the electronic control unit 30 is provided with an actuator drive circuit 116. In this example, a stiffness characteristic changing mechanism is provided in the fourth embodiment of the invention. However, this structure may be applied to the other embodiments in which a high-frequency torque is added to the steering assist torque. The actuator drive circuit 116 receives a malfunction determination signal indicating whether a malfunction has occurred in the rotational angle sensor 23 from the malfunction determination unit 61. When the actuator drive circuit 66 has not received a sensor malfunction signal "fail", electricity is supplied to the push-fit actuator 115 to set the worm gear 110 in the first mesh state. On the other hand, when the actuator drive circuit 66 has received a sensor malfunction signal "fail", the supply of electricity to the push-fit actuator 115 is shut off to set the worm gear 110 in the second mesh state.

With the electric power steering apparatus according to the twelfth embodiment of the invention, when it is determined that a malfunction has occurred in the rotational angle sensor 23 and a high-frequency torque is added to the steering assist torque, the mesh state of the worm gear 110 is changed to the second mesh state, whereby the same effects as those in the eleventh embodiment are obtained. Namely, when the force for turning the driver's steering wheel is small, the stiffness of the worm gear 110 is low. Accordingly, the motor rotational angular speed ωm is maintained equal to or higher than the predetermined value to prevent a decrease in the accuracy of the estimated rotational angle. In addition, transmission of the vibration due to the additional torque to the driver's steering wheel 11 is suppressed to suppress a sense of discomfort given to the driver. When the driver's steering wheel 11 is turned strongly, the electric motor 15 produces a high steering assist torque, and the stiffness of the worm gear 110 increases. Accordingly, the rotary torque produced by the electric motor 15 is reliably transmitted to the steering shaft 12, whereby an appropriate steering assist torque is produced. When the force for turning the driver's steering wheel is large, the driver does not easily feel torque fluctuations due to the additional torque. Accordingly, the driver does not easily feel a sense of discomfort.

The electric power steering apparatus according to the embodiments of the invention has been described so far. However, the invention is not limited to the embodiments described above. The invention may be realized in various modifications within the scope of the invention. For example, in each of the eleventh and twelfth embodiments, the column type electric power steering apparatus in which the steering assist torque is applied to the steering shaft is described. However, each of the eleventh and twelfth embodiment may be applied to a rack-type electric power steering apparatus in which a steering assist torque is applied to a rack. The assist map change command unit 68 that changes the assist map between the normal assist control and the sensorless assist control may be applied not only to the sixth embodiment but to the other embodiments.

In the embodiments of the invention, the rotational angle sensor 23 is provided, and only when it is determined that a malfunction has occurred in the rotational angle sensor 23, the sensorless assist control using the estimated rotational angle is executed. Alternatively, the configuration may be such that the rotational angle sensor 23 is not provided and the sensorless assist control is constantly executed.

Motor control means according to the invention controls the rotation of the electric motor based on the information concerning the motor rotational angle. In the embodiments of the invention, the motor control means is formed of the two-phase/three-phase coordinate conversion unit 46, the PWM voltage production unit 47, the inverter circuit 48, the current sensors 51 and 52, the three-phase/two-phase coordinate conversion unit 53, the rotational angle conversion unit 55, the angular speed conversion unit 56, the calculation units 44, 45 and 54, the non-interacting correction value calculation unit 43, etc. of the electronic control unit 30. However, the configuration of the motor control means is not limited to this.

Assist control means according to the invention calculates the target steering assist torque, and provides an electricity supply command to the electric motor based on the calculated assist torque. In the embodiments of the invention, the assist control means is formed of the base assist torque calculation unit 31, the compensation value calculation unit 32, the calculation unit 33, the q-axis target current calculation unit 34, the field-weakening control parameter calculation unit 35, the d-axis target current calculation unit 36, the q-axis target current correcting calculation unit 37, the calculation units 38 and 39, the proportional-integral control units 41 and 42, and additional units in each embodiment (the assist stop command unit 63, the assist gain change command unit 64, the steering speed detection unit 65, the sine-wave torque addition unit 66, the torque addition gain multiplication unit 67, the assist map change command unit 68, the rectangular-wave torque addition unit 69, the torque addition gain multiplication unit 70, the additional torque wave-form determination unit 71, the torque addition unit 72, and the differential angle control unit 73) of the electronic control unit 30. However, the configuration of the assist control means is not limited to this.

While the invention has been described with reference to what are considered to be example embodiments thereof, it is to be understood that the invention is not limited to the described embodiments or constructions. On the contrary, the invention is intended to cover various modifications and equivalent arrangements. In addition, while the various elements of the described invention are shown in various combinations and configurations, which are example, other combinations and configurations, including more, less or only a single element, are also within the scope of the invention.

What is claimed is:

1. An electric power steering apparatus, comprising:
   a steering mechanism that steers a steering wheel in response to a steering operation of a driver's steering wheel;
   an electric motor that is fitted to the steering mechanism, that produces a steering assist torque used to assist the steering operation of the driver's steering wheel, and that is formed of a salient-pole permanent magnet motor;
   a rotational angle sensor that rotates in accordance with rotation of the electric motor to detect a rotational angle of the electric motor;
   a rotational angle estimation unit that estimates the rotational angle of the electric motor using a salient-polarity of the electric motor;
   a sensor malfunction determination unit that determines whether a malfunction has occurred in the rotational angle sensor;
   a rotational angle information obtaining unit that obtains information concerning the rotational angle of the electric motor from the rotational angle sensor when it is determined that there is no malfunction in the rotational angle sensor, and that obtains the information concerning the rotational angle of the electric motor from the rotational angle estimation unit when it is determined that a malfunction has occurred in the rotational angle sensor;
   a motor control unit that controls the rotation of the electric motor based on the information concerning the rotational angle obtained by the rotational angle information obtaining unit; and
   an assist control unit that calculates a target steering assist torque based on the steering operation of the driver's steering wheel, that provides the motor control unit with a command to supply electricity to the electric motor to cause the electric motor to produce the steering assist torque based on the calculated target steering assist torque, and that changes a control manner for causing the electric motor to produce the steering assist torque between a control process executed when the sensor malfunction determination unit determines that a malfunction has occurred in the rotational angle sensor and a control process executed when the sensor malfunction determination unit determines that there is no malfunction in the rotational angle sensor;
   wherein the assist control unit includes a pulsatile torque addition unit that adds a pulsatile torque to the steering assist torque produced by the electric motor, when the sensor malfunction determination unit determines that a malfunction has occurred in the rotational angle sensor, to maintain the rotational angular speed of the electronic motor above a predetermined valve.

2. The electric power steering apparatus according to claim 1, wherein
   the assist control unit includes an assist stop unit that stops production of the steering assist torque, if the assist control unit determines that a rotational angular speed of the electric motor is lower than a predetermined value when the sensor malfunction determination unit determines that a malfunction has occurred in the rotational angle sensor.

3. The electric power steering apparatus according to claim 1, wherein
   the assist control unit includes an assist torque decreasing unit that decreases the steering assist torque produced by the electric motor in accordance with a decrease in a rotational angular speed of the electric motor, if the assist control unit determines that the rotational angular speed of the electric motor is lower than a predetermined value when the sensor malfunction determination unit determines that a malfunction has occurred in the rotational angle sensor.

4. The electric power steering apparatus according to claim 2, further comprising:
   a steering speed detection unit that detects a steering speed of the driver's steering wheel,
   wherein
   the assist control unit determines whether the rotational angular speed of the electric motor is lower than the predetermined value based on information detected by the steering speed detection unit.

5. The electric power steering apparatus according to claim 4, wherein
   the steering speed detection unit includes a steering angle sensor that detects a steering angle of the driver's steering wheel, and the steering speed detection unit calculates the steering speed of the driver's steering wheel based on a temporal change in the steering angle detected by the steering angle sensor.

6. The electric power steering apparatus according to claim 1, wherein
the pulsatile torque is a sine-wave torque.

7. The electric power steering apparatus according to claim 1, wherein
the pulsatile torque is a rectangular-wave torque or a trapezoidal-wave torque.

8. The electric power steering apparatus according to claim 1, wherein
a frequency of the pulsatile torque is set to a value at which a transfer functional gain between the electric motor and the driver's steering wheel is equal to or lower than a predetermined value.

9. The electric power steering apparatus according to claim 1, wherein
the assist control unit includes a target assist torque setting unit that obtains steering torque information from a torque sensor that detects a steering torque applied to the driver's steering wheel, and that sets the target steering assist torque to a higher value as the steering torque is higher, and
the pulsatile torque addition unit stops addition of the pulsatile torque to the steering assist torque, when the steering torque detected by the torque sensor is equal to or lower than a predetermined value when the sensor malfunction determination unit determines that a malfunction has occurred in the rotational angle sensor.

10. The electric power steering apparatus according to claim 9, wherein
the assist control unit stops production of the steering assist torque, when the assist control unit determines that a rotational angular speed of the electric motor is lower than a predetermined value when the sensor malfunction determination unit determines that a malfunction has occurred in the rotational angle sensor and the addition of the pulsatile torque to the steering assist torque is stopped.

11. The electric power steering apparatus according to claim 10, wherein
the target assist torque setting unit stores relational data used to set the target steering assist torque based on the detected steering torque, the relational data including malfunction-time relational data that is used when the sensor malfunction determination unit determines that a malfunction has occurred in the rotational angle sensor and normal-time relational data that is used when the sensor malfunction determination unit determines that there is no malfunction in the rotational angle sensor, and
the malfunction-time relational data is broader in assist dead band, in which the target steering assist torque is set to zero, than the normal-time relational data.

12. The electric power steering apparatus according to claim 9, wherein
the target assist torque setting unit stores relational data used to set the target steering assist torque based on the detected steering torque, the relational data including malfunction- time relational data that is used when the sensor malfunction determination unit determines that a malfunction has occurred in the rotational angle sensor and normal-time relational data that is used when the sensor malfunction determination unit determines that there is no malfunction in the rotational angle sensor, and
the target steering assist torque set using the malfunction-time relational data is lower the target steering assist torque set using the normal-time relational data.

13. The electric power steering apparatus according to claim 1, wherein
the pulsatile torque addition unit decreases an amplitude of the pulsatile torque with a decrease in the target steering assist torque, and increases the amplitude of the pulsatile torque with an increase in the target steering assist torque.

14. The electric power steering apparatus according to claim 1, further comprising:
a steering sensor that detects a steering state of the driver's steering wheel,
wherein
the assist control unit includes a target wave-form determination unit that determines a target wave-form of the pulsatile torque added to the steering assist torque based on at least the steering state detected by the steering sensor.

15. The electric power steering apparatus according to claim 1, further comprising:
a variable stiffness body which is provided at a connection portion between a rotating shaft of the electric motor and the steering mechanism, and of which stiffness is lower in a low-torque range, in which the electric motor produces a low rotary torque, than in a high-torque range, in which the electric motor produces a high rotary torque.

16. The electric power steering apparatus according to claim 1, further comprising:
a stiffness characteristic changing unit that selectively changes a stiffness characteristic at a connection portion between a rotating shaft of the electric motor and the steering mechanism,
wherein
the stiffness characteristic changing unit changes the stiffness characteristic between a first stiffness characteristic based on which a stiffness in a low torque range, in which the electric motor produces a low rotary torque, is lower than the stiffness in the high torque range, in which the electric motor produces a high rotary torque, and a second stiffness characteristic based on which the stiffness, substantially equal to the stiffness in the high torque range based on the first stiffness characteristic, is achieved in both the low torque range and the high torque range, and
the stiffness characteristic changing unit selects the first stiffness characteristic when the sensor malfunction determination unit determines that a malfunction has occurred in the rotational angle sensor, and selects the second stiffness characteristic when the sensor malfunction determination unit determines that there is no malfunction in the rotational angle sensor.

17. The electric power steering apparatus according to claim 1, further comprising:
a gear ratio changing device that changes a steering gear ratio that is a ratio of a steering angle of the drive's steering wheel to a steering angle of the steering wheel; and
a gear ratio control unit that controls the gear ratio changing device and synchronizes a change in the rotation of the electric motor and a change in the pulsatile torque with each other such that the pulsatile torque added to the steering assist torque is not transmitted to the driver's steering wheel.

18. An electric power steering apparatus, comprising:
a steering mechanism that steers a steering wheel in response to a steering operation of a driver's steering wheel;
an electric motor that is fitted to the steering mechanism, that produces a steering assist torque used to assist the steering operation of the driver's steering wheel, and that is formed of a salient-pole permanent magnet motor;
a rotational angle estimation unit that estimates a rotational angle of the electric motor using a salient-polarity of the electric motor;
a rotational angle information obtaining unit that includes the rotational angle estimation unit, and that obtains information concerning the rotational angle of the electric motor;
a motor control unit that controls rotation of the electric motor based on the information concerning the rotational angle obtained by the rotational angle information obtaining unit; and
an assist control unit that calculates a target steering assist torque based on the steering operation of the driver's steering wheel, that provides the motor control unit with a command to supply electricity to the electric motor to cause the electric motor to produce the steering assist torque based on the calculated target steering assist torque, and that changes a control manner for causing the electric motor to produce the steering assist torque between a control process executed when a rotational angular speed of the electric motor is lower than a predetermined value and a control process executed when the rotational angular speed of the electric motor is equal to or higher than the predetermined value;
wherein the assist control unit includes a pulsatile torque addition unit that adds a pulsatile torque to the steering assist torque produced by the electric motor, when the sensor malfunction determination unit determines that a malfunction has occurred in the rotational angle sensor.

19. The electric power steering apparatus according to claim 18, wherein
the assist control unit includes an assist stop unit that stops production of the steering assist torque, when the rotational angular speed of the electric motor is lower than the predetermined value.

20. The electric power steering apparatus according to claim 18, wherein
the assist control unit includes an assist torque decreasing unit that decreases the steering assist torque produced by the electric motor in accordance with a decrease in the rotational angular speed of the electric motor, when it is determined that the rotational angular speed of the electric motor is lower than the predetermined value.

21. An electric power steering apparatus:
a steering mechanism that steers a steering wheel in response to a steering operation of a driver's steering wheel;
an electric motor that is fitted to the steering mechanism, that produces a steering, assist torque used to assist the steering operation of the driver's steering wheel, and that is formed of a salient-pole permanent magnet motor;
rotational angle information obtaining means for obtaining information concerning a rotational angle of the electric motor;
motor control means for controlling rotation of the electric motor based on the information concerning the rotational angle obtained by the rotational angle information obtaining means;
assist control means for calculating a target steering assist torque based on the steering operation of the driver's steering wheel, and for providing the motor control means with a command to supply electricity to the electric motor to cause the electric motor to produce the steering assist torque based on the calculated target steering assist torque;
a rotational angle sensor that rotates in accordance with the rotation of the electric motor to detect the rotational angle of the electric motor;
rotational angle estimation means for estimating the rotational angle of the electric motor using a salient-polarity of the electric motor; and
sensor malfunction determination means for determining whether a malfunction has occurred in the rotational angle sensor, wherein
the rotational angle information obtaining means obtains the information concerning the rotational angle of the electric motor from the rotational angle sensor when it is determined that there is no malfunction in the rotational angle sensor, and obtains the information concerning the rotational angle of the electric motor from the rotational angle estimation means when it is determined that a malfunction has occurred in the rotational angle sensor, and
the assist control means includes pulsatile torque addition means for adding a pulsatile torque to the steering assist torque produced by the electric motor, when the sensor malfunction determination means determines that a malfunction has occurred in the rotational angle sensor, for maintaining the rotational angular speed of the electric motor above a predetermined value.

* * * * *